(12) United States Patent
Yamada et al.

(10) Patent No.: US 10,686,955 B2
(45) Date of Patent: Jun. 16, 2020

(54) IMAGE READING APPARATUS WITH DOCUMENT SUPPORT PORTION

(71) Applicant: SEIKO EPSON CORPORATION, Tokyo (JP)

(72) Inventors: Katsumi Yamada, Matsumoto (JP); Kohei Kozaki, Matsumoto (JP); Shintaro Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/913,183

(22) Filed: Mar. 6, 2018

(65) Prior Publication Data

US 2018/0278772 A1 Sep. 27, 2018

(30) Foreign Application Priority Data

Mar. 23, 2017 (JP) .................. 2017-057983

(51) Int. Cl.
*H04N 1/00* (2006.01)
*B65H 1/04* (2006.01)
(Continued)

(52) U.S. Cl.
CPC ........... *H04N 1/00551* (2013.01); *B65H 1/04* (2013.01); *B65H 31/00* (2013.01); *B65H 31/02* (2013.01);
(Continued)

(58) Field of Classification Search
CPC ........... H04N 1/00551; H04N 1/00588; H04N 1/00591; H04N 1/00665; B65H 1/04; B65H 31/00; B65H 31/02; B65H 2402/441; B65H 2402/46; B65H 2405/11151; B65H 2405/11162; B65H 2405/11164; B65H 2405/1117; B65H 2405/3321; B65H 2601/11; B65H 2801/06; B65H 2801/39
See application file for complete search history.

(56) References Cited

U.S. PATENT DOCUMENTS

| 8,964,263 B1 | 2/2015 | Sakakibara et al. |
| 2002/0056957 A1 | 5/2002 | Sekine |
| 2009/0146362 A1 | 6/2009 | Yoshioka et al. |
| 2010/0252987 A1 | 10/2010 | Furuyama et al. |

(Continued)

FOREIGN PATENT DOCUMENTS

| JP | 2002-145457 A | 5/2002 |
| JP | 2009-137686 A | 6/2009 |

(Continued)

*Primary Examiner* — Iriana Cruz
(74) *Attorney, Agent, or Firm* — Workman Nydegger

(57) ABSTRACT

An image reading apparatus includes a document support portion, a cover portion which is capable of opening and closing, a first surface of which forms an apparatus top surface, and a second surface of which forms a support surface which supports the document, and a base frame which forms the apparatus top surface, in which the document support portion is provided to be capable of rotational movement and is capable of switching between a first posture and a second posture, in which the first surface of the cover portion forms the apparatus top surface which runs along a horizontal direction together with a top surface of the base frame in the closed state, and in which, in the first posture, a portion of the document support portion is at a height position running along the second surface of the cover portion in the closed state.

13 Claims, 42 Drawing Sheets

(51) Int. Cl.
*B65H 31/00* (2006.01)
*B65H 31/02* (2006.01)

(52) U.S. Cl.
CPC .... *B65H 2402/441* (2013.01); *B65H 2402/46* (2013.01); *B65H 2405/1117* (2013.01); *B65H 2405/11151* (2013.01); *B65H 2405/11162* (2013.01); *B65H 2405/11164* (2013.01); *B65H 2405/3321* (2013.01); *B65H 2601/11* (2013.01); *B65H 2801/06* (2013.01); *B65H 2801/39* (2013.01); *H04N 1/00588* (2013.01); *H04N 1/00591* (2013.01); *H04N 1/00665* (2013.01)

(56) References Cited

U.S. PATENT DOCUMENTS

| | | | |
|---|---|---|---|
| 2015/0189106 A1* | 7/2015 | Sakakibara | H04N 1/0057 358/498 |
| 2016/0090260 A1* | 3/2016 | Miura | B65H 31/00 271/3.14 |
| 2018/0312351 A1 | 11/2018 | Yamada et al. | |
| 2018/0367686 A1 | 12/2018 | Yamada et al. | |

FOREIGN PATENT DOCUMENTS

| | | | |
|---|---|---|---|
| JP | 2010-245624 | A | 10/2010 |
| JP | 2015-070431 | A | 4/2015 |
| JP | 2015-124079 | A | 7/2015 |
| JP | 2018191063 | A | 11/2018 |
| JP | 2018198387 | A | 12/2018 |
| JP | 2019001629 | A | 1/2019 |

\* cited by examiner

IMAGE READING APPARATUS WITH DOCUMENT SUPPORT PORTION

BACKGROUND

1. Technical Field

The present invention relates to an image reading apparatus which reads a surface of a medium.

2. Related Art

A scanner which is an example of the image reading apparatus may be configured to be provided with an automatic document feeder (ADF) and is capable of performing automatic feeding and reading of a plurality of sheets of a document. For the configuration of the automatic document feeder, a configuration may be adopted in which the document is fed out from a document support portion which supports the document, and after being caused to perform a U-turn inversion, the document is transported to a reading position and is output toward an output tray.

JP-A-2010-245624 discloses an example of a scanner which is provided with such an automatic document feeder.

In the configuration of JP-A-2010-245624, a paper support portion 30 corresponds to the document support portion on which the document is mounted before feeding. Here, since the document is fed out by a feed roller from the document support portion on which the document is mounted before feeding, it is preferable that the posture of the document support portion, more specifically, the inclination angle of a document support surface be maintained at an appropriate angle.

The paper support portion 30 of JP-A-2010-245624 is configured to be capable of switching between a storage-time position and a usage-time position and such that the feeding of the document is possible by rocking the paper support portion 30 upward from the storage-time position to switch to the usage-time position. The rocking of the paper support portion 30 upward is realized by a protruding part 45, which is formed on a cover portion 40, pushing up the paper support portion 30 when the cover portion 40 which covers the paper support portion 30 in the storage state opens.

Therefore, a high component precision is necessary in order to appropriately form the inclination posture when the paper support portion 30 is at the usage-time position, and there is room for further improvement of this point.

Meanwhile, in the related art, there is a demand for favorable jam processing properties in the automatic document feeder and it is important to also achieve the favorable jam processing properties.

SUMMARY

An advantage of some aspects of the invention is to obtain an image reading apparatus which more easily maintains the posture of a document support portion on which a document is mounted before feeding at an appropriate angle while taking jam processing properties into consideration.

According to an aspect of the invention, there is provided an image reading apparatus which includes a reader which reads a document, a document support portion which supports the document before feeding, a feeding unit which feeds out the document which is supported by the document support portion toward the reader, a cover portion which is capable of opening and closing, a first surface of which forms an apparatus top surface in a closed state, and a second surface, which is an opposite side from the first surface, of which forms a support surface which supports the document together with the document support portion in an open state, and a base frame which forms the apparatus top surface together with the cover portion, in which the document support portion is provided to be capable of rotational movement and is capable of, through rotational movement, switching between a first posture which is a posture in which the document is fed from the feeding unit and a second posture in which the document support portion is opened upward from the first posture to widen a bottom portion space of the document support portion, in which the first surface of the cover portion forms the apparatus top surface which runs along a horizontal direction together with a top surface of the base frame in the closed state, and in which, in the first posture, a portion of the document support portion is at a height position running along the second surface of the cover portion in the closed state.

In this configuration, the document support portion is capable of switching between the first posture which is a posture in which the document is fed from the feeding unit and a second posture in which the document support portion is opened upward from the first posture to widen the bottom portion space of the document support portion. In other words, since the first posture which is the posture before opening is the posture in which the document is fed, it is possible to more easily maintain the posture of the document support portion during the feeding of the document at an appropriate angle.

Since the first posture of the document support portion is at a height position running along the second surface of the cover portion in the closed state (the cover portion in the posture which runs along the horizontal direction), it is possible to secure the bottom side space of the document support portion to the maximum extent and the jam processing properties are improved.

The image reading apparatus may further include an output tray which receives a document that is subjected to reading by the reader and is output, and the output tray may be provided to be capable of opening and closing and form the apparatus top surface which runs along the horizontal direction together with the first surface of the cover portion and the top surface of the base frame in the closed state.

In this configuration, since the output tray may be provided to be capable of opening and closing and form the apparatus top surface which runs along the horizontal direction together with the first surface of the cover portion and the top surface of the base frame in the closed state, in the configuration in which the output tray is provided, the flatness of the apparatus top surface is secured, which is aesthetically excellent, and the stability when mounting the document or the like on the apparatus top surface is improved.

The cover portion may be supported by the document support portion in the closed state.

In this configuration, since the cover portion is supported by the document support portion which is in a posture that is stable in the closed state (the first posture), it is possible to appropriately maintain the closed posture of the cover portion and, in particular, the flatness of the apparatus top surface is secured.

A support frame may be included which is positioned on a downstream side of a document support portion and, together with the document support portion, forms the downstream support portion that supports the document before feeding, and the support frame may be provided to be capable of rotational movement, and, through rotational movement, may switch between a feeding-time posture in which the downstream support portion supports the document before feeding and an open posture in which the support frame opens upward from the feeding-time posture to widen the bottom portion space of the downstream support portion.

In this configuration, since it is possible to open the support frame which forms the downstream support portion which is positioned further on the downstream side of the document support portion, the bottom side space of the downstream support portion is widened, and thus, the jam processing properties are still further improved.

The document support portion may be connected to the support frame to be capable of rotational movement.

In this configuration, since the document support portion is connected to the support frame to be capable of rotational movement, by opening both the document support portion and the support frame, the bottom side spaces of the document support portion and the support frame are greatly exposed and the jam processing properties are still further improved.

Since it is possible to also lift up the support frame by lifting up the document support portion, the manipulability is also improved.

The cover portion may support the base frame in the open state.

In this configuration, since the cover portion is supported by the base frame in the open state, the open posture of the cover portion is more appropriately and reliably defined.

A rotational movement shaft of the document support portion may be positioned on a downstream side of the document support portion in a feed direction.

In this configuration, since the rotational movement shaft of the document support portion is positioned on the downstream side of the document support portion in the feed direction, it is possible to assume a state in which it is easy to insert a hand into the inner portion of the apparatus when the document support portion is opened during the jam processing.

The first posture of the document support portion may be defined by the document support portion abutting on the support frame.

In this configuration, since the first posture of the document support portion is defined by the document support portion abutting on the support frame, the posture of the document support portion is accurately defined with respect to the downstream support portion during the feeding of the document and it is possible to realize more appropriate feeding.

The image reading apparatus may further include a document transport path in which the document which is fed from the document support portion is curved and inverted to face downward, passes a bottom side of the document support portion, and is output, and a curved transport path forming member which forms an outside of a curved inverting transport path of the document from the downstream support portion to the reader in the document transport path, in which the curved transport path forming member may open and close by rotationally moving centered on a rotational movement shaft which is positioned closer to the bottom side than a rotational movement shaft of the document support portion, may form the curved inverting transport path by closing, and may open the curved inverting transport path by opening.

In this configuration, since the curved transport path forming member opens and closes by rotationally moving centered on the rotational movement shaft which is positioned closer to the bottom side than the rotational movement shaft of the document support portion, when the curved transport path forming member is opened, it is possible to more greatly open the curved inverting transport path and the jam processing properties are improved.

The curved transport path forming member may form the apparatus top surface which runs along the horizontal direction together with the first surface of the cover portion and the top surface of the base frame in the closed state.

In this configuration, since the curved transport path forming member forms the apparatus top surface which runs along the horizontal direction together with the first surface of the cover portion and the top surface of the base frame in the closed state, in the configuration in which the curved transport path forming member is provided, the flatness of the apparatus top surface is secured, which is aesthetically excellent, and the stability when mounting the document or the like on the apparatus top surface is improved.

When both the cover portion and the curved transport path forming member are closed, an edge portion of the cover portion and an edge portion of the curved transport path forming member on the apparatus top surface may face each other, and a recessed portion may be formed in a portion of the edge portion of the curved transport path forming member and at least a portion of the edge portion of the cover portion may be exposed via the recessed portion.

In this configuration, since it is possible to expose at least a portion of the edge portion of the cover portion using the recessed portion without forming an opening and it is possible to open the cover portion as a result, it is possible to suppress the entrance of dust and the like into the inner portion of the apparatus.

The document support portion and the cover portion may overlap each other in a document feed direction in at least a portion of a document width direction which is a direction intersecting the document feed direction.

In this configuration, since the document support portion and the cover portion overlap each other in a document feed direction in at least a portion of a document width direction which is a direction intersecting the document feed direction, it is possible to suppress the catching of the document leading end on the document support portion when setting the document on the cover portion.

The curved transport path forming member may open in accordance with an opening operation of the document support portion.

In this configuration, since the curved transport path forming member opens in accordance with the opening operation of the document support portion, the manipulability during the jam processing is still further improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
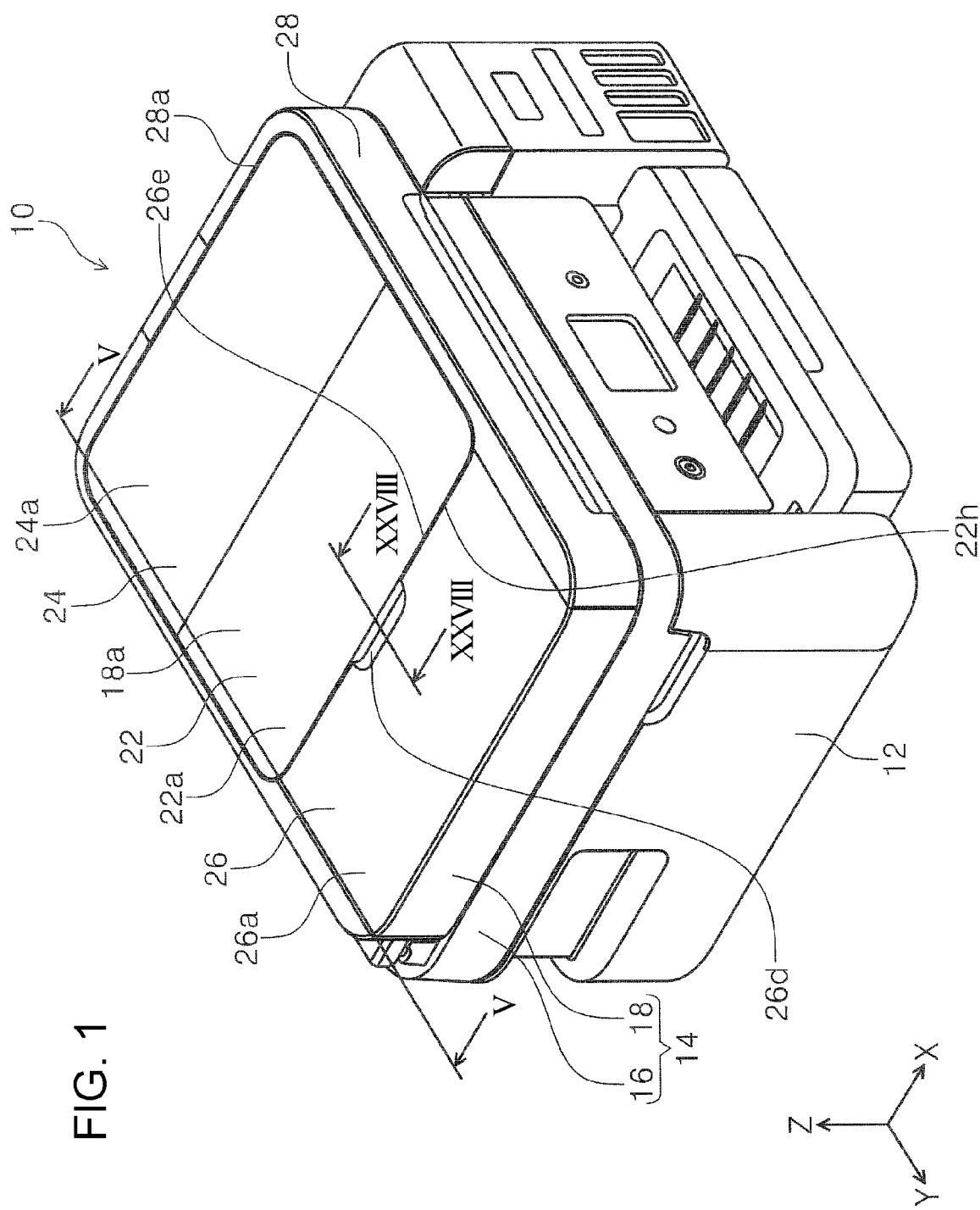
FIG. 1 is an external perspective view of a non-usage state of a scanner of a printer according to the invention.

Hereinafter, a description will be given of an embodiment of the invention based on the drawings. Regarding configurations which are the same in the examples, the same reference numerals will be given, a description will be given only in the first example, and the description of the configurations will be omitted in the following examples.

Figure 2:
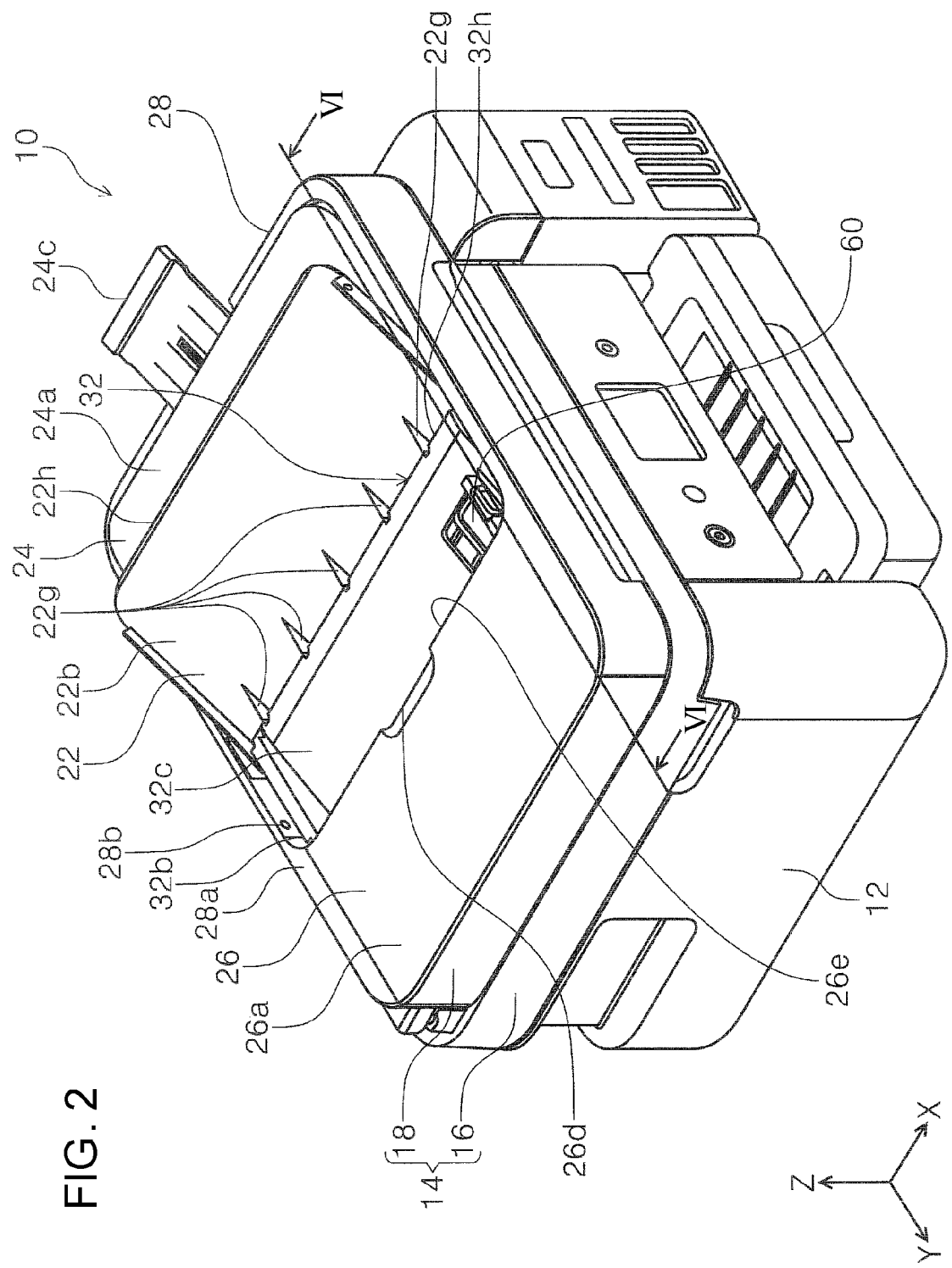
FIG. 2 is an external perspective view of a usage state of the scanner of the printer according to the invention.
Figure 3:
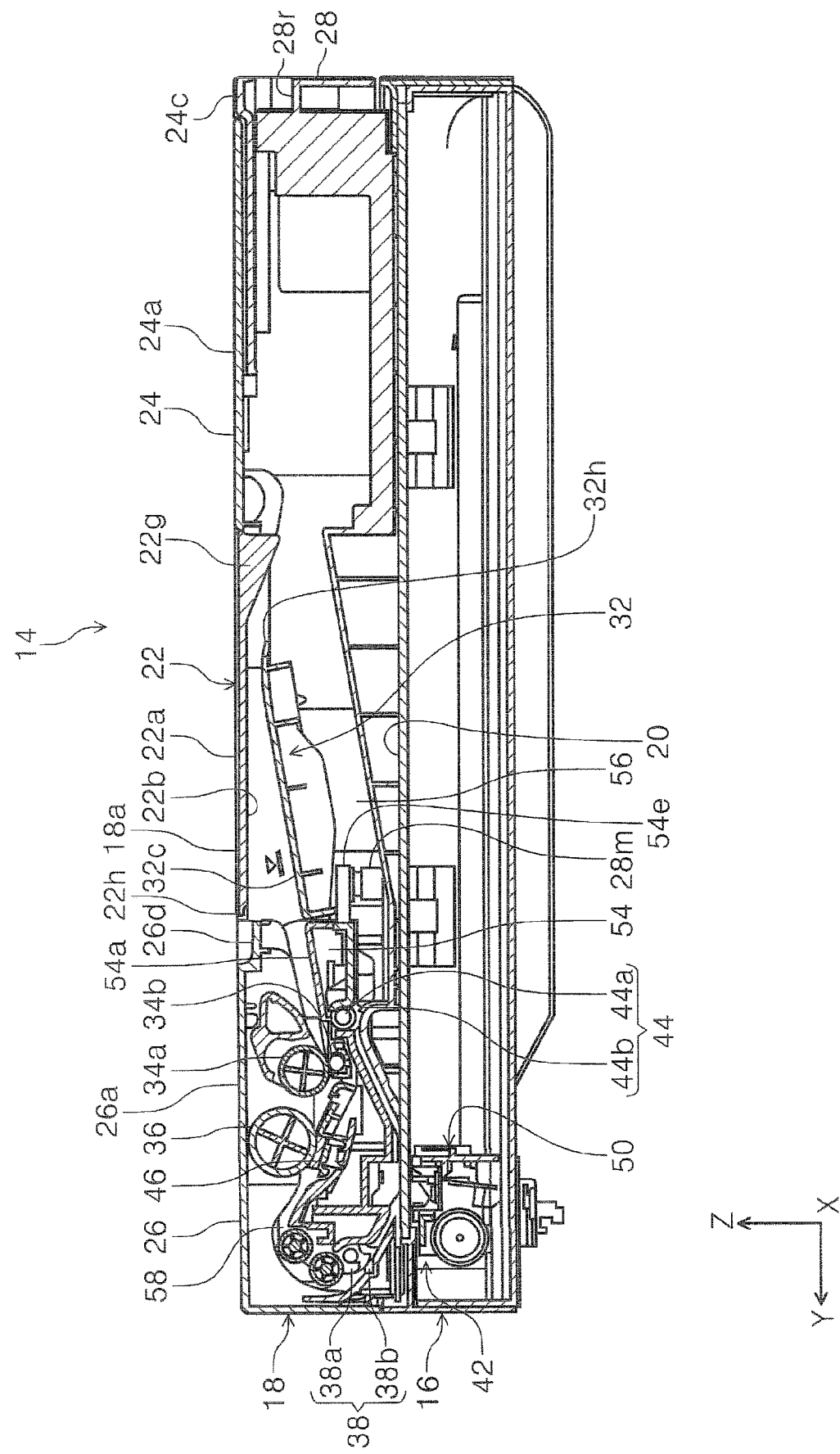
FIG. 3 is a lateral sectional diagram illustrating a document transport path in the non-usage state of the scanner according to the invention.
Figure 4:
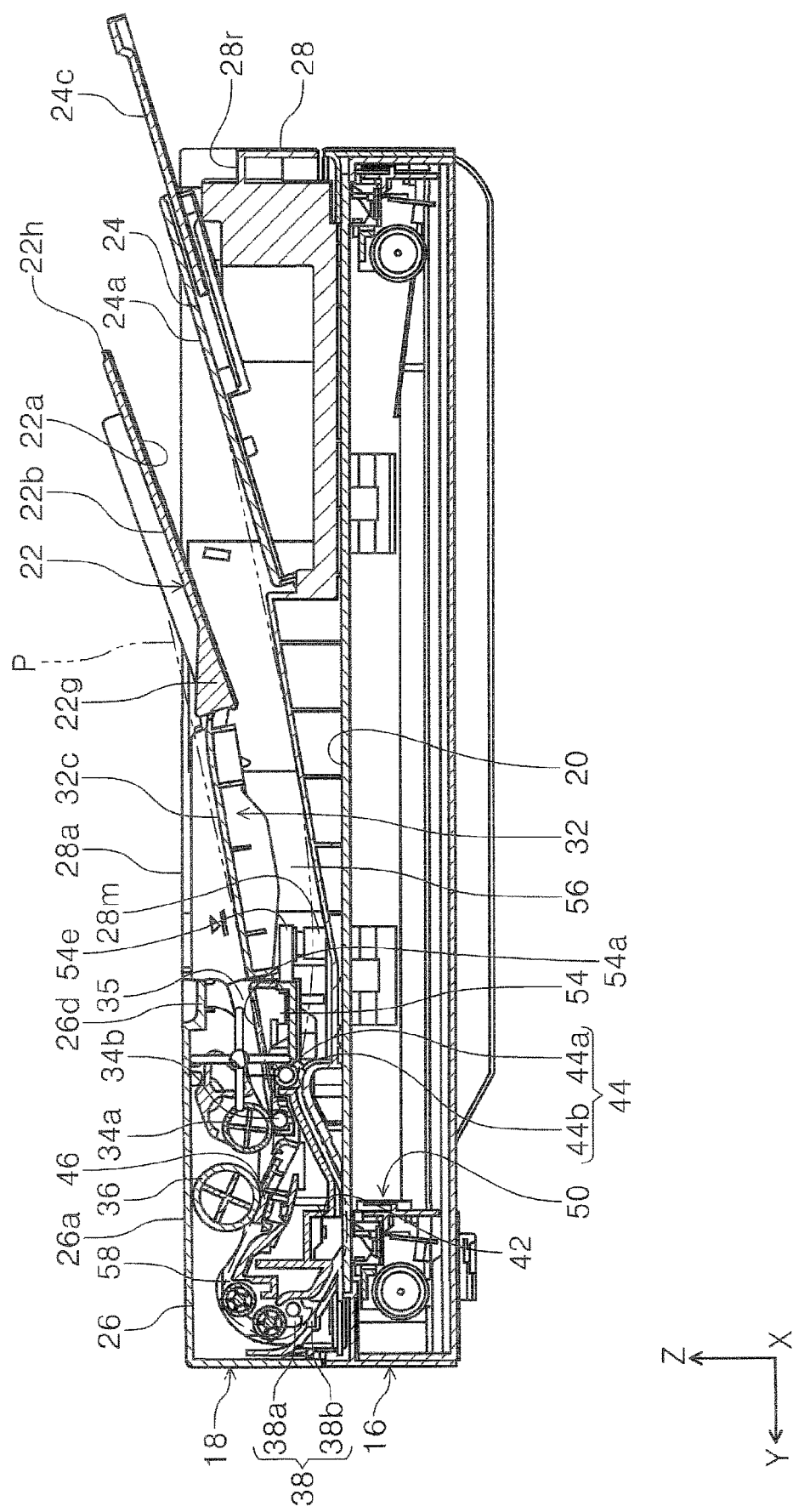
FIG. 4 is a lateral sectional diagram illustrating the document transport path in the usage state of the scanner according to the invention.
Figure 5:
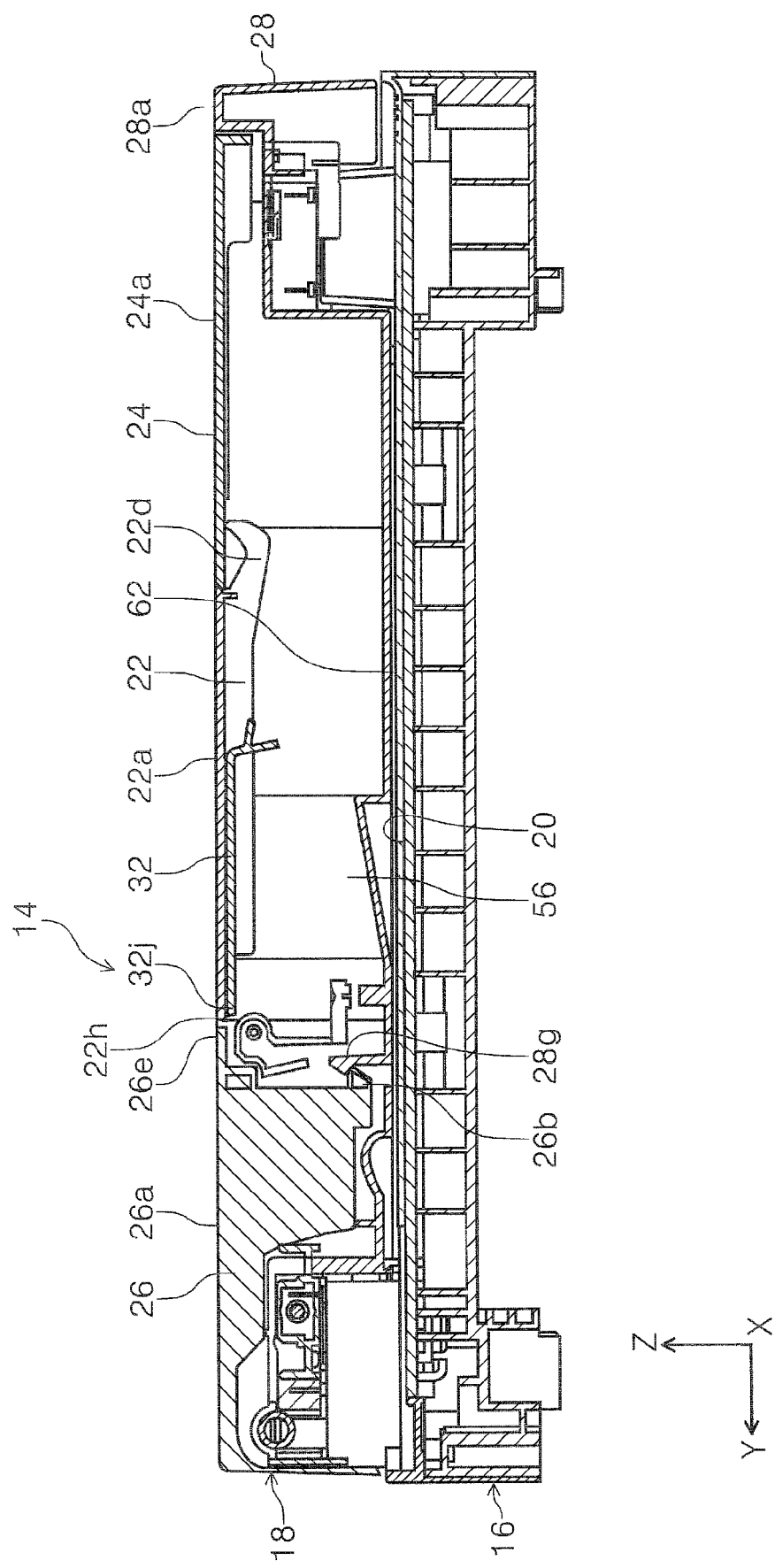
FIG. 5 is a sectional diagram taken along a line V-V of FIG. 1.
Figure 6:
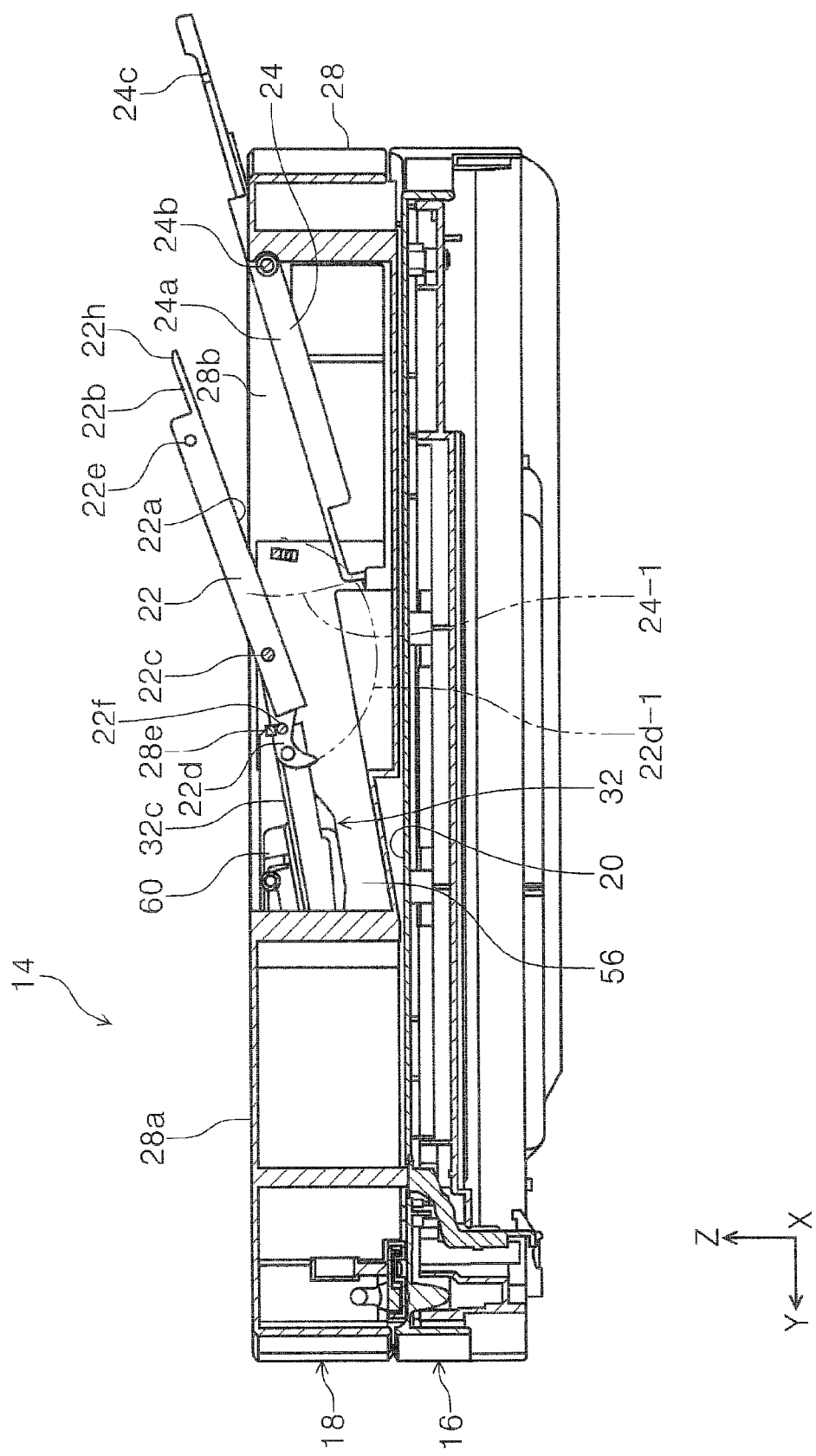
FIG. 6 is a sectional diagram taken along a line VI-VI of FIG. 2.

FIG. 1 is an external perspective view of a non-usage state of a scanner of a printer according to the invention, FIG. 2 is an external perspective view of a usage state of the scanner of the printer according to the invention, FIG. 3 is a lateral sectional diagram illustrating a document transport path in the non-usage state of the scanner according to the invention, FIG. 4 is a lateral sectional diagram illustrating the document transport path in the usage state of the scanner according to the invention, FIG. 5 is a sectional diagram taken along a line V-V of FIG. 1, and FIG. 6 is a sectional diagram taken along a line VI-VI of FIG. 2.

Figure 7:
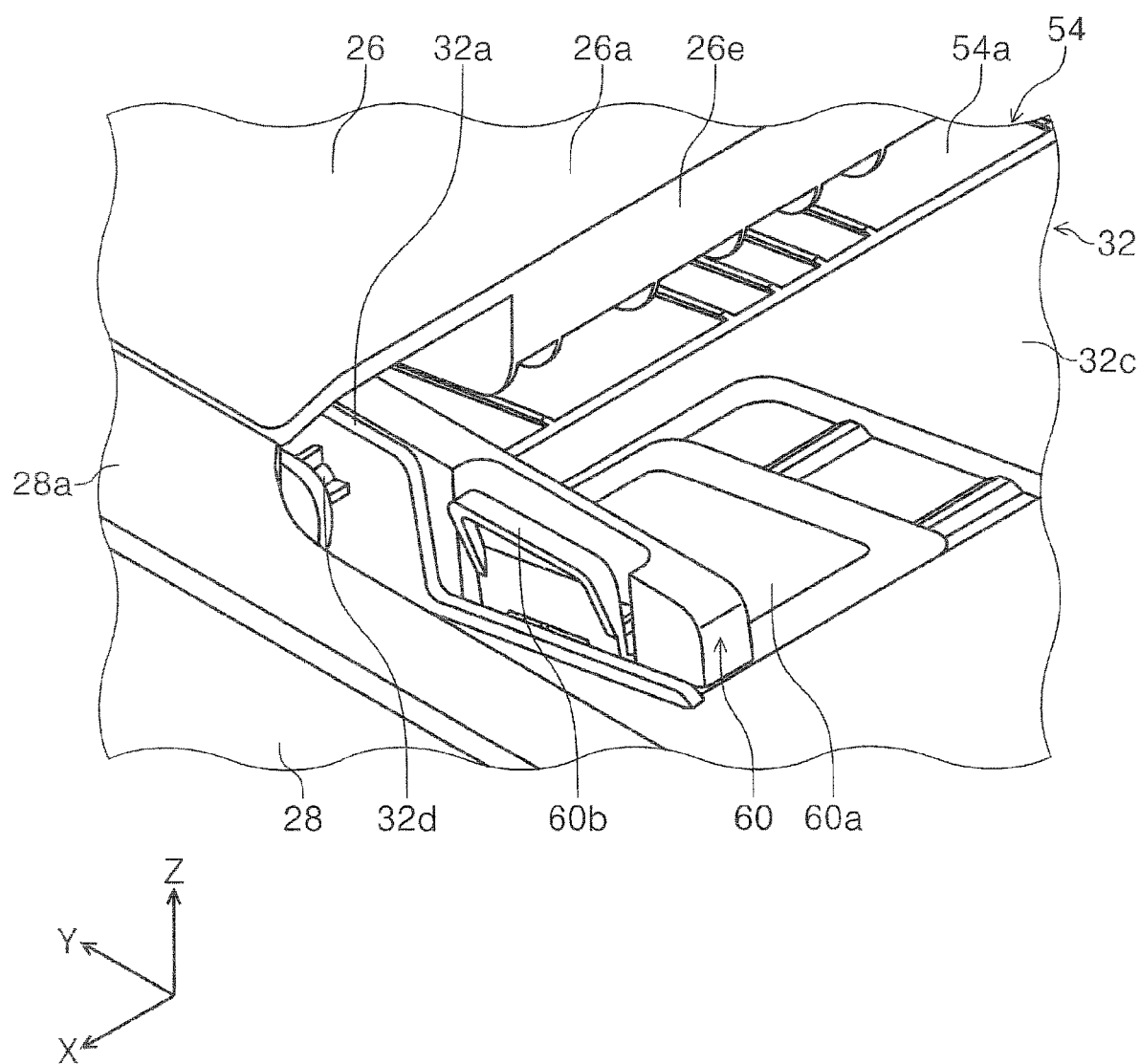
FIG. 7 is a perspective view illustrating a support portion of a cover portion which is provided on the document support portion.
Figure 8:
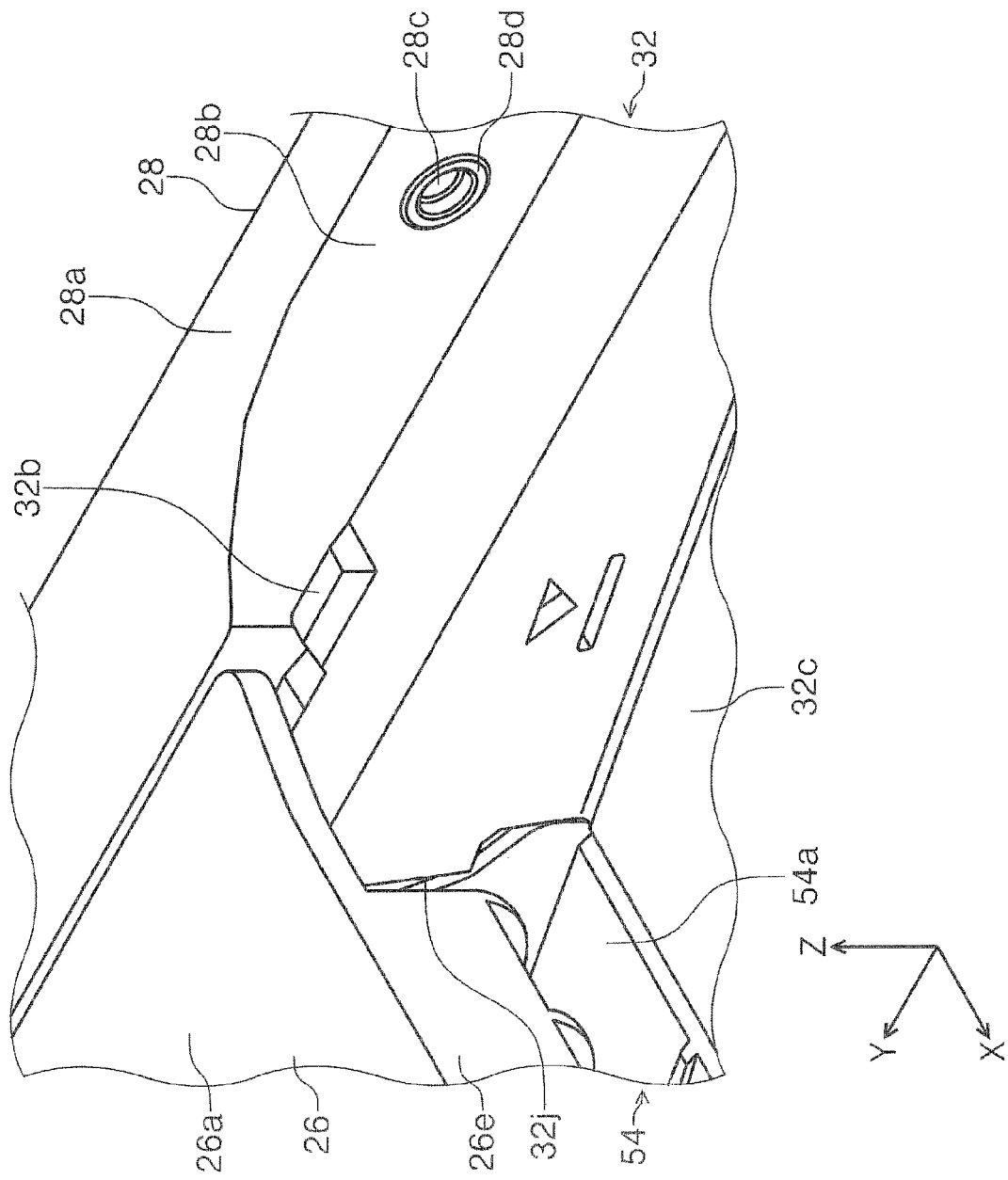
FIG. 8 is a perspective view illustrating the support portion of the cover portion which is provided on the document support portion and a recessed portion which is provided in a base frame.
Figure 9:
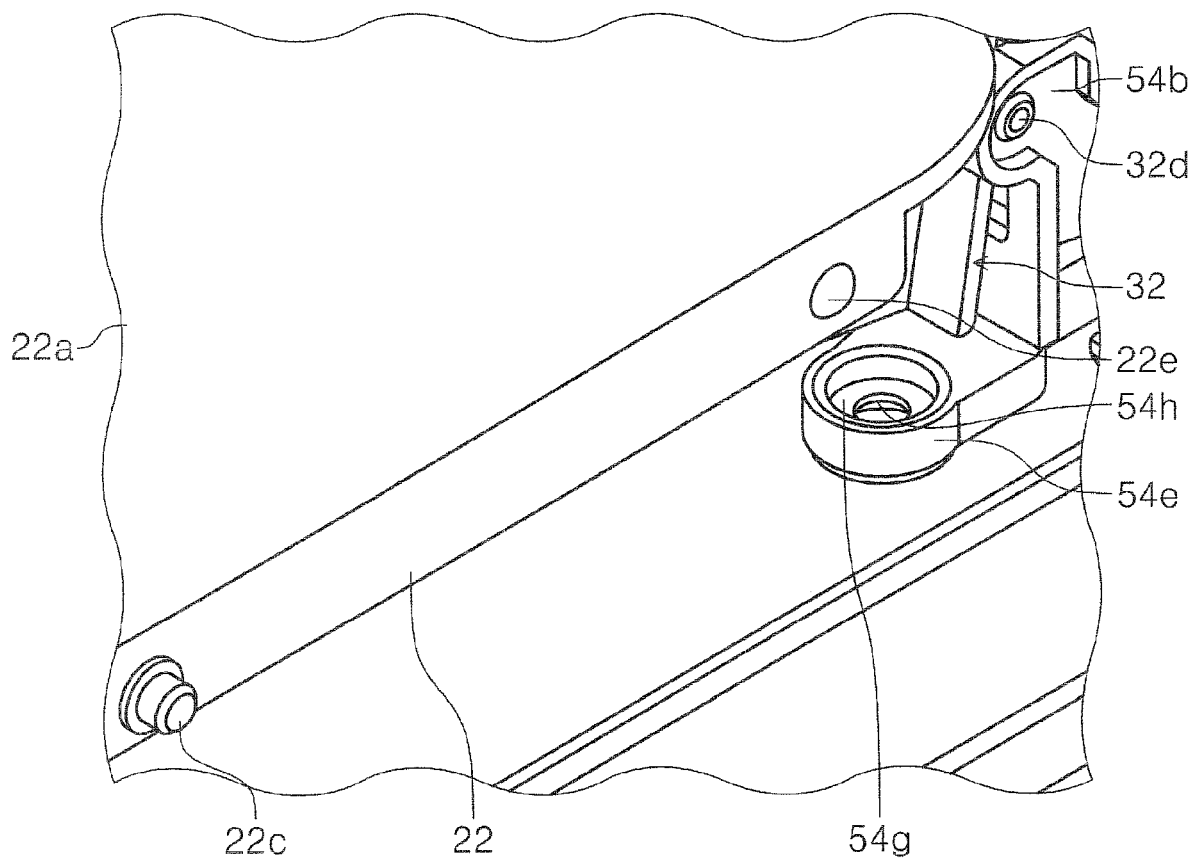
FIG. 9 is a perspective view illustrating a rotational movement shaft and a convex portion of the cover portion.
Figure 10:
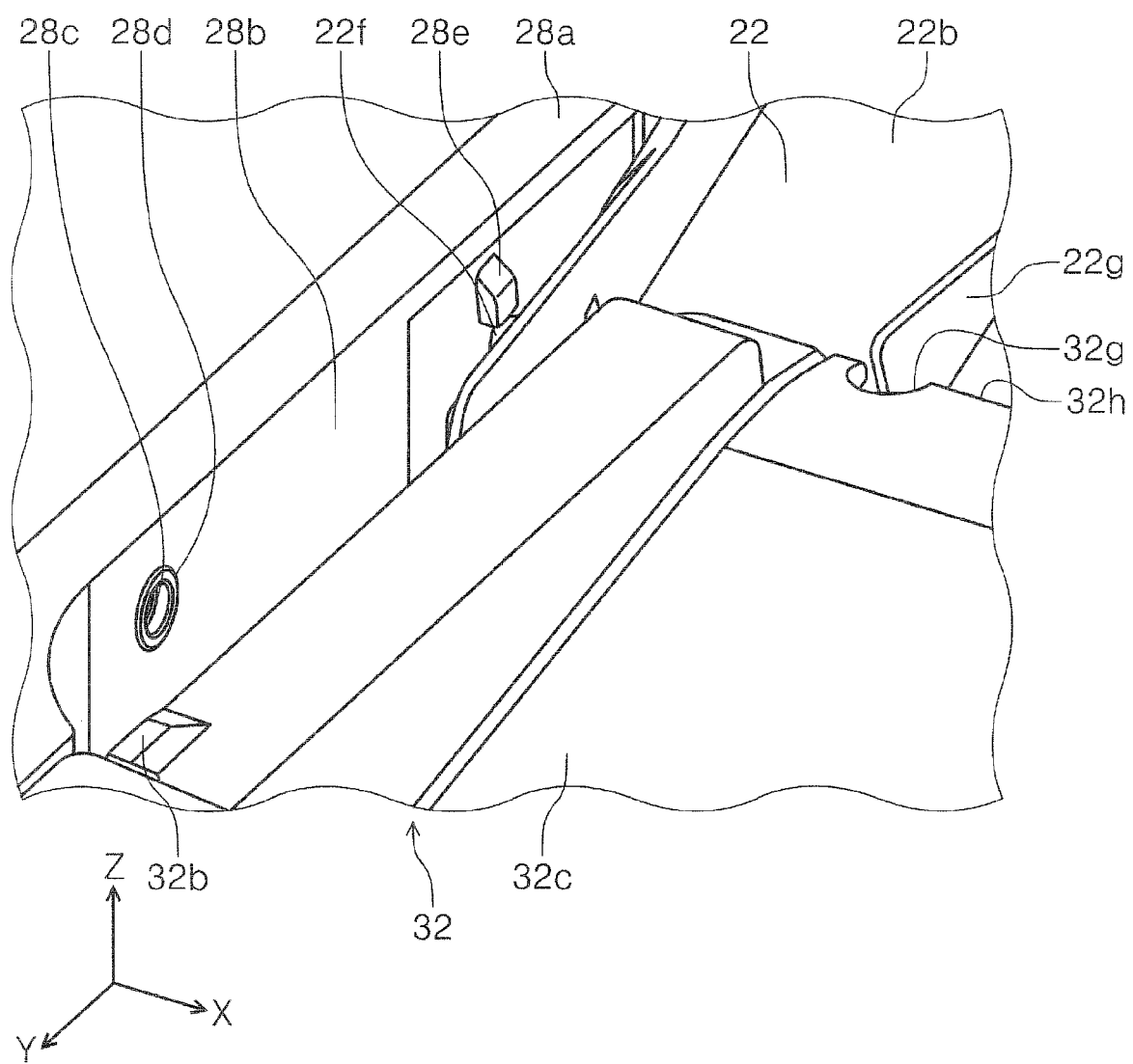
FIG. 10 is a perspective view of a positioning portion which is provided on the base frame and defines a posture in which the cover portion is open.
Figure 11:
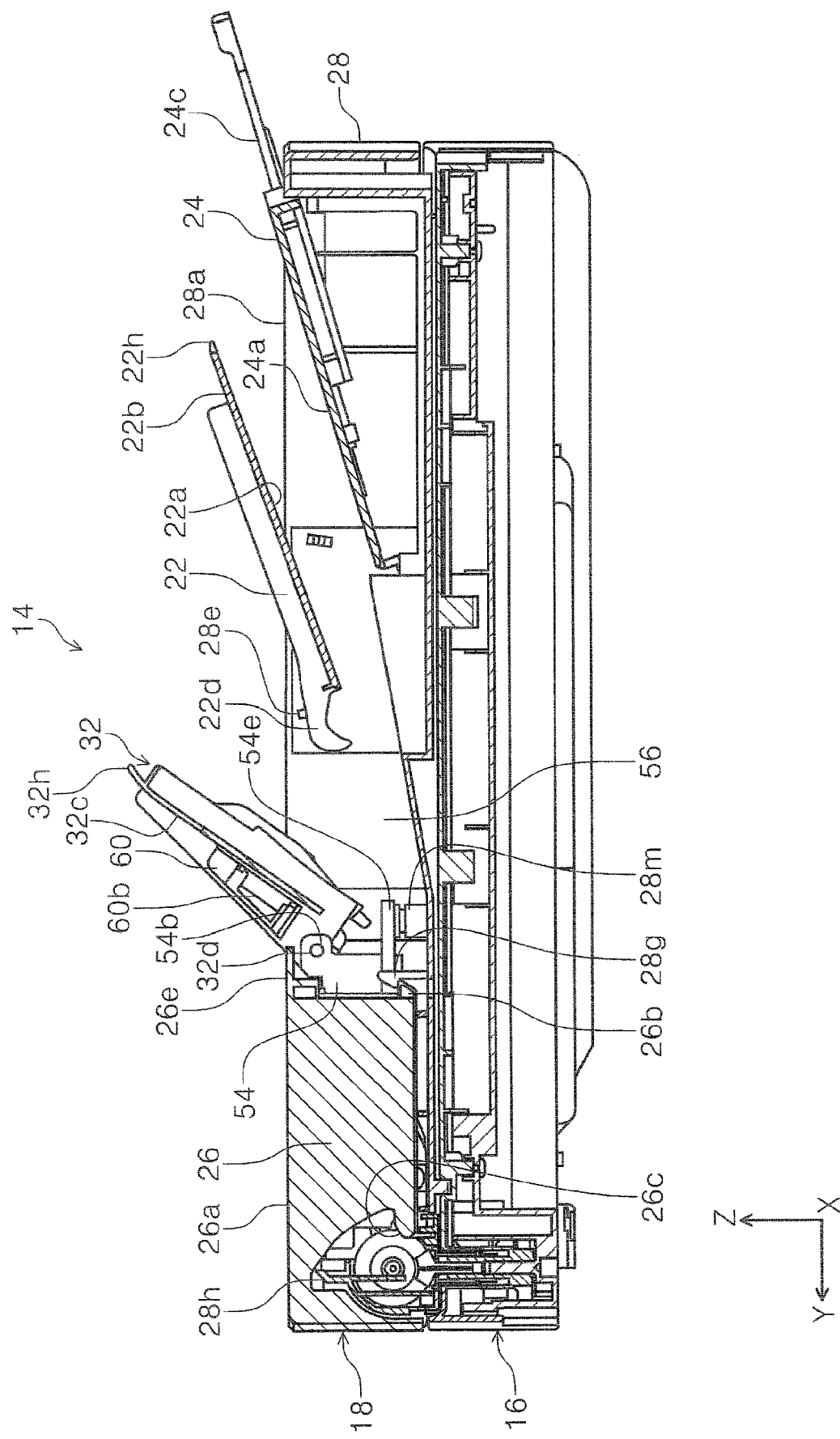
FIG. 11 is a lateral sectional diagram illustrating a rotational movement state of the document support portion.
Figure 12:
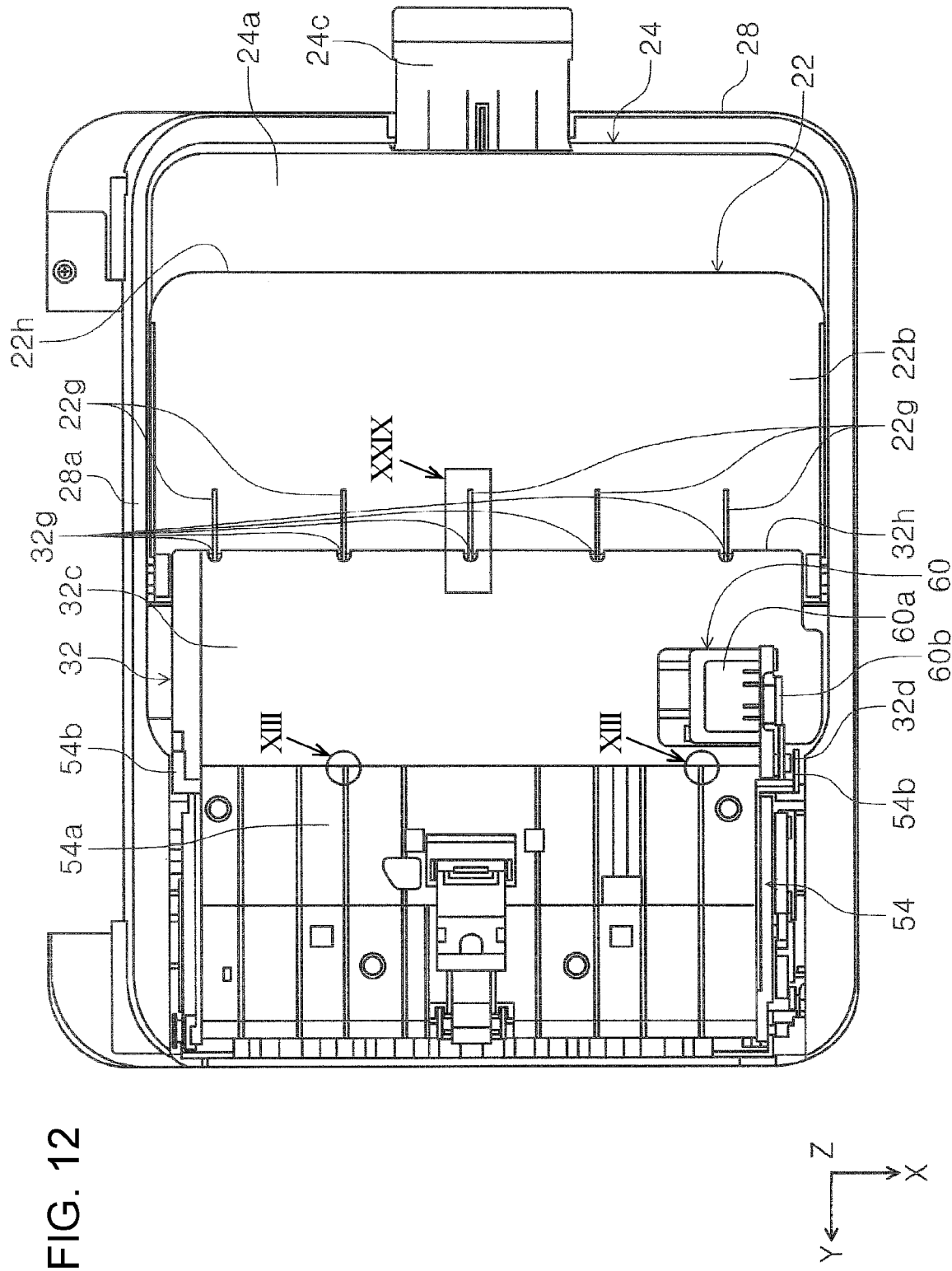
FIG. 12 is a plan view illustrating the relationship between the document support portion, the cover portion, and a support frame in an ADF unit of the scanner.

FIG. 7 is a perspective view illustrating a support portion of a cover portion which is provided on the document support portion, FIG. 8 is a perspective view illustrating the support portion of the cover portion which is provided on the document support portion and a recessed portion which is provided in a base frame, FIG. 9 is a perspective view illustrating a rotational movement shaft and a convex portion of the cover portion, FIG. 10 is a perspective view of a positioning portion which is provided on the base frame and defines a posture in which the cover portion is open, FIG. 11 is a lateral sectional diagram illustrating a rotational movement state of the document support portion, and FIG. 12 is a plan view illustrating the relationship between the document support portion, the cover portion, and a support frame in an ADF unit of the scanner.

Figure 13:
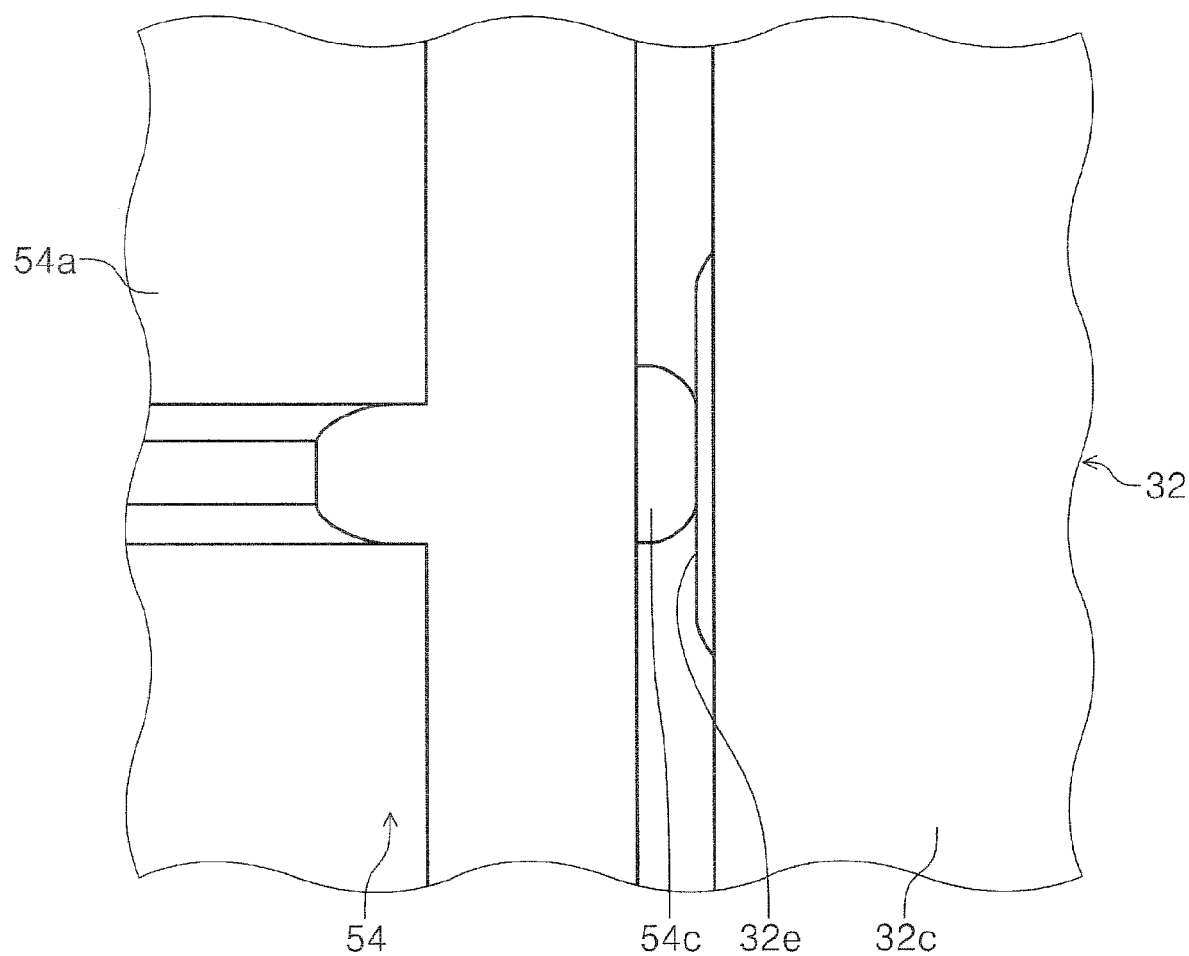
FIG. 13 is an enlarged view of an XIII portion of FIG. 12.
Figure 14:
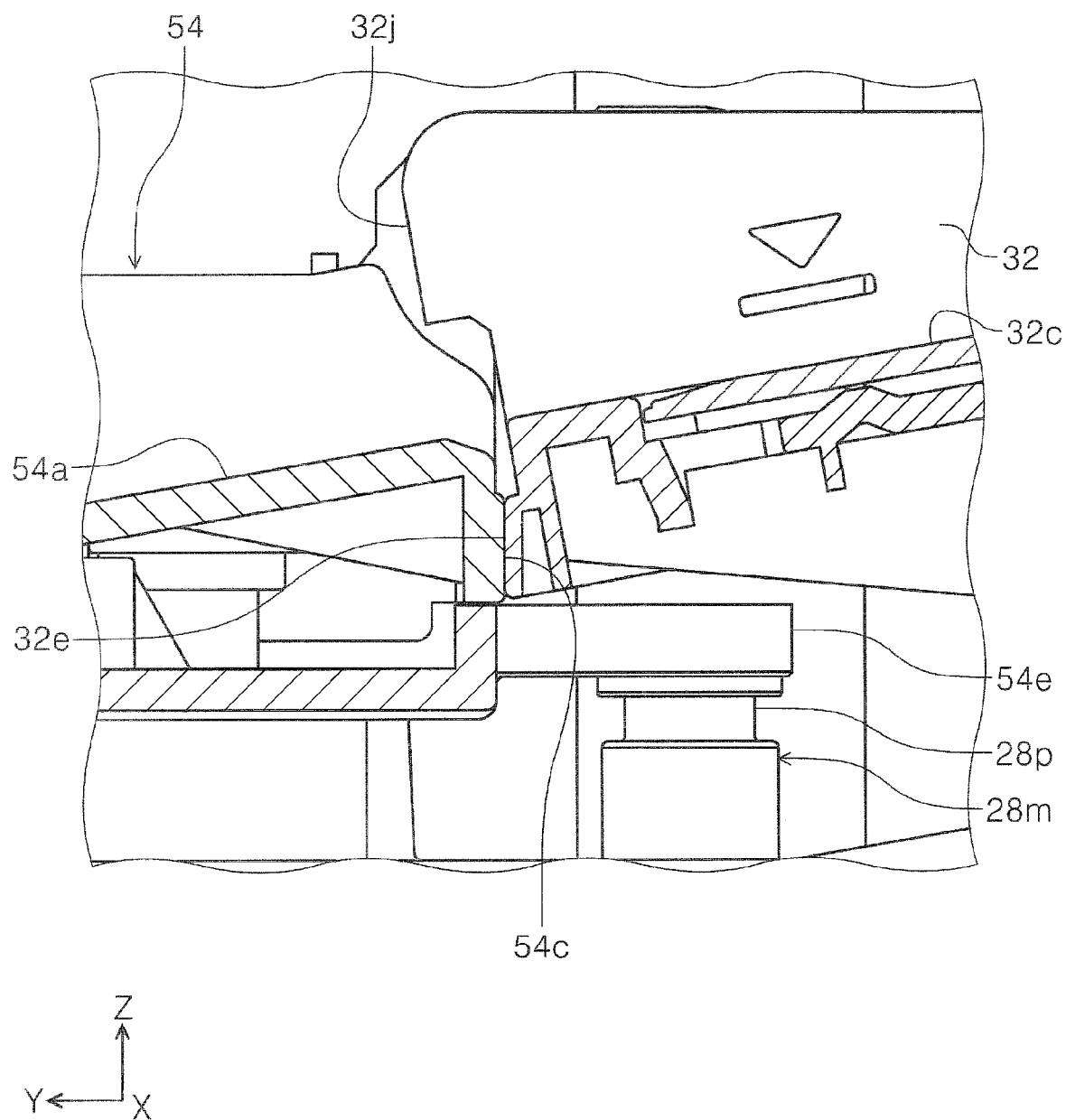
FIG. 14 is a lateral sectional diagram illustrating the relationship between the document support portion and the support frame.
Figure 15:
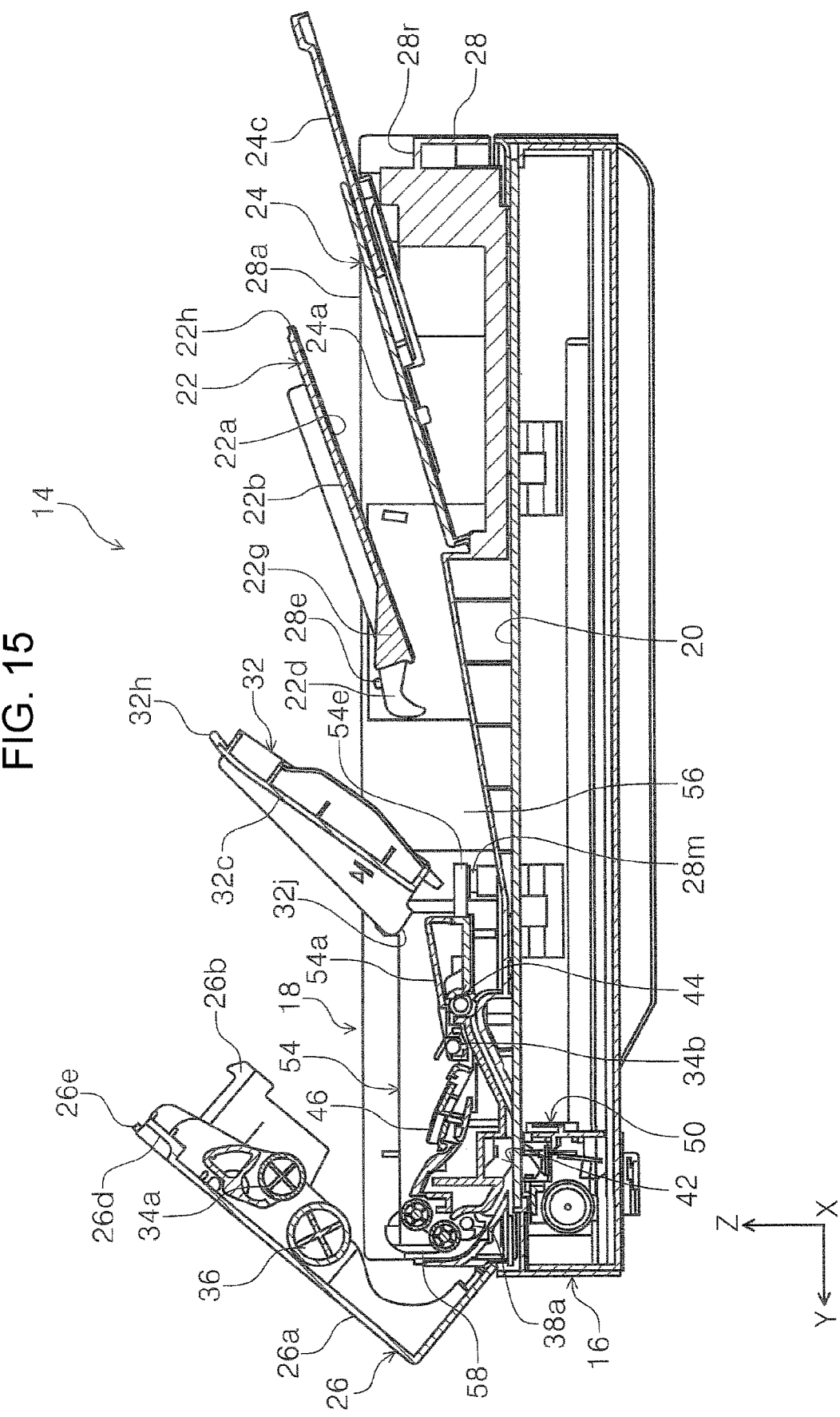
FIG. 15 is a lateral sectional diagram of a state in which a curved transport path forming member in the ADF unit is set to an open posture.
Figure 16:
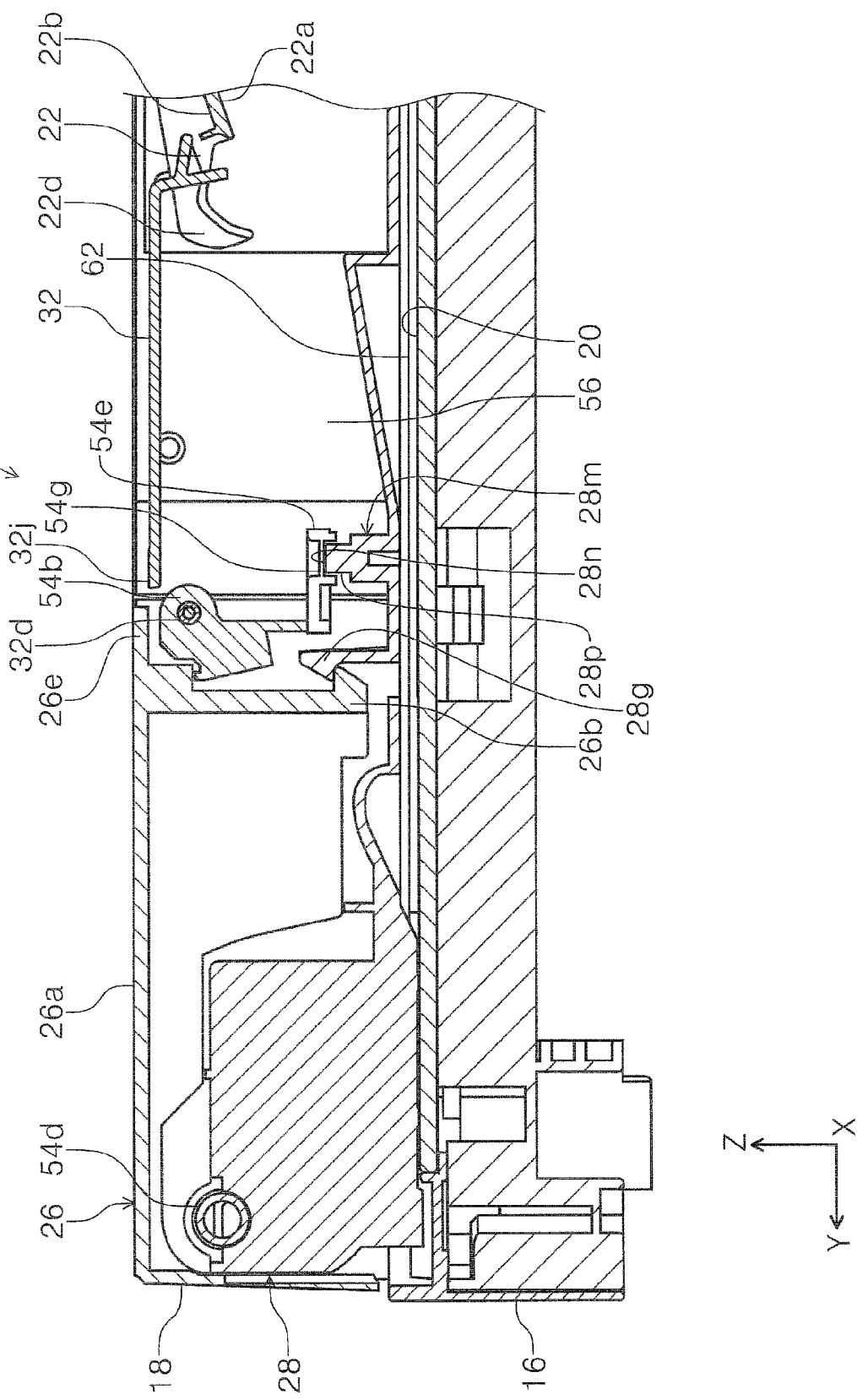
FIG. 16 is a lateral sectional diagram illustrating an engagement portion between the base frame and the curved transport path forming member.
Figure 17:
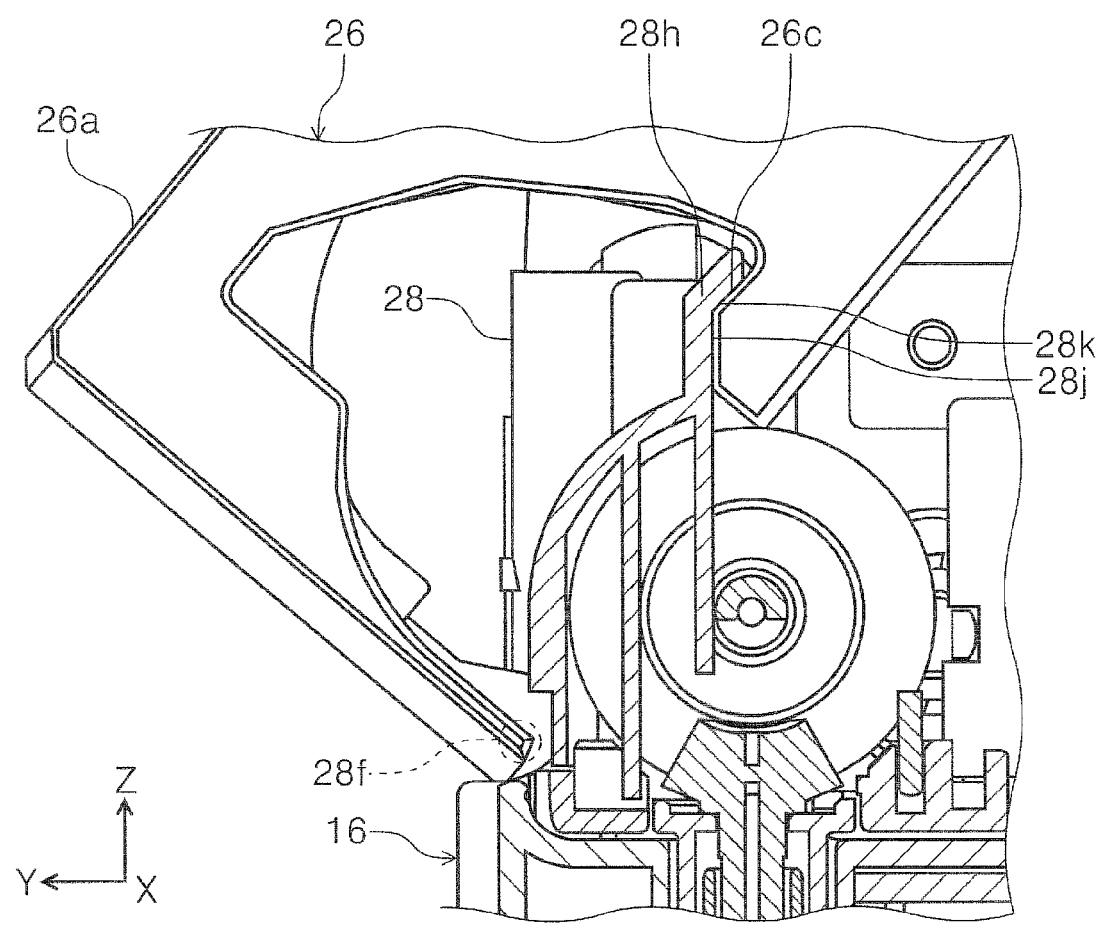
FIG. 17 is a side view illustrating a regulating portion which regulates an opening angle of the curved transport path forming member with respect to the base frame.
Figure 18:
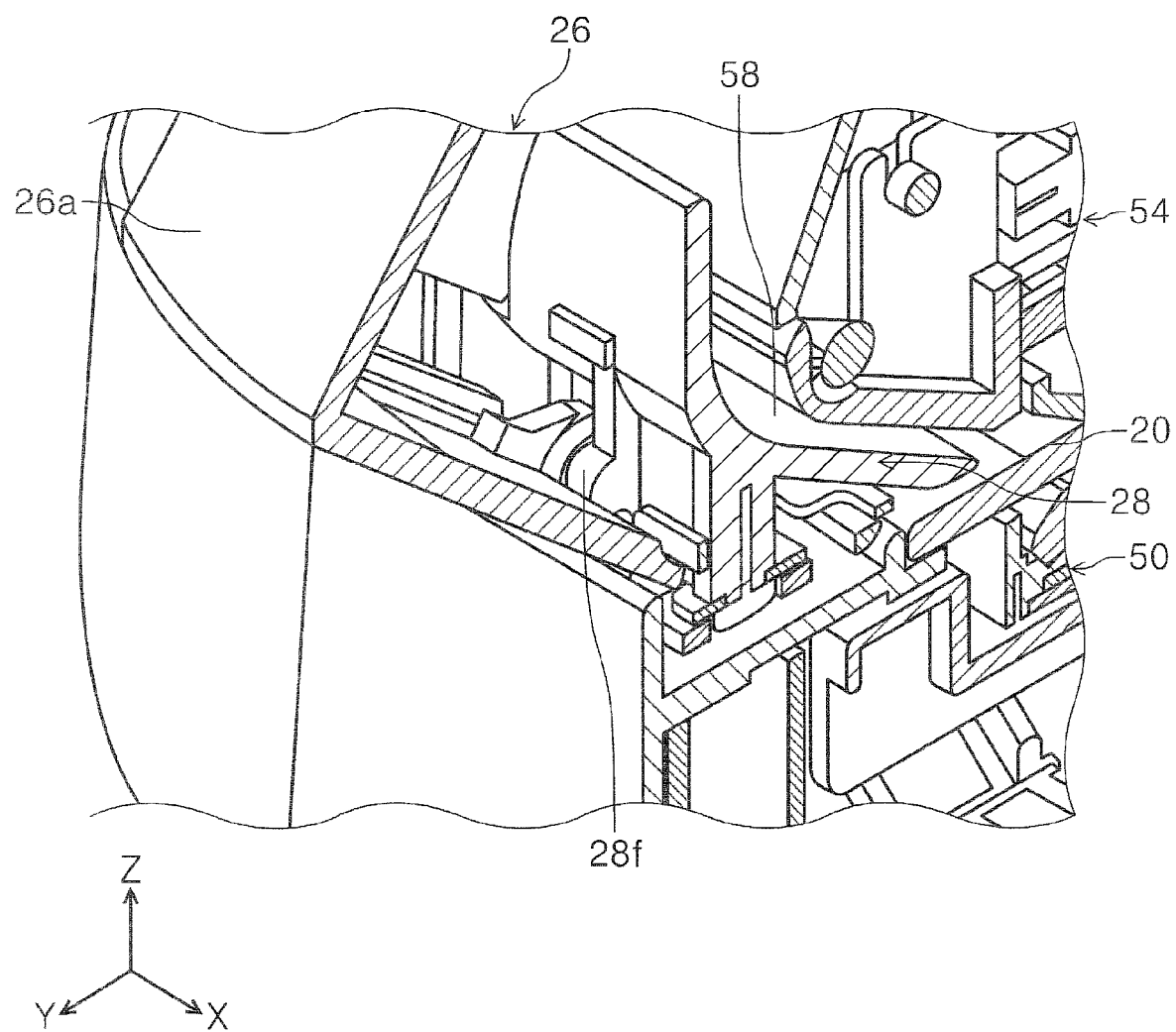
FIG. 18 is a perspective view illustrating a rotational movement shaft of the base frame with respect to the curved transport path forming member.
Figure 19:
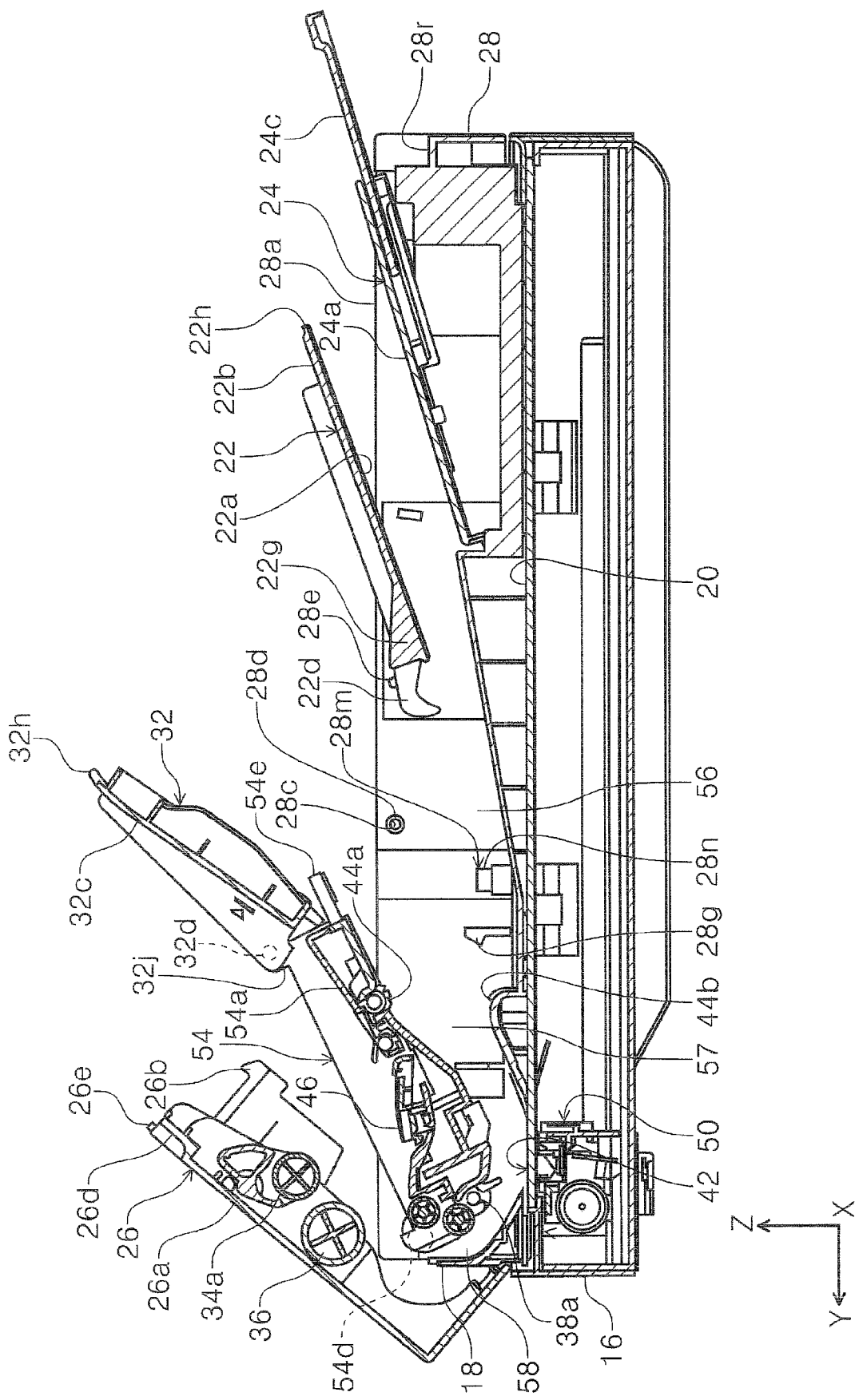
FIG. 19 is a lateral sectional diagram illustrating a state in which the support frame is set to an open posture in accordance with the document support portion in the ADF unit.

FIG. 13 is an enlarged view of an XIII portion of FIG. 12, FIG. 14 is a lateral sectional diagram illustrating the relationship between the document support portion and the support frame, FIG. 15 is a lateral sectional diagram of a state in which a curved transport path forming member in the ADF unit is set to an open posture, FIG. 16 is a lateral sectional diagram illustrating an engagement portion between the base frame and the curved transport path forming member, FIG. 17 is a side view illustrating a regulating portion which regulates an opening angle of the curved transport path forming member with respect to the base frame, FIG. 18 is a perspective view illustrating a rotational movement shaft of the base frame with respect to the curved transport path forming member, and FIG. 19 is a lateral sectional diagram illustrating a state in which the support frame is set to an open posture in accordance with the document support portion in the ADF unit.

Figure 20:
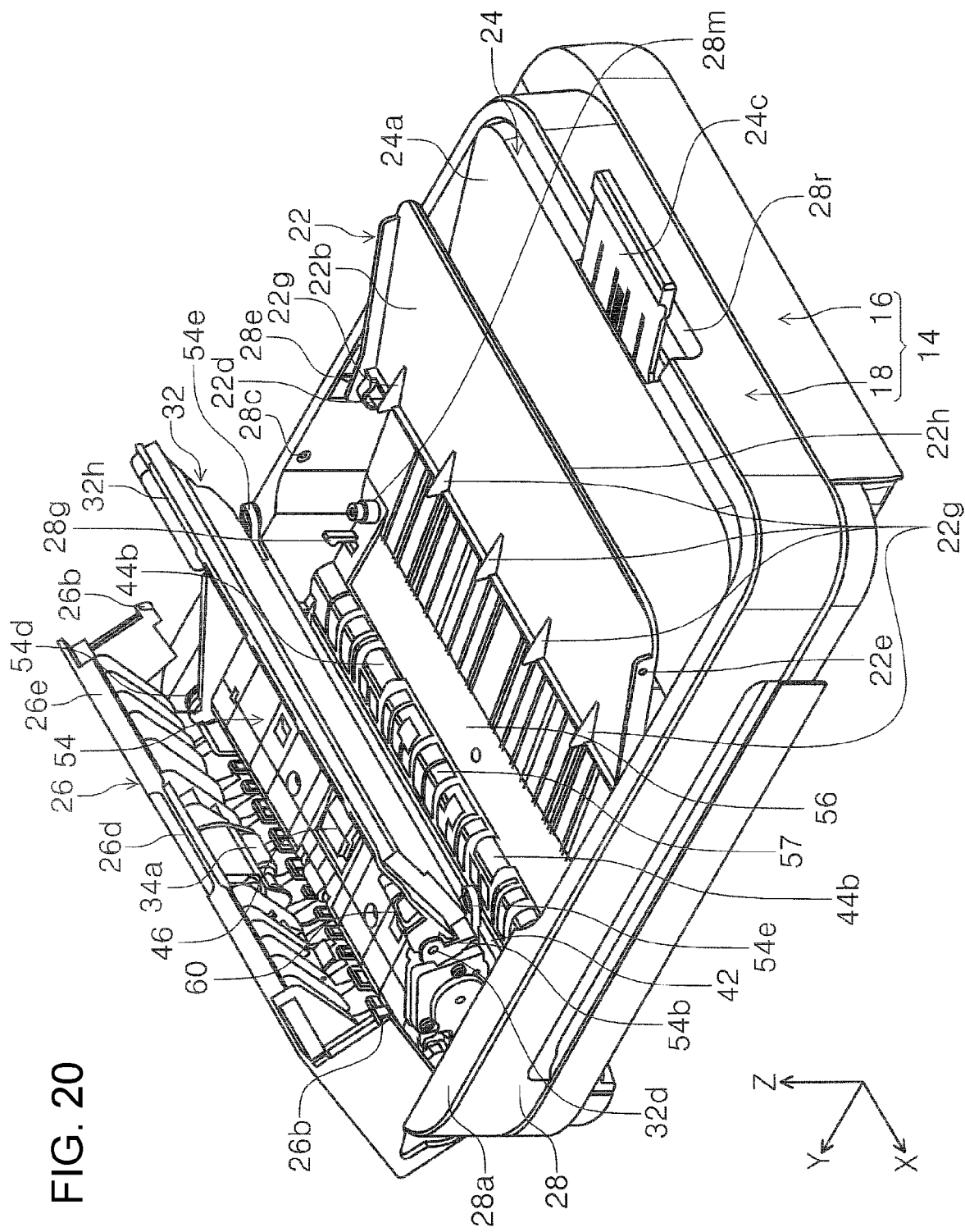
FIG. 20 is a perspective view of a state in which the support frame is set to an open posture in accordance with the document support portion in the ADF unit.
Figure 21:
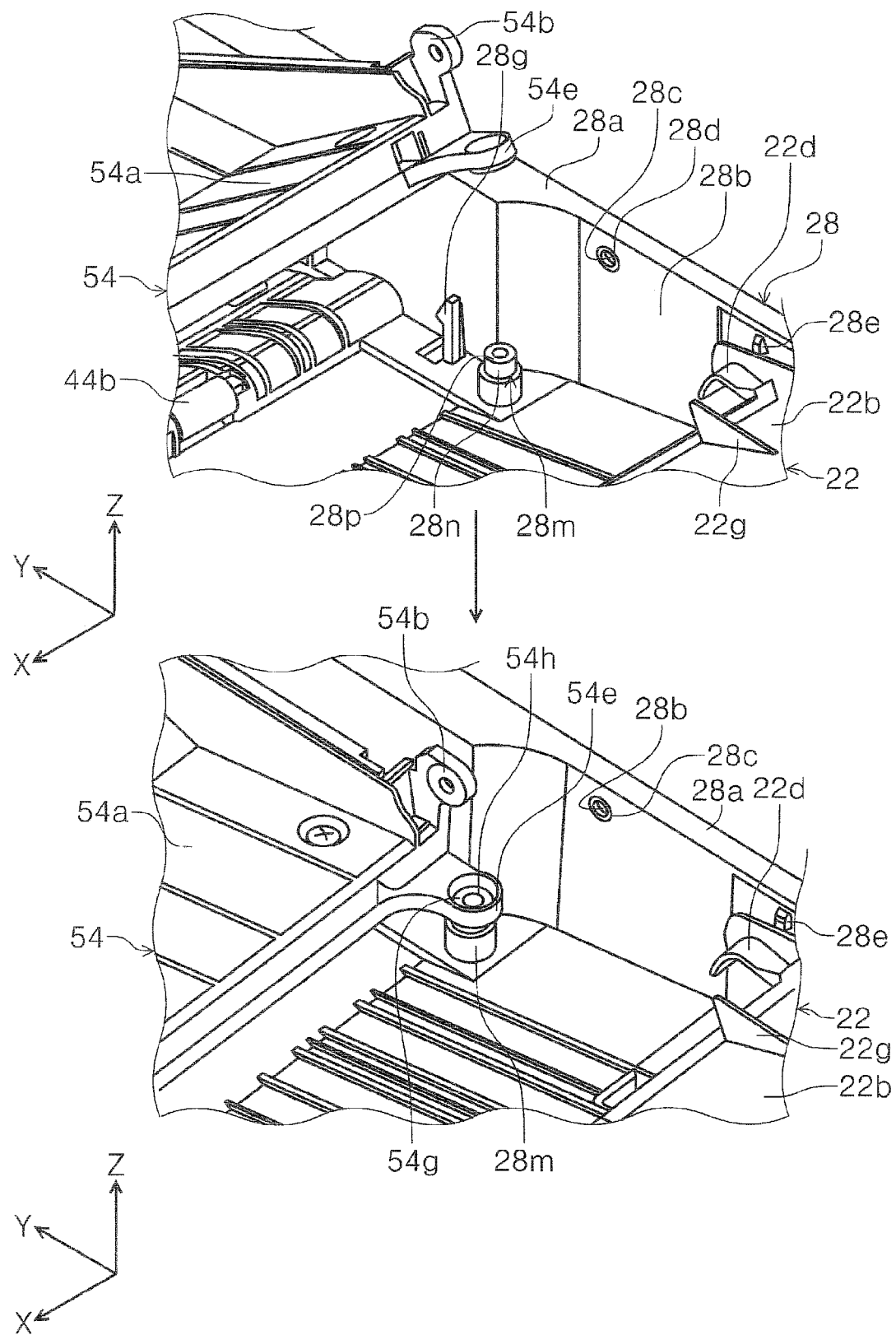
FIG. 21 is a perspective view illustrating a state of the positioning portion when the support frame is set to an open posture with respect to the base frame and a state of the positioning portion when the support frame is set to a closed posture.
Figure 22:
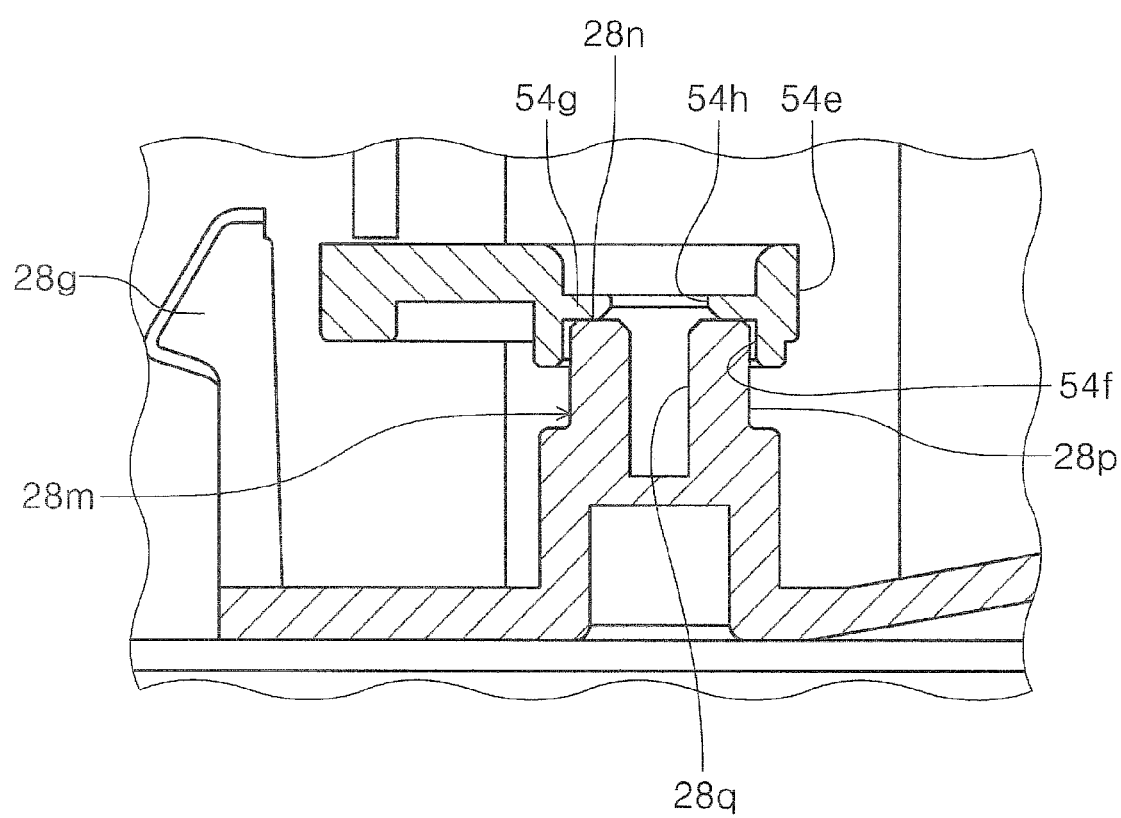
FIG. 22 is a lateral sectional diagram of the positioning portion in a posture in which the support frame is closed with respect to the base frame.
Figure 23:
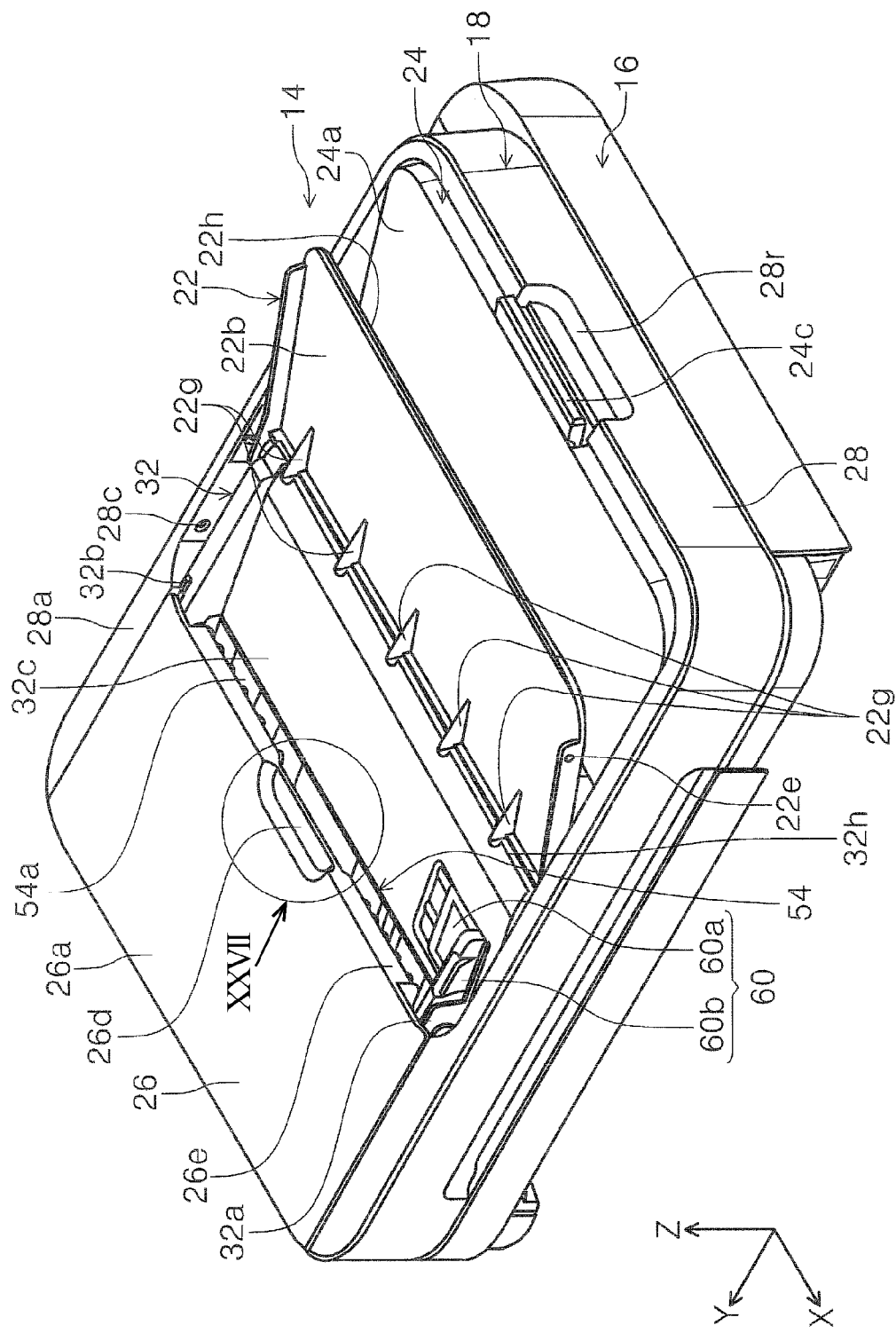
FIG. 23 is a perspective view illustrating the usage state of the ADF unit of the scanner while an auxiliary output tray is not in use.
Figure 24:
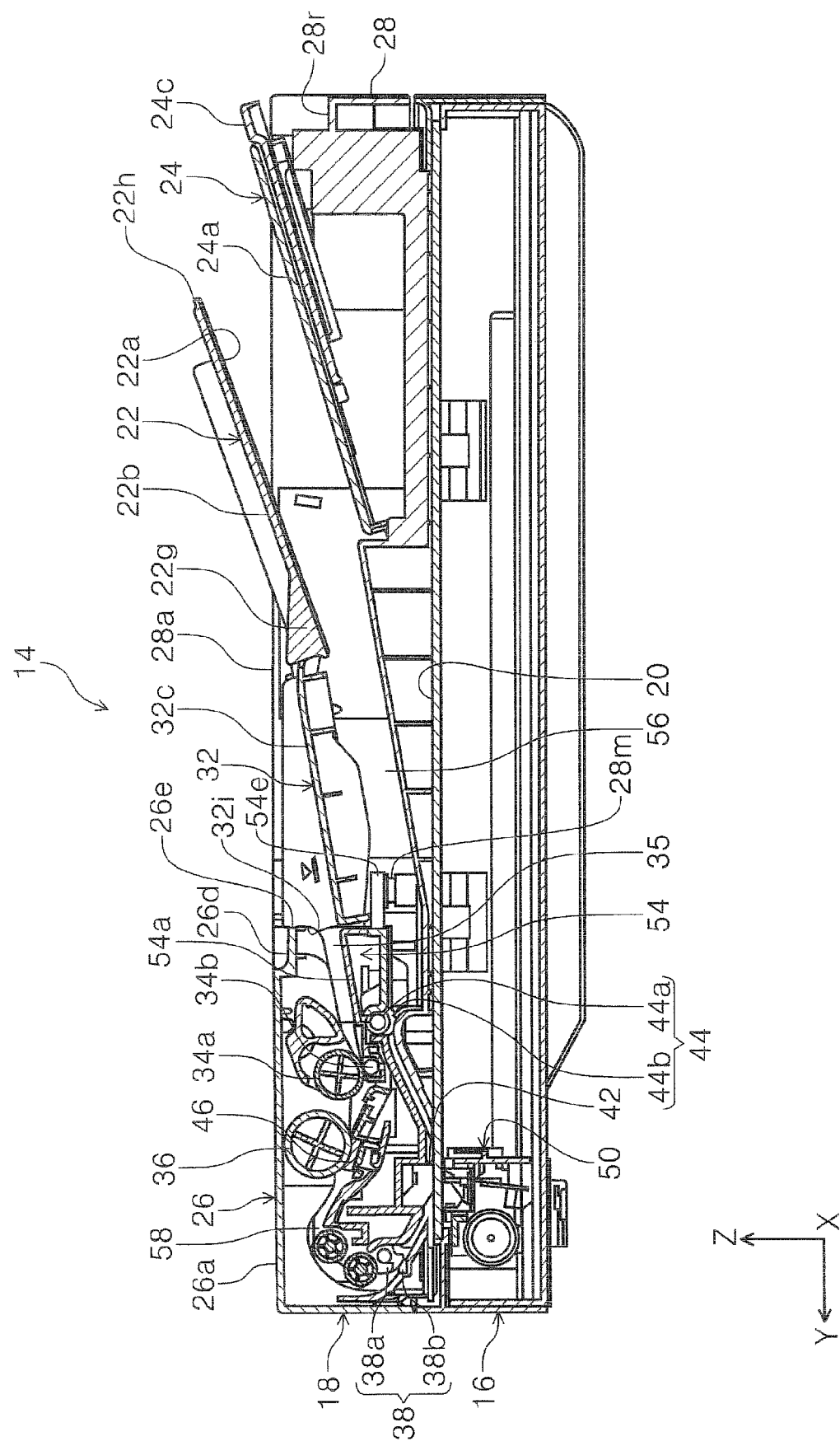
FIG. 24 is a lateral sectional diagram of the ADF unit while the auxiliary output tray is not in use.
Figure 25:
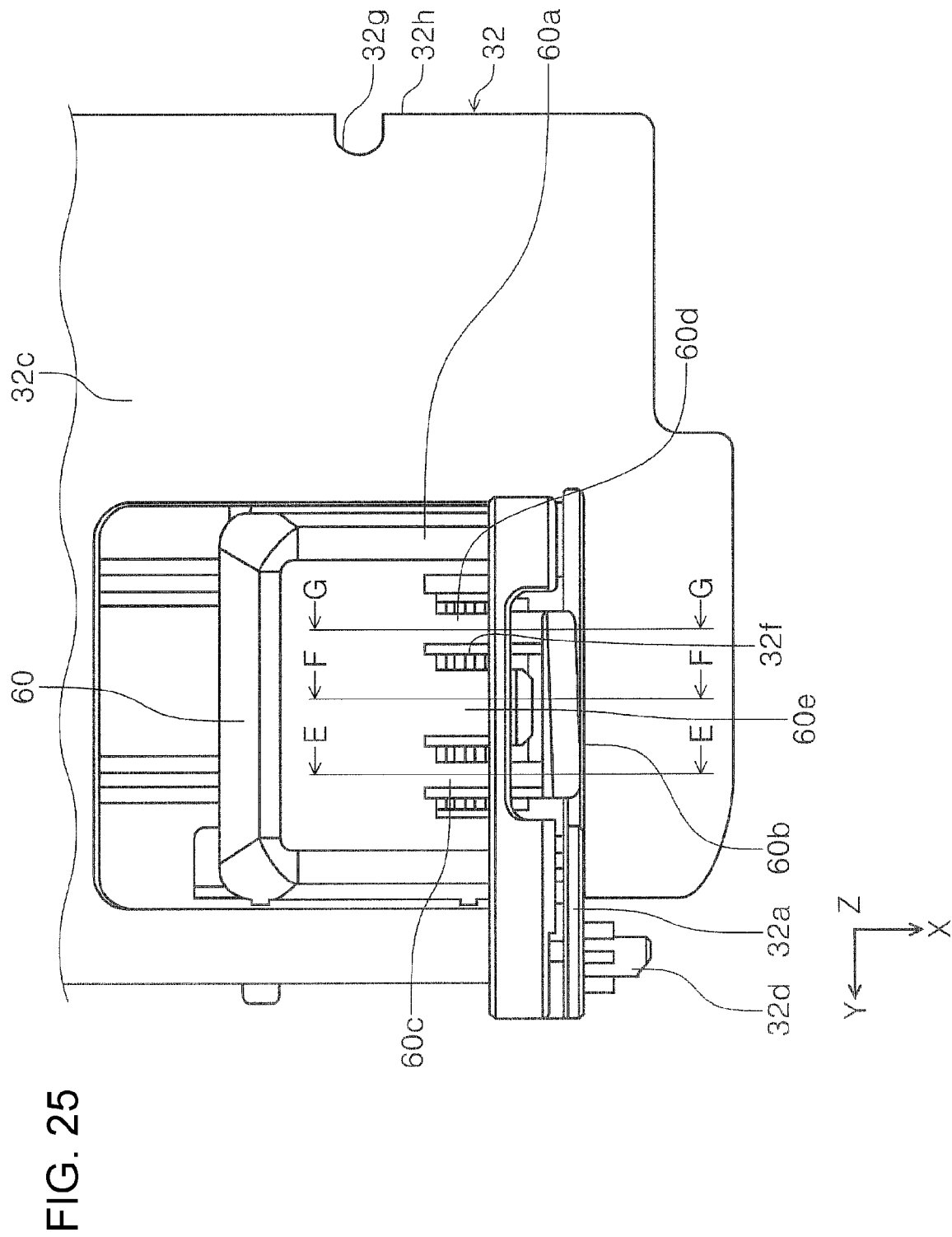
FIG. 25 is a plan view of an edge guide of the document support portion.

FIG. 20 is a perspective view of a state in which the support frame is set to an open posture in accordance with the document support portion in the ADF unit, FIG. 21 is a perspective view illustrating a state of the positioning portion when the support frame is set to an open posture with respect to the base frame and a state of the positioning portion when the support frame is set to a closed posture, FIG. 22 is a lateral sectional diagram of the positioning portion in a posture in which the support frame is closed with respect to the base frame, FIG. 23 is a perspective view illustrating the usage state of the ADF unit of the scanner while an auxiliary output tray is not in use, FIG. 24 is a lateral sectional diagram of the ADF unit while the auxiliary output tray is not in use, and FIG. 25 is a plan view of an edge guide of the document support portion.

Figure 26:
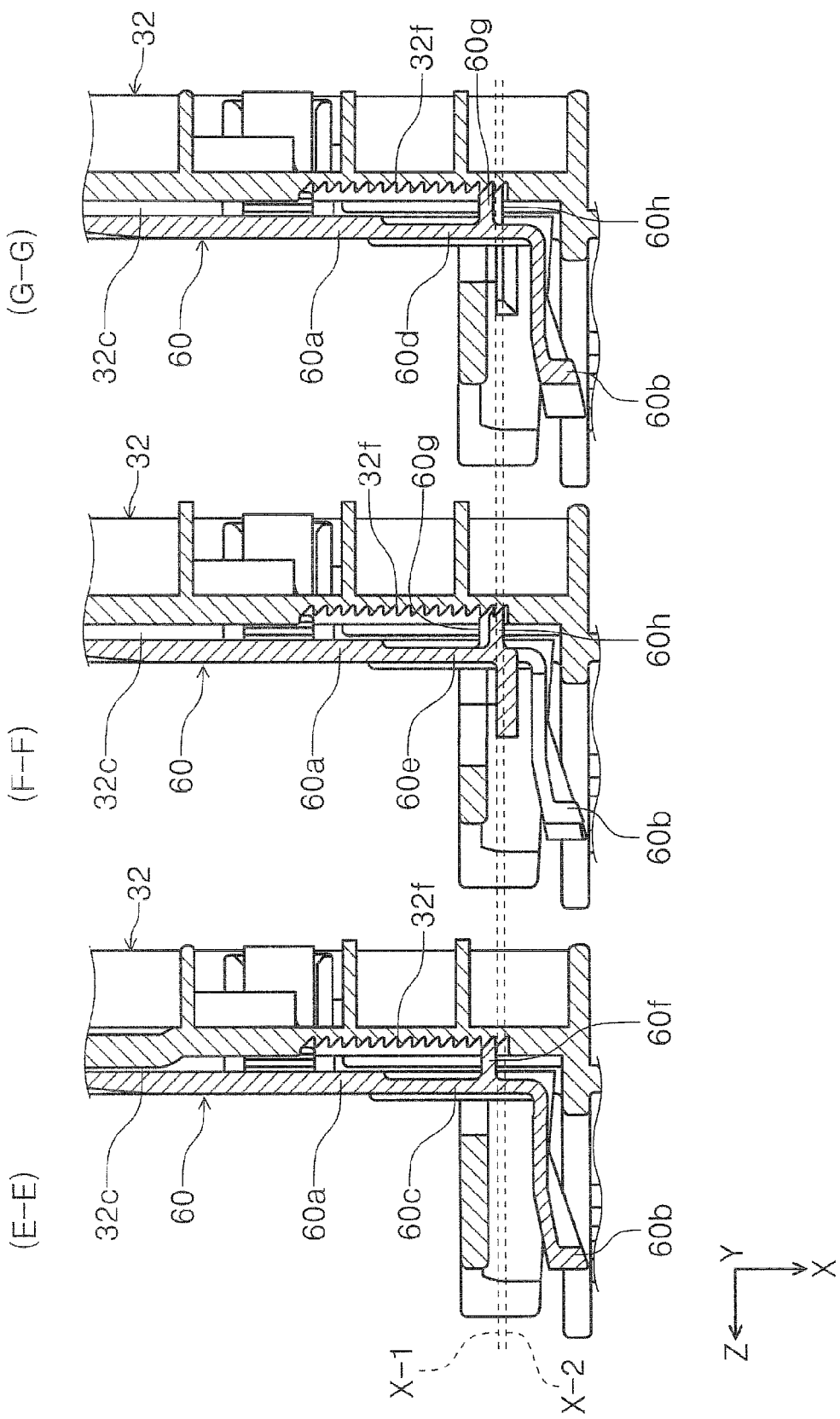
FIG. 26 is a sectional diagram taken along lines E-E, F-F, and G-G in FIG. 25.
Figure 27:
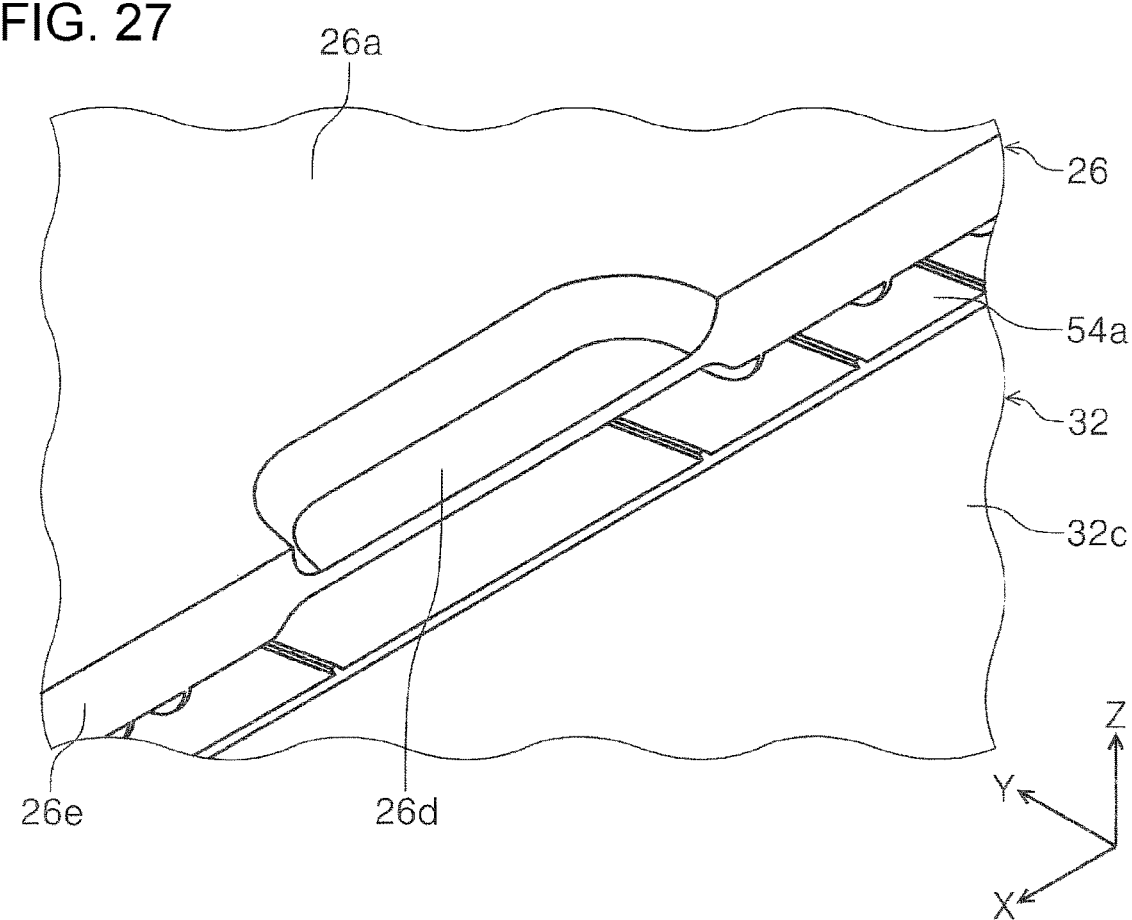
FIG. 27 is an enlarged view of an XXVII portion of FIG. 23.
Figure 28:
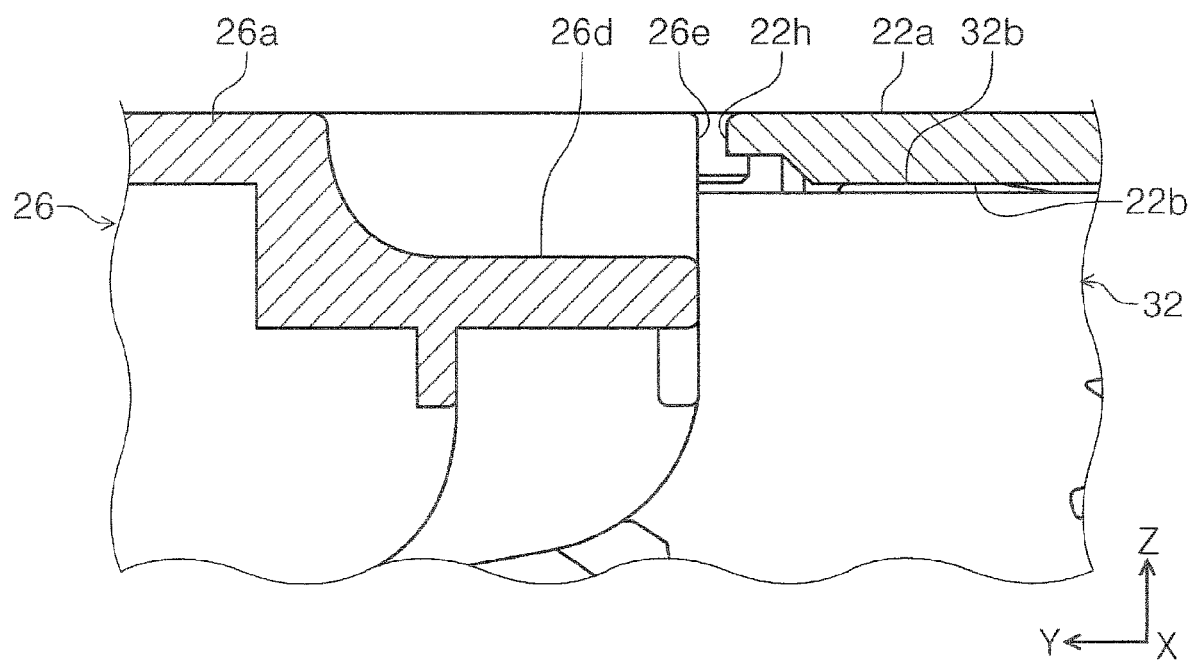
FIG. 28 is a lateral sectional diagram of a line XXVIII-XXVIII of FIG. 1.
Figure 29:
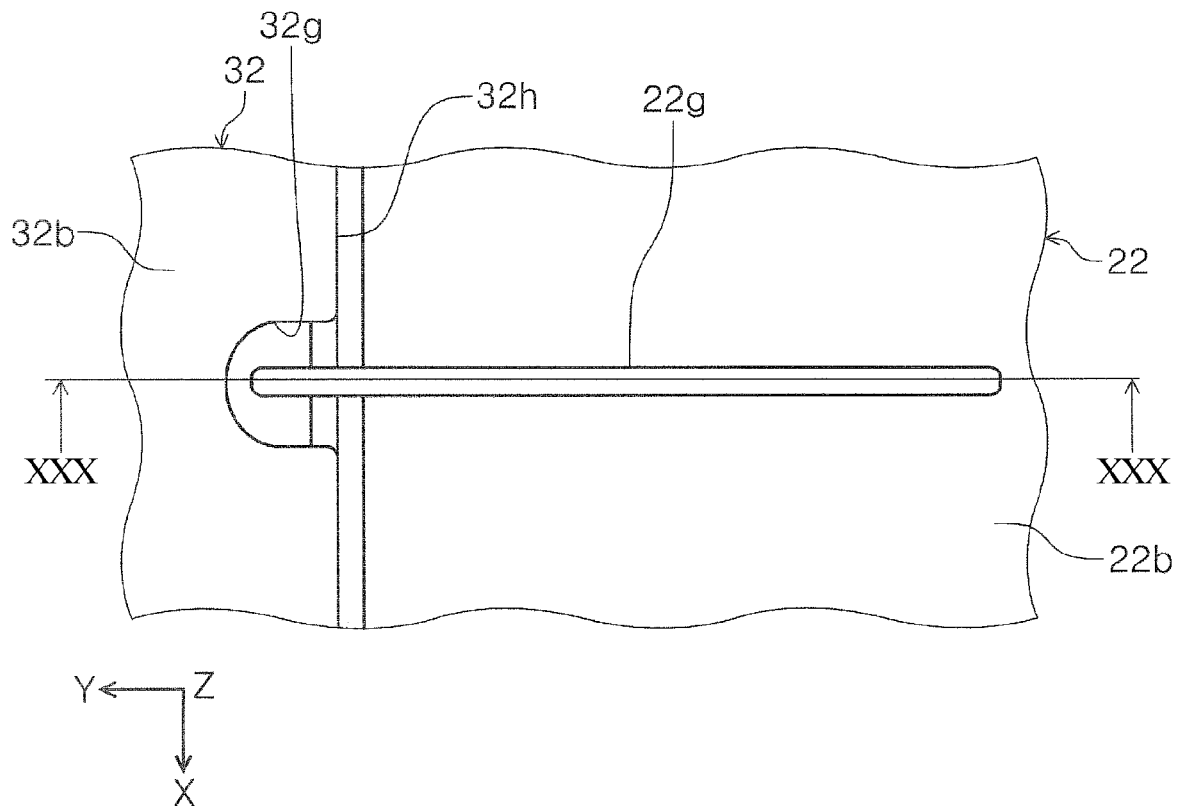
FIG. 29 is an enlarged view of an XXIX portion of FIG. 12.
Figure 30:
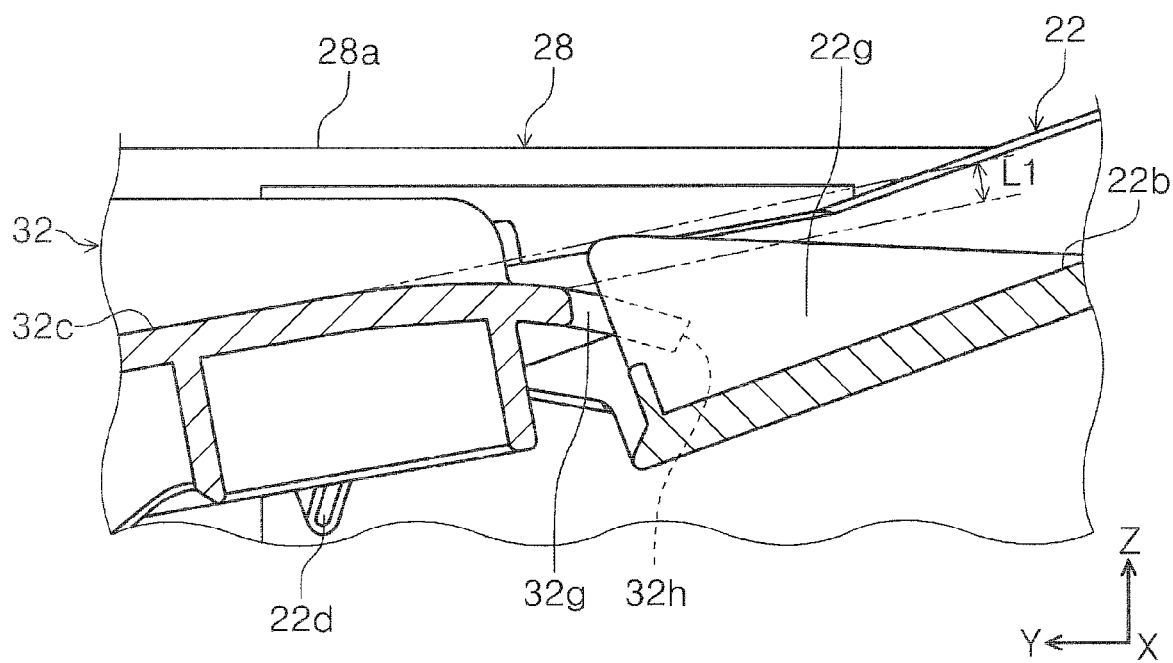
FIG. 30 is a lateral sectional diagram taken along a line XXX-XXX of FIG. 29.
Figure 31:
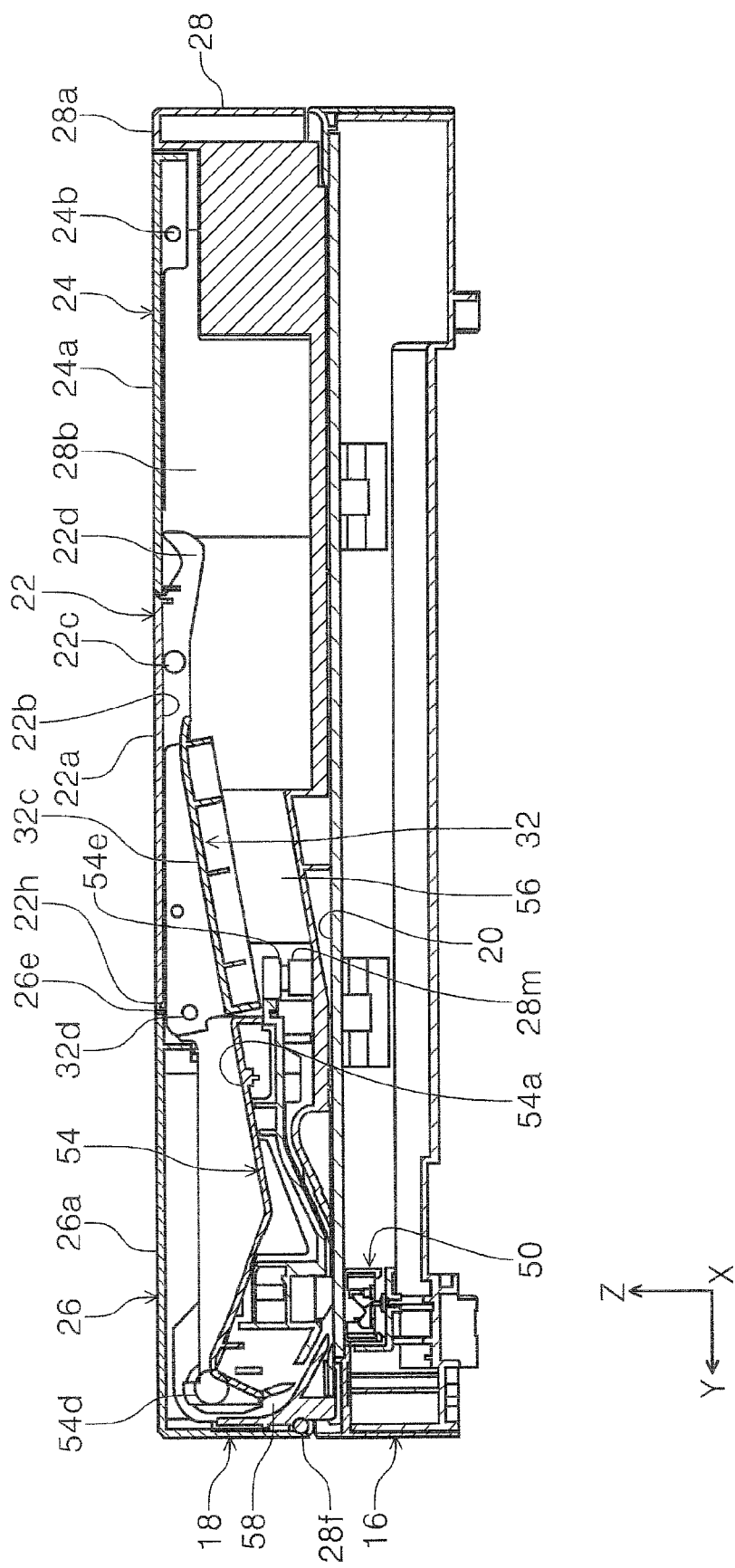
FIG. 31 is a side view explaining the relationship between the rotational movement shafts of the document support portion, the cover portion, the support frame, the curved transport path forming member, and the output tray in the ADF unit.
Figure 32:
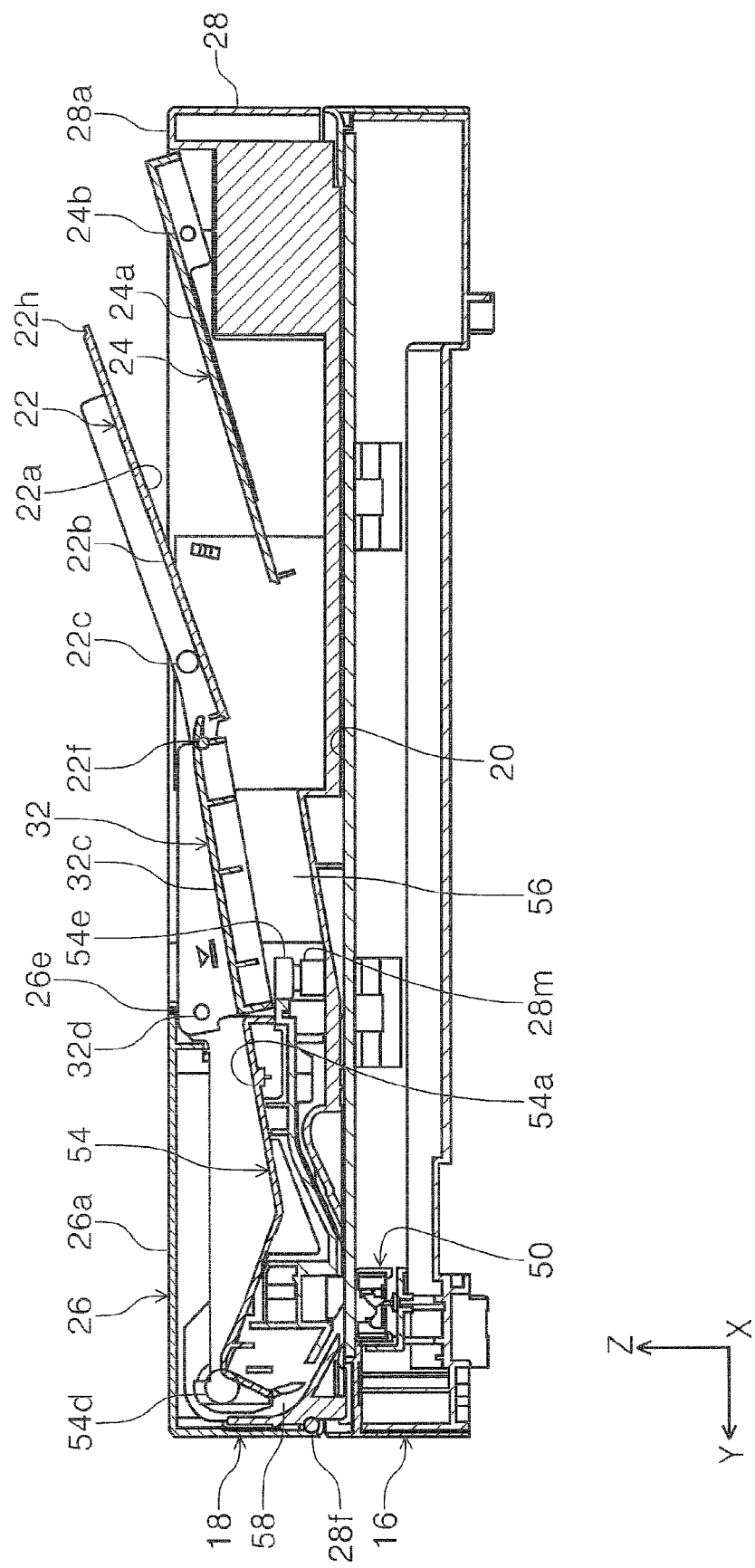
FIG. 32 is a side view explaining the relationship between the rotational movement shafts of the document support portion, the cover portion, the support frame, the curved transport path forming member, and the output tray in the ADF unit.

FIG. 26 is a sectional diagram taken along lines E-E, F-F, and G-G in FIG. 25, FIG. 27 is an enlarged view of an XXVII portion of FIG. 23, FIG. 28 is a lateral sectional diagram of a line XXVIII-XXVIII of FIG. 1, FIG. 29 is an enlarged view of an XXIX portion of FIG. 12, FIG. 30 is a lateral sectional diagram taken along a line XXX-XXX of FIG. 29, FIG. 31 is a side view explaining the relationship between the rotational movement shafts of the document support portion, the cover portion, the support frame, the curved transport path forming member, and the output tray in the ADF unit, and FIG. 32 is a side view explaining the relationship between the rotational movement shafts of the document support portion, the cover portion, the support frame, the curved transport path forming member, and the output tray in the ADF unit.

Figure 33:
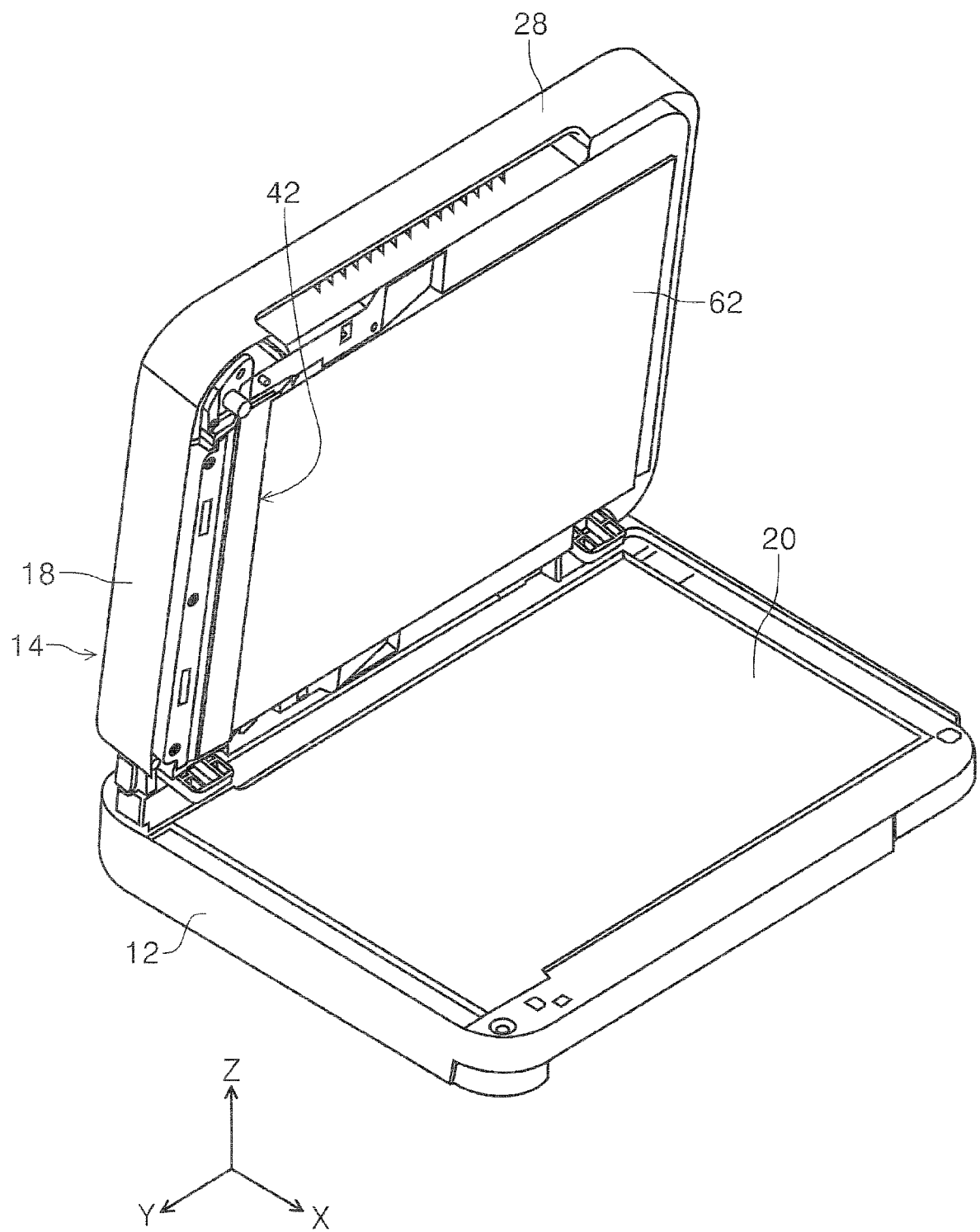
FIG. 33 is a perspective view illustrating a state in which the ADF unit is rotationally moved in the scanner.
Figure 34:
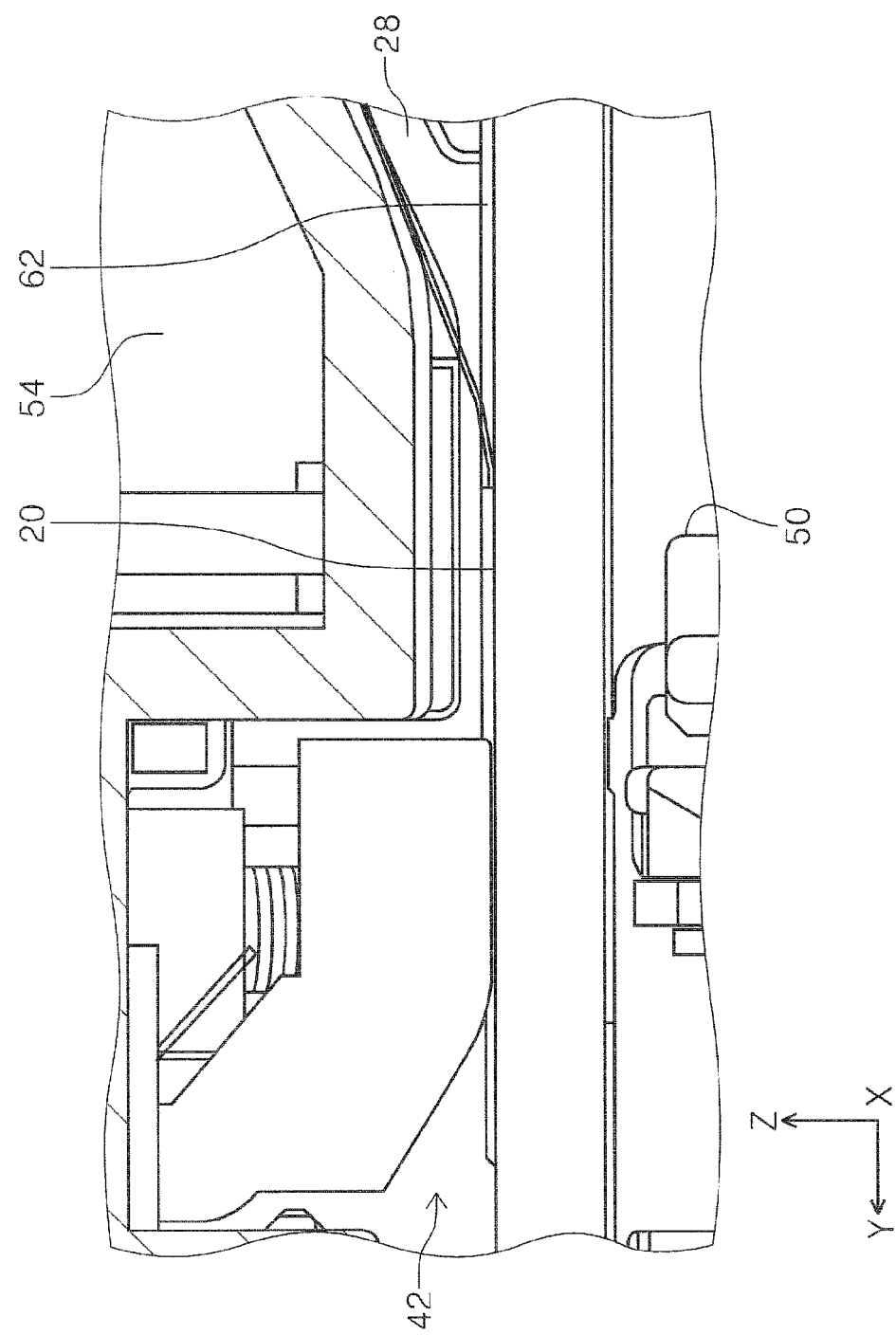
FIG. 34 is a lateral sectional diagram illustrating the relationship between a document retaining member and the base frame.
Figure 35:
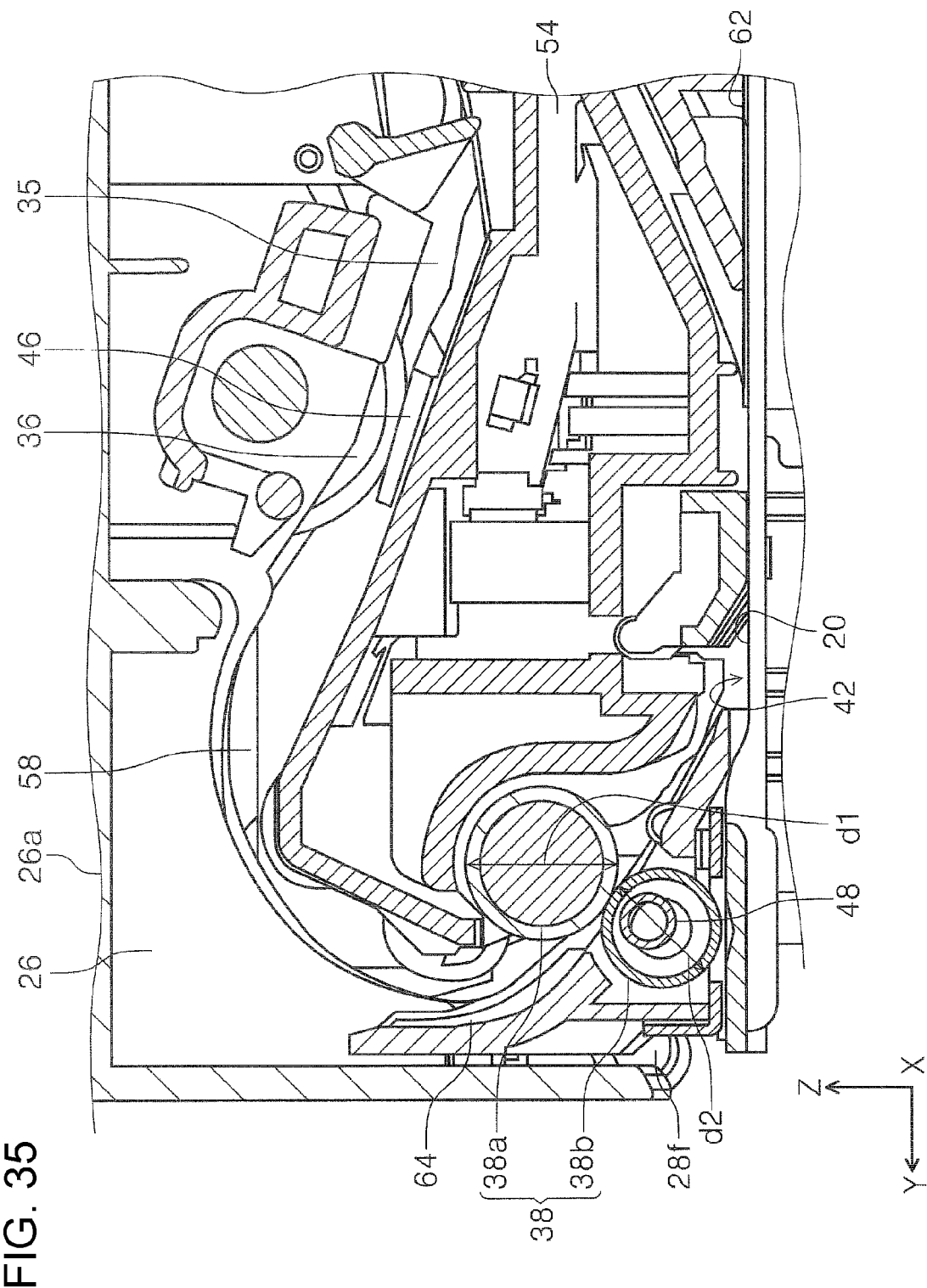
FIG. 35 is a lateral sectional diagram illustrating the periphery of a document reading unit of the document transport path.
Figure 36:
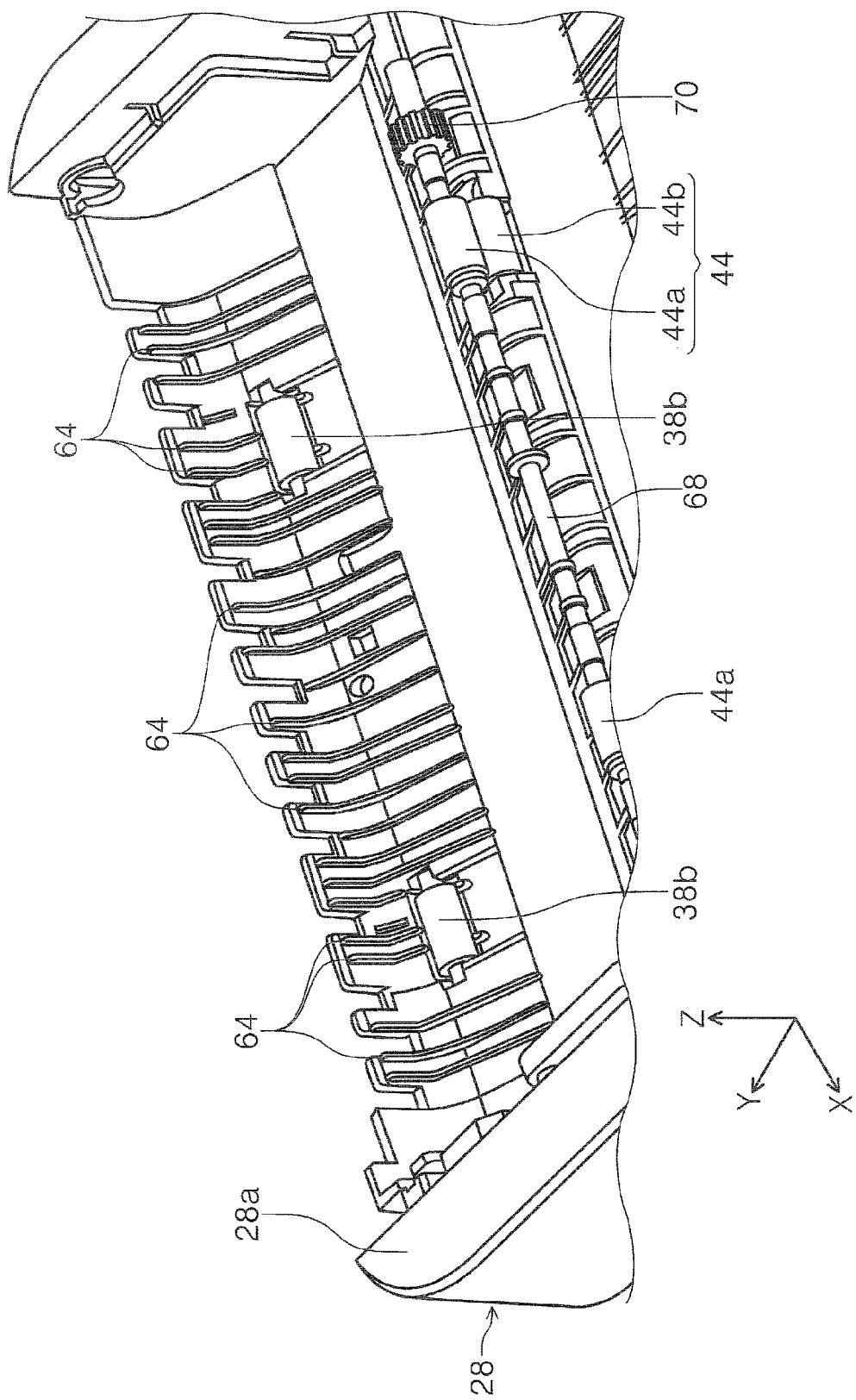
FIG. 36 is a perspective view illustrating ribs which are provided on the base frame.
Figure 37:
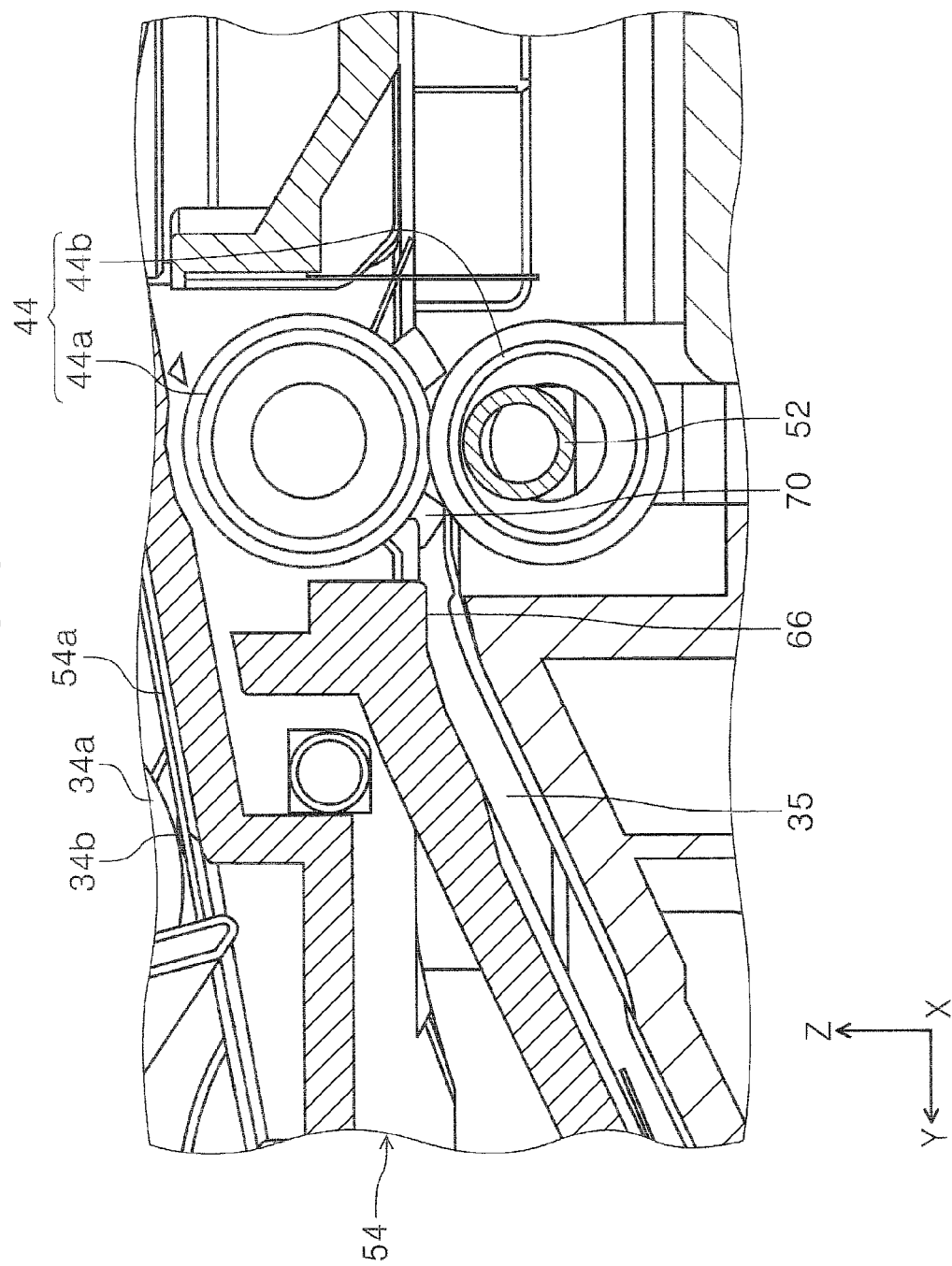
FIG. 37 is a lateral sectional diagram illustrating the periphery of an output roller pair of the document transport path.
Figure 38:
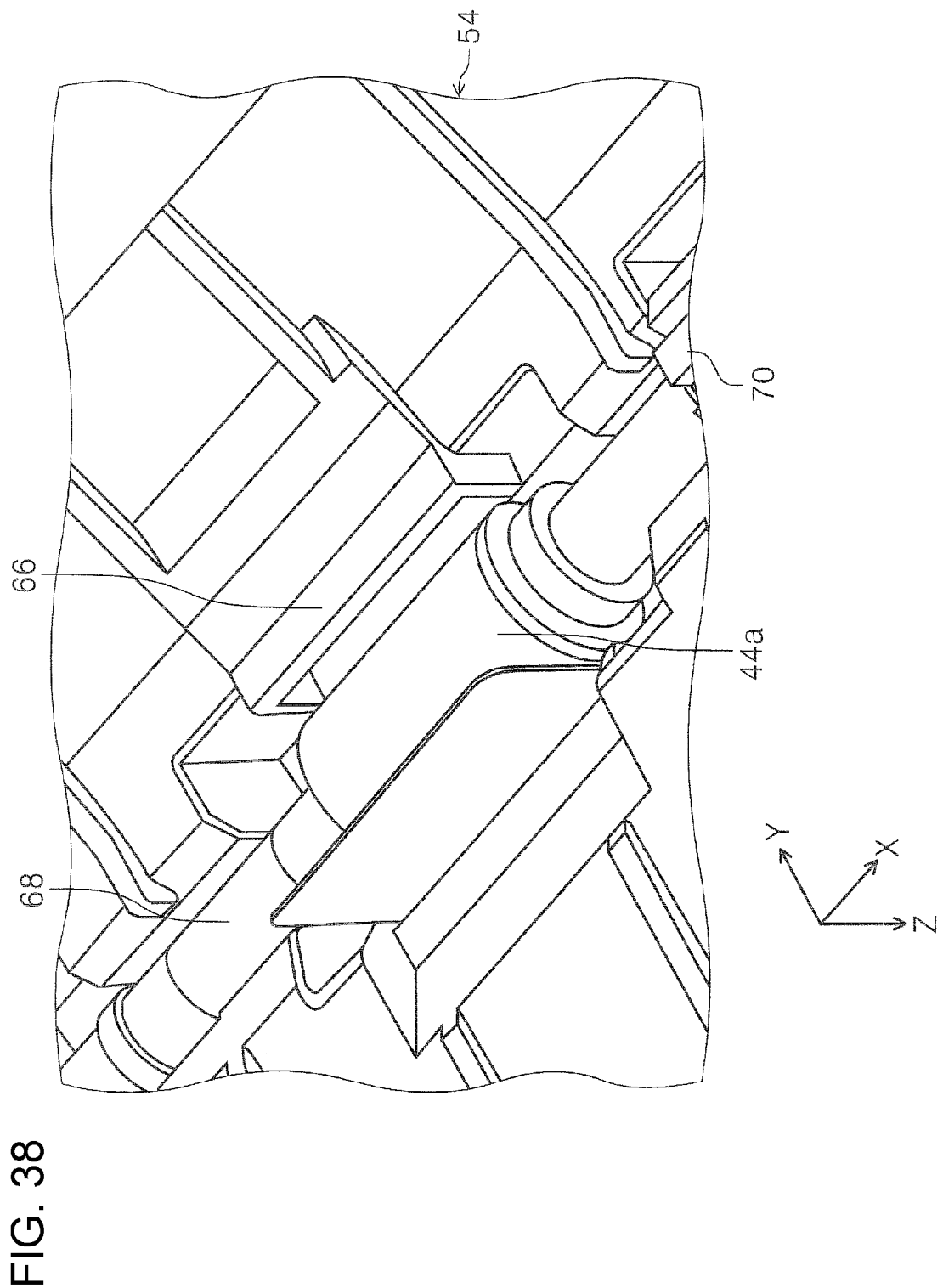
FIG. 38 is a perspective view of the output drive roller as viewed from the bottom side.

FIG. 33 is a perspective view illustrating a state in which the ADF unit is rotationally moved in the scanner, FIG. 34 is a lateral sectional diagram illustrating the relationship between a document retaining member and the base frame, FIG. 35 is a lateral sectional diagram illustrating the periphery of a document reading unit of the document transport path, FIG. 36 is a perspective view illustrating ribs which are provided on the base frame, FIG. 37 is a lateral sectional diagram illustrating the periphery of an output roller pair of the document transport path, and FIG. 38 is a perspective view of the output drive roller as viewed from the bottom side.

Figure 39:
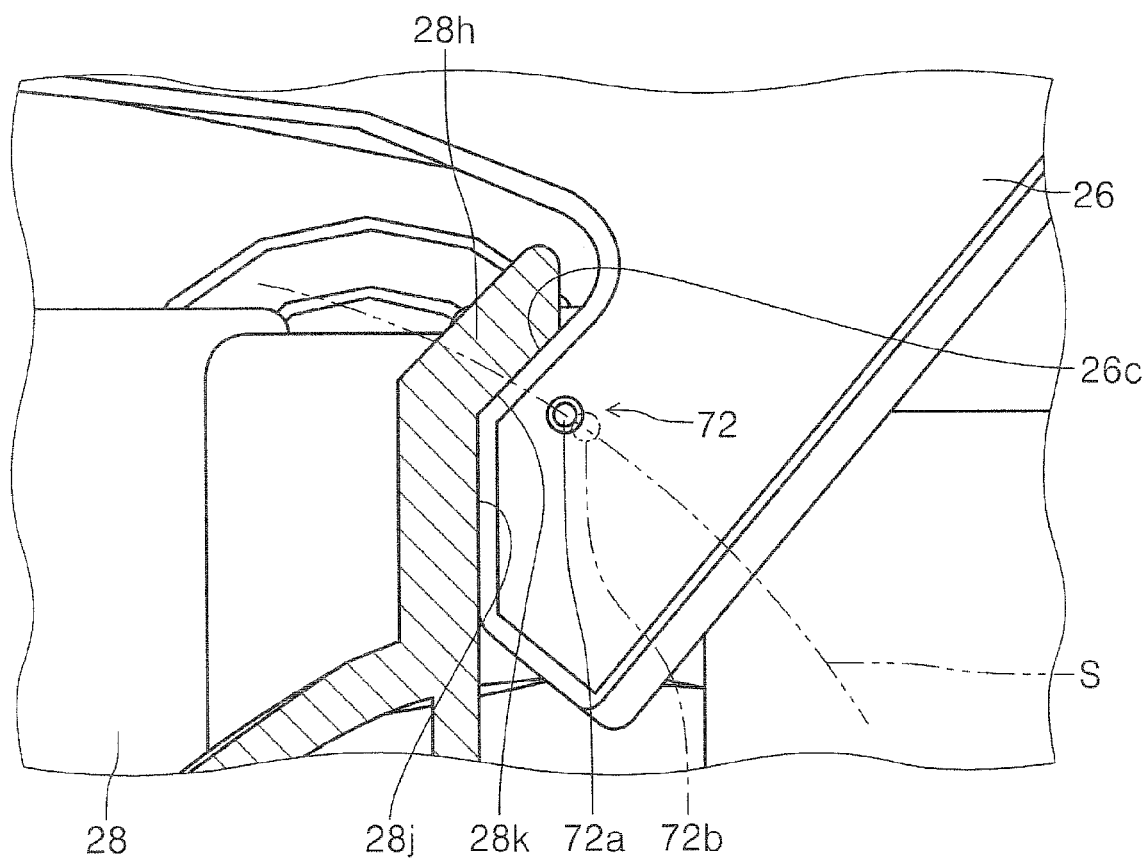
FIG. 39 is a side view illustrating a modification example of the regulating portion which regulates the opening angle of the curved transport path forming member with respect to the base frame.
Figure 40:
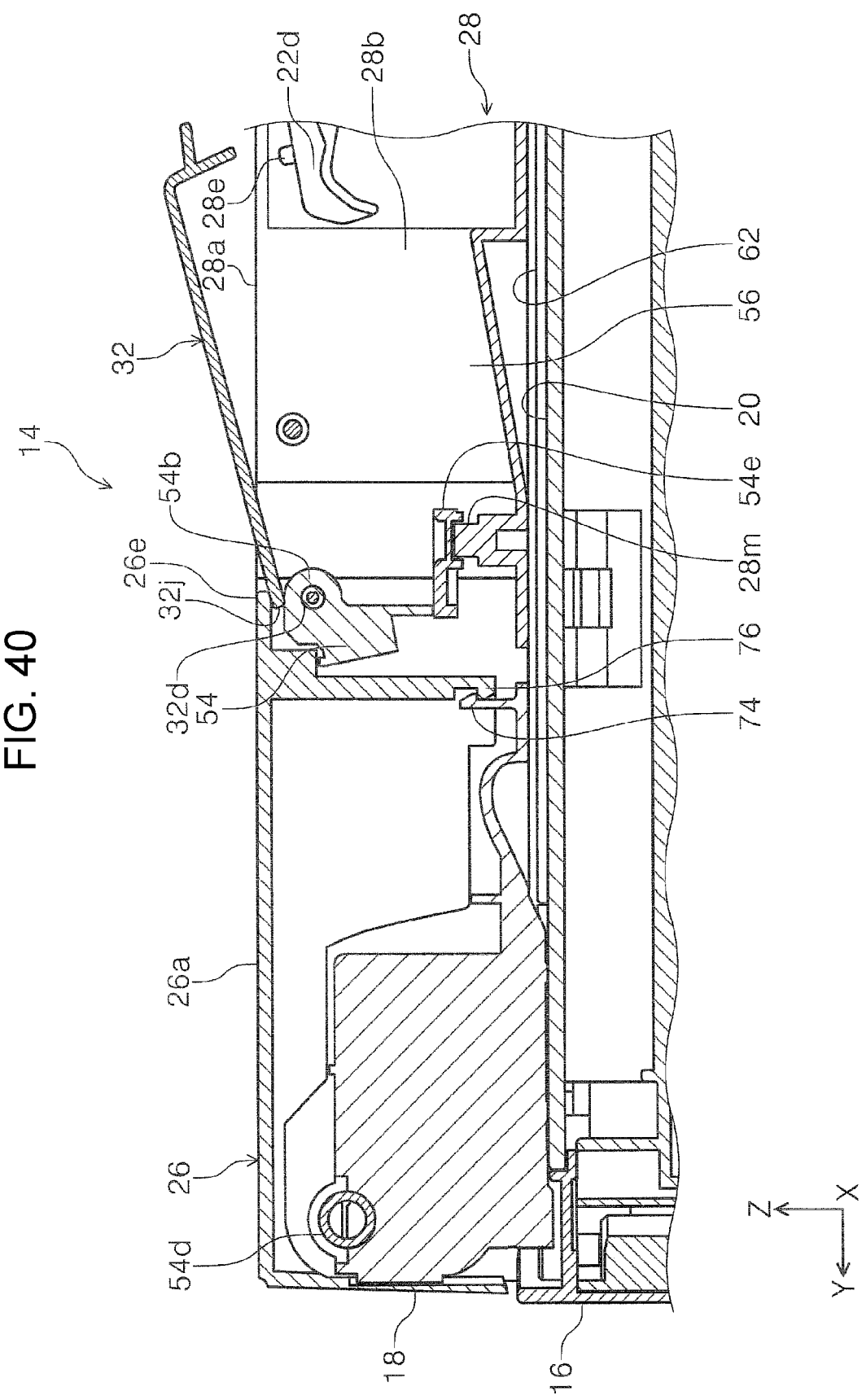
FIG. 40 is a lateral sectional diagram illustrating a configuration in which the document support portion and the curved transport path forming member are linked to switch from a closed posture to an open posture.
Figure 41:
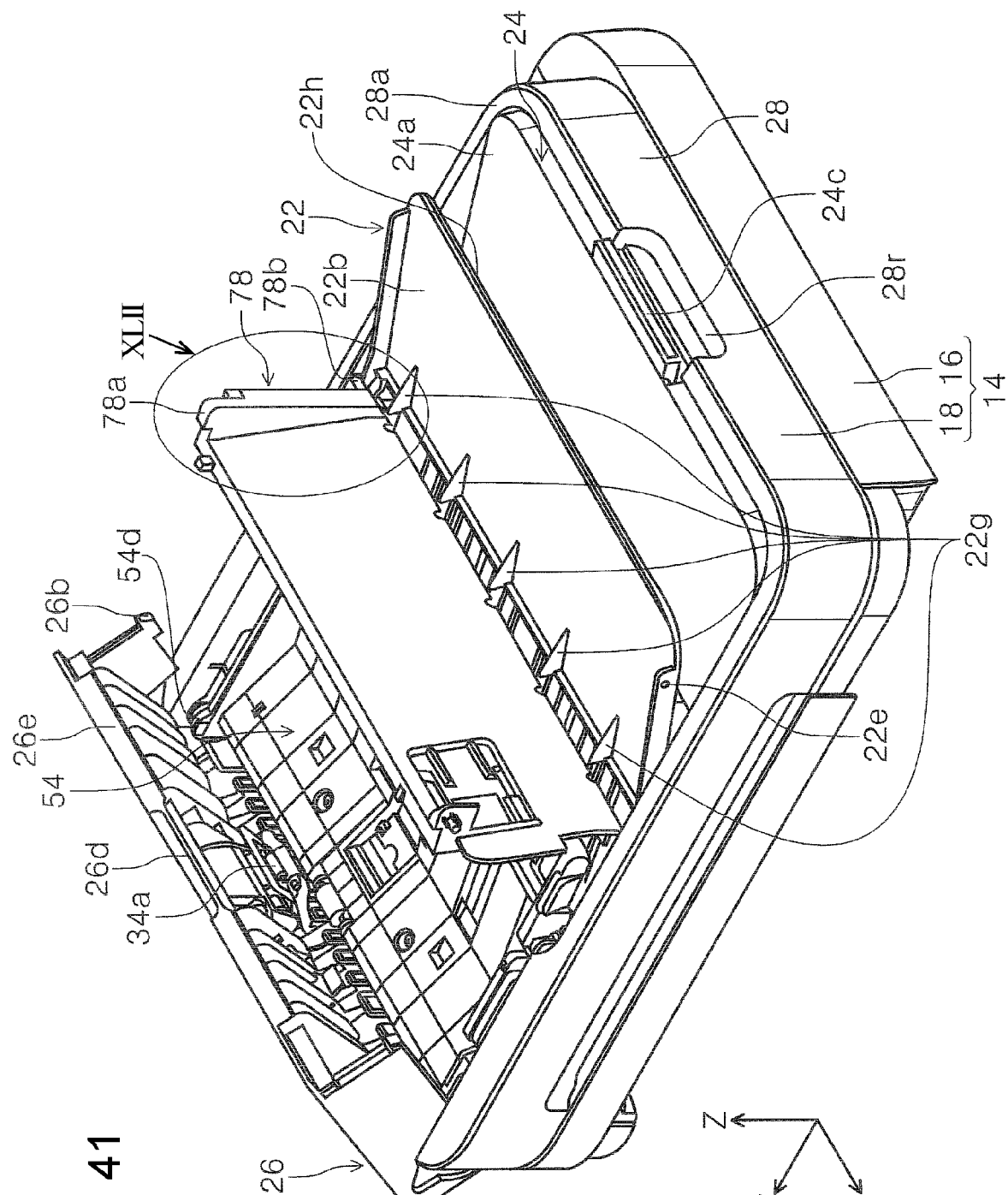
FIG. 41 is a perspective view illustrating a modification example of the document support portion.
Figure 42:
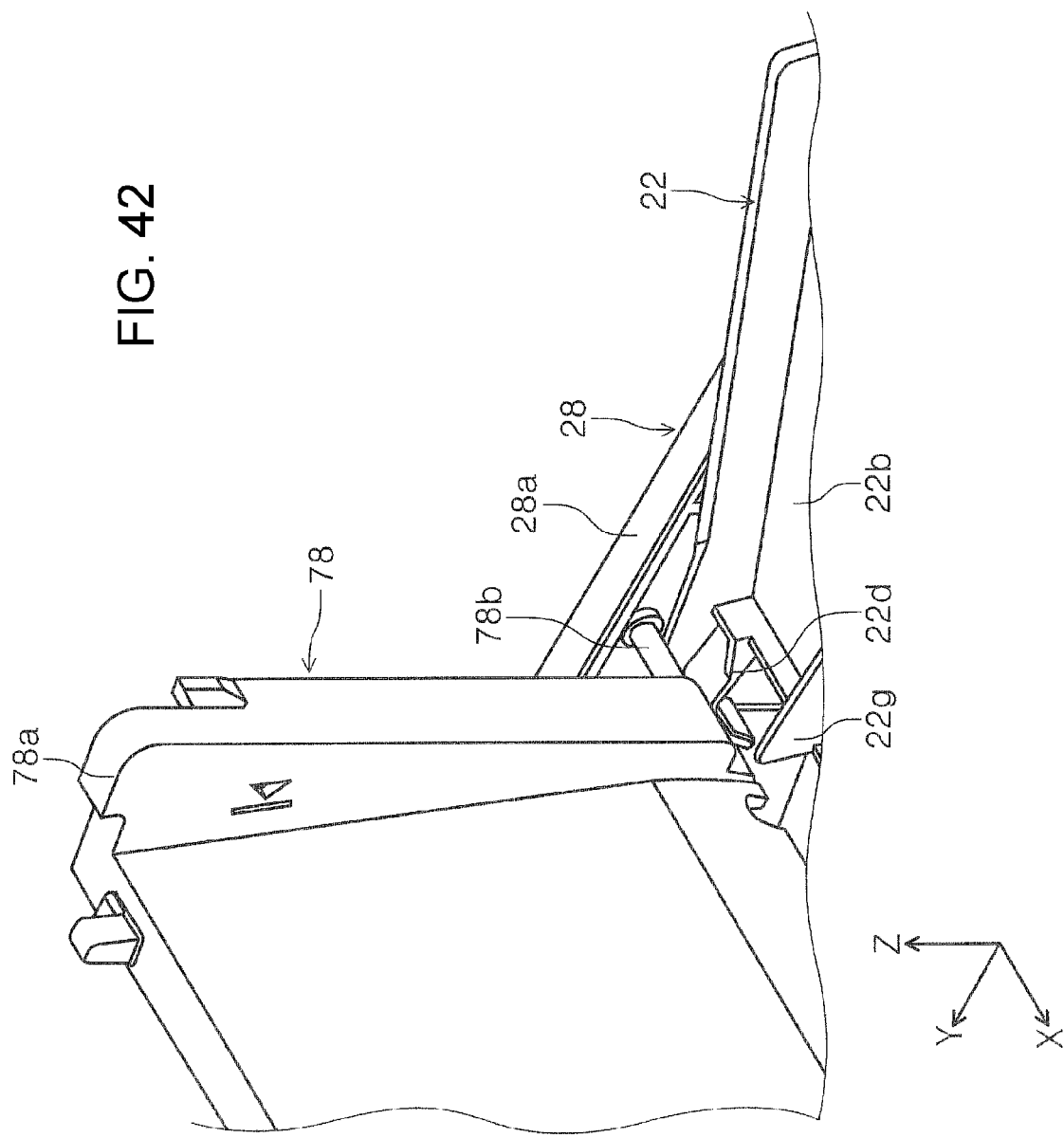
FIG. 42 is an enlarged view of an XLII portion of FIG. 41.
Figure 43:
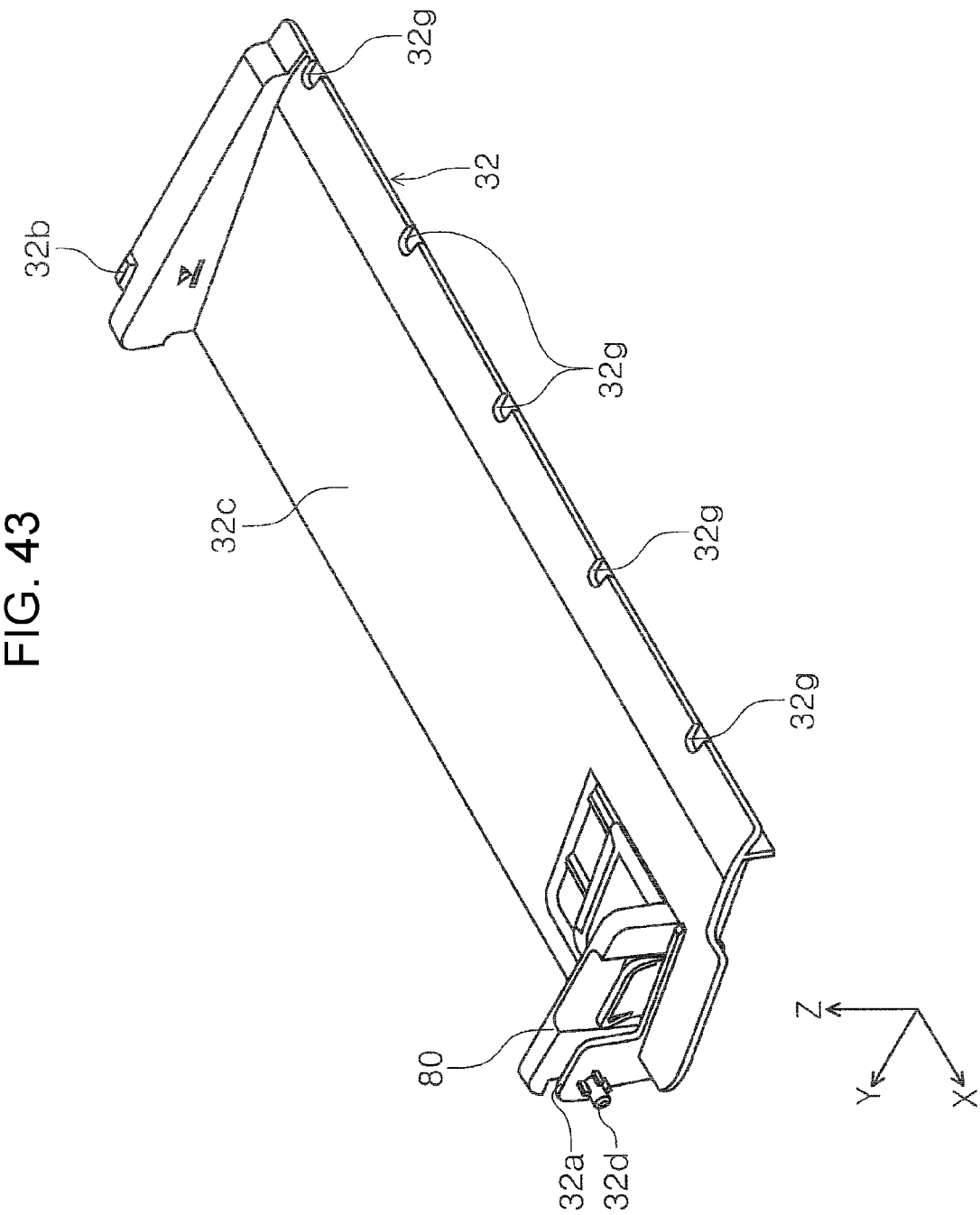
FIG. 43 is a perspective view illustrating a modification example of the edge guide in the document support portion.
Figure 44:
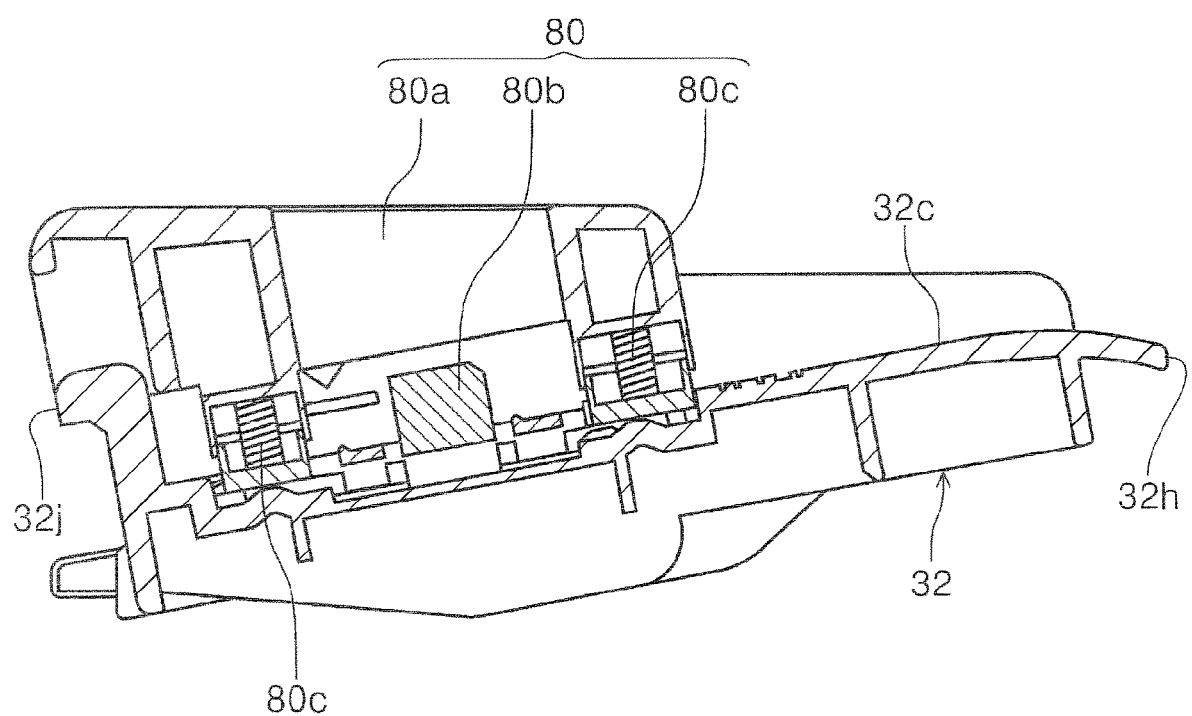
FIG. 44 is a lateral sectional diagram illustrating a modification example of the edge guide in the document support portion.

FIG. 39 is a side view illustrating a modification example of the regulating portion which regulates the opening angle of the curved transport path forming member with respect to the base frame, FIG. 40 is a lateral sectional diagram illustrating a configuration in which the document support portion and the curved transport path forming member are linked to switch from a closed posture to an open posture, FIG. 41 is a perspective view illustrating a modification example of the document support portion, FIG. 42 is an enlarged view of an XLII portion of FIG. 41, FIG. 43 is a perspective view illustrating a modification example of the edge guide in the document support portion, and FIG. 44 is a lateral sectional diagram illustrating a modification example of the edge guide in the document support portion.

In the X-Y-Z coordinate system illustrated in the drawings, an X-axis direction indicates a width direction of the document, that is, an apparatus depth direction, a Y-axis direction indicates a transport direction of the document in the transport path inside the image reading apparatus, that is, an apparatus width direction, and a Z-axis direction indicates an apparatus height direction.

First Example

Outline of Printer

A description will be given of the overall configuration of a printer 10 with reference to FIG. 1. The printer 10 is configured as an ink jet printer as an example of a recording apparatus. The printer 10 is configured as a multifunction device which is provided with an apparatus main body 12 and a scanner unit 14 which serves as the "image reading apparatus".

In the present example, the scanner unit 14 connected to a rear side end portion of the apparatus main body 12 in the apparatus depth direction to be capable of rotational movement, and, although not illustrated, is configured to expose a top portion of the apparatus main body 12 by rotationally moving the scanner unit 14 to the apparatus rear side. The scanner unit 14 is provided with a scanner main body 16 and an automatic document feeder (ADF) unit 18.

The ADF unit 18 is connected to the rear side end portion of the scanner main body 16 in the apparatus depth direction to be capable of rotationally moving, and by rotationally moving the ADF unit 18 to the apparatus rear side, it is possible to expose a document mount surface 20 (FIG. 33) which is provided on the top portion of the scanner unit 14 and it is possible to set the document on the document mount surface 20. The document mount surface 20 is configured using a transparent flat glass plate. The term "document" in the present example is exemplified by a document such as a photograph or a textual document.

In FIG. 1, a cover portion 22, an output tray 24, a curved transport path forming member 26, and a base frame 28 are provided on the top portion of the ADF unit 18. The cover portion 22, the output tray 24, and the curved transport path forming member 26 are attached to the base frame 28 to be capable of rotationally moving. The cover portion 22 and the output tray 24 are configured to be capable of switching between the non-feeding state illustrated in FIGS. 1 and 3 and the feeding state illustrated in FIGS. 2 and 4. The cover portion 22 is provided with a top surface 22a which serves as "a first surface" and a bottom surface 22b which serves as "a second surface".

In the non-feeding state illustrated in FIGS. 1 and 3, the top surface 22a of the cover portion 22, a top surface 24a of the output tray 24, a top surface 26a of the curved transport path forming member 26, and a top surface 28a of the base frame 28 form a top surface 18a of the ADF unit 18. The top surface 22a of the cover portion 22, the top surface 24a of the output tray 24, the top surface 26a of the curved transport path forming member 26, and the top surface 28a of the base frame 28 assume postures running along the X-axis direction and the Y-axis direction which are the horizontal directions, and thus, the top surface 18a of the ADF unit 18 forms a posture which runs along the X-axis direction and the Y-axis direction which are the horizontal directions, that is, forms a flat surface. Therefore, since the top surface 18a of the ADF unit 18 of the printer 10 is flat, not only is the aesthetic external appearance of the apparatus excellent, but since it is possible to reduce or suppress the occurrence of papers and the like falling from the top surface 18a even if papers and items are temporarily mounted on the top surface 18a of the ADF unit 18, it is possible to improve the usability.

In FIGS. 2 and 4, when the cover portion 22 and the output tray 24 switch to the feeding state, a document support portion 32 is exposed at the top portion of the ADF unit 18. The document support portion 32 supports the document together with the bottom surface 22b of the cover portion 22 which assumes the feeding state. The document which is supported by the document support portion 32 and the bottom surface 22b of the cover portion 22 is fed along a document transport path 35.

Regarding Document Transport Path

FIGS. 4, 35, and 37 describe the document transport path 35. In FIG. 4, a double-dot dashed line to which a reference numeral P is assigned indicates the transport path of the document which is transported along the document transport path 35. In the document transport path 35, a feed roller 34a, a separation roller 36, and a transport roller pair 38 which serve as "a feeding unit", and a reading unit 42 and an output roller pair 44 which serve as "a reader" are disposed in order on the downstream side of the document support portion 32 in the transport direction. In the present example, a driven roller 34b is provided at a position facing the feed roller 34a. The driven roller 34b is configured to be capable of being rotationally driven with respect to the feed roller 34a. The driven roller 34b is provided in order to reduce the friction between the feed roller 34a and the opposing surface when the document which is fed by the feed roller 34a runs out and the feed roller 34a continues to rotate. As a result, it is possible to reduce the influence of the transport load on the image which is read.

In FIG. 35, a separation pad 46 is provided at a position facing the separation roller 36. The separation pad 46 abuts on the separation roller 36. The separation pad 46 is formed by a high friction material, for example. A plurality of documents which is fed by the feed roller 34a is separated by the separation roller 36 and the separation pad 46, and only the document which is in contact with the separation roller 36 is fed to the transport roller pair 38 which is disposed on the downstream side in the document transport direction. The document is curved and inverted in the process of being fed from the separation roller 36 to the transport roller pair 38.

The transport roller pair 38 is provided with a transport roller 38a and a driven roller 38b. The transport roller 38a is configured to receive a motive force from a drive source (not illustrated) to be driven, and the driven roller 38b is configured to be capable of being rotationally driven with respect to the transport roller 38a. In FIG. 35, a diameter dimension d1 of the transport roller 38a is set to be larger than a diameter dimension d2 of the driven roller 38b. The driven roller 38b is biased to the transport roller 38a by a biasing unit 48. The biasing unit 48 is configured as a torsion bar, for example, and is disposed inside the driven roller 38b.

The reading unit 42 is provided on the downstream side of the transport roller pair 38. The document which is fed to the reading unit 42 by the transport roller pair 38 is read by an image reading mechanism 50 which is provided at a position facing the document via the document mount surface 20. The document which is read by the image reading mechanism 50 on the document mount surface 20 is transported to the output roller pair 44 which is provided on the downstream side of the reading unit 42 in the document transport path 35 and is output to the top surface 24a of the output tray 24 by the output roller pair 44.

In FIG. 37, the output roller pair 44 is provided with an output roller 44a and a driven roller 44b. The output roller 44a is configured to receive a motive force from a drive source (not illustrated) to be driven, and the driven roller 44b is configured to be capable of being rotationally driven with respect to the output roller 44a. The driven roller 44b is biased to the output roller 44a by a biasing unit 52. The biasing unit 52 is configured as a torsion bar, for example, and is disposed inside the driven roller 44b.

Regarding Rotational Movement Operation of Cover Portion and the Like

FIGS. 5 and 6 explain the posture switching of the cover portion 22 and the output tray 24. In FIG. 6, a rotational movement shaft 22c is formed on the cover portion 22 and the cover portion 22 is configured to be capable of rotational movement using the rotational movement shaft 22c as a rotational movement fulcrum. A rotational movement shaft 24b is formed on the output tray 24 and the output tray 24 is configured to be capable of rotational movement using the rotational movement shaft 24b as a rotational movement fulcrum. In FIG. 5, an engagement portion 22d is formed on the −Y-axis direction side of the cover portion 22. When the cover portion 22 is in the non-feeding state (FIG. 5), the engagement portion 22d engages with the +Y-axis direction side end portion of the output tray 24 to support the output tray 24 from the bottom side of the output tray 24.

Next, in FIG. 6, when the cover portion 22 is rotationally moved using the rotational movement shaft 22c as a rotational movement fulcrum, the engagement portion 22d rotationally moves around the rotational movement shaft 22c along a rotational movement track indicated by a double-dot dashed line to which a reference numeral 22d-1 is assigned. Accordingly, the engagement portion 22d is displaced, by rotational movement, from the position at which the output tray 24 is supported from below the output tray 24 to a position on the +Y-axis direction side with respect to the rotational movement shaft 22c. As a result, since the support of the output tray 24 by the engagement portion 22d is removed, the output tray 24 rotationally moves in a counterclockwise direction in FIG. 6 using the rotational movement shaft 24b as a rotational movement fulcrum and switches from the non-feeding state to the feeding state. In FIG. 6, a dot dashed line to which a reference numeral 24-1 is assigned indicates the rotational movement track of the +Y-axis direction side end portion of the output tray 24.

In FIG. 6, when the cover portion 22 rotationally moves in the clockwise direction using the rotational movement shaft 22c as a rotational movement fulcrum, the top surface 22a transitions to the bottom side with respect to a cladding surface, the bottom surface 22b transitions to the top side with respect to the cladding surface, and the bottom surface 22b functions as a support surface of the document.

In FIGS. 7 to 10, a description will be given of the configuration relating to the rotational movement of the cover portion 22. In FIGS. 7 and 8, receiving portions 32a and 32b are formed on each of the top portions of both end portions in the X-axis direction of the document support portion 32. In the present example, the receiving portion 32a is formed on the end portion of the +X-axis direction side end portion of the document support portion 32 and the receiving portion 32b is formed on the −X-axis direction side end portion. The receiving portions 32a and 32b abut on a portion of the bottom surface 22b of the cover portion 22 and support the cover portion 22 when the cover portion 22 assumes the non-feeding state. Therefore, the cover portion 22 is supported by the document support portion 32 in the non-feeding state.

The receiving portions 32a and 32b define the posture of the cover portion 22 as a posture which runs along the X-axis direction and the Y-axis direction which are horizontal directions. In the present example, since the receiving portions 32a and 32b are provided on the top portion of the document support portion 32, for example, even if a pressing force or an impact force act on the cover portion 22, it is possible to suppress the deformation of the cover portion 22 and it is possible to maintain the position and the posture of the cover portion 22. As a result, for example, even if the user presses the cover portion 22, since it is possible to suppress the deformation of the cover portion 22 and it is possible to maintain the position of the cover portion 22, it is possible to obtain a feeling of rigidity in the cover portion 22. Providing the receiving portions 32a and 32b on a portion (an L-shaped curved portion) which is provided to stand from a support surface 32c of the document support portion 32 enables an increase in the support strength of the cover portion 22.

The receiving portion 32b in the present example is configured (FIG. 8) to be provided on a top portion of the document support portion 32 instead of on the base frame 28 on the −X-axis direction side. For example, when a configuration is adopted in which the receiving portion 32b is provided on the side surface of the base frame 28 on the −X-axis direction side, it is necessary to dispose the receiving portion 32b so that the receiving portion 32b and the document support portion 32 do not interfere with each other in the X-axis direction, and there is a concern that the apparatus dimension will increase in size in the X-axis direction. In the present example, since the receiving portion 32b is provided on the top portion of the document support portion 32, there is no concern that the receiving portion 32b and the document support portion 32 will interfere with each other and it is possible to obtain a reduction in the size of the apparatus in the X-axis direction.

In FIG. 8, a recessed portion 28c and a ring-shaped convex portion 28d which surrounds the recessed portion 28c are formed on a side surface 28b of the −X-axis direction side of the base frame 28. Meanwhile, in FIG. 9, a hemispherical convex portion 22e is formed on the side portion of the cover portion 22. The convex portion 22e is configured to be capable of engaging with the recessed portion 28c. The convex portion 22e of the cover portion 22 engages with the recessed portion 28c when the cover portion 22 is in the non-feeding state. Although not illustrated, similar configurations are also provided on the side surface on the +X-axis direction side of the base frame 28 and on the side surface on the +X-axis direction side of the cover portion 22.

When the cover portion 22 is rotationally moved to switch from the non-feeding state to the feeding state, the convex portion 22e is released from engaging with the recessed portion 28c, passes over the ring-shaped convex portion 28d which surrounds the recessed portion 28c and moves. Conversely, when the cover portion 22 is switched from the feeding state to the non-feeding state, the convex portion 22e passes over the ring-shaped convex portion 28d to fit into and engage with the recessed portion 28c. In particular, when the cover portion 22 is switched from the feeding state to the non-feeding state, since the convex portion 22e passes over the ring-shaped convex portion 28d to engage with the recessed portion 28c, the feeling of the convex portion 22e passing over the ring-shaped convex portion 28d, in other words, a click feeling is given to the user and it is possible to cause the user to recognize that the cover portion 22 is closed.

Next, in FIGS. 6 and 10, a posture determining target portion 28e is provided closer to the bottom side than the top surface 28a on the side surface 28b on the −X-axis direction side of the base frame 28. The posture determining target portion 28e is disposed on the outside of the document transporting region in the X-axis direction. Similarly, although not illustrated, the posture determining target portion 28e is also provided on the side surface on the +X-axis direction side of the base frame 28.

A posture determining portion 22f is provided at a position close to the engagement portion 22d with respect to the rotational movement shaft 22c on the cover portion 22. When the cover portion 22 is rotationally moved from the non-feeding state (FIG. 5) and switched to the feeding state (FIG. 6), the posture determining portion 22f rotationally moves around the rotational movement shaft 22c, approaches the posture determining target portion 28e from the bottom side and engages with the posture determining target portion 28e (FIG. 10). The cover portion 22 is supported by the base frame 28 in the feeding state. Accordingly, it is possible to determine the posture (the angle) of the cover portion 22 with respect to the base frame 28 directly without the cover portion 22 depending on the position of the document support portion 32. As a result, it is possible to improve the angle determination precision of the cover portion 22 in the feeding state with respect to the base frame 28 Furthermore, it is possible to suppress variation in the document transport load during the feeding of the document.

In the present example, for example, since the posture determining target portion 28e is provided closer to the bottom side than the top surface 28a on the side surface 28b on the −X-axis direction side of the base frame 28, when the cover portion 22 assumes the non-feeding state, the posture determining target portion 28e is difficult to see from outside of the ADF unit 18 and does not harm the external appearance of the ADF unit 18. Since the posture determining target portion 28e is disposed on the outside of the document transporting region in the X-axis direction, the transporting of the document is not influenced. In the present example, a configuration is adopted in which the posture determining target portion 28e is provided on the side surface 28b on the −X-axis direction side and the side surface on the +X-axis direction side of the base frame 28, but a configuration may be adopted in which only one is provided as long as it is possible to hold the posture of the cover portion 22.

Regarding Document Support Portion and Support Frame

FIGS. 11 to 15 describe the relationship between the document support portion 32 and a support frame 54. In FIGS. 11 and 12, the support frame 54 is configured to form a portion of the document transport path 35 together with the curved transport path forming member 26 in a state in which the curved transport path forming member 26 is closed with respect to the base frame 28. In the present example, the driven roller 34b facing the feed roller 34a, the separation pad 46, the transport roller 38a of the transport roller pair 38, and the output roller 44a of the output roller pair 44 are disposed on the support frame 54. In FIG. 3, a portion of the support frame 54 functions as a downstream support portion 54a which supports the document before the feeding together with the support surface 32c of the document support portion 32.

In FIGS. 11 and 12, bearing portions 54b are formed on the end portions of both sides in the X-axis direction on the −Y-axis direction side end portion of the support frame 54. In the present example, a pair of rotational movement shafts 32d which protrude from the document support portion 32 toward each of the +X-axis direction and the −Y-axis direction are provided on the +Y-axis side end portion (the end portion of the downstream side of the document in the transport direction) of the document support portion 32. In FIG. 11, the rotational movement shafts 32d of the document support portion 32 are inserted into the bearing portions 54b of the support frame 54 and the document support portion 32 is connected to the support frame 54 to be capable of rotational movement.

In the present example, the document support portion 32 is capable of switching between a first posture (FIGS. 4 and 6) which is a posture in which the document is fed by the feed roller 34a, and a second posture (FIG. 11) in which the document support portion 32 is rotationally moved to the top side with respect to the support frame 54 to widen a bottom portion space 56 of the document support portion 32. When the document support portion 32 is switched from the first posture to the second posture, as illustrated in FIG. 11, it is possible to greatly widen the bottom portion space 56 of the document support portion 32, that is, the output space of the document which is output by the output roller pair 44, and the user is capable of easily visually recognizing the bottom portion space 56. As a result, when the document is jammed in the bottom portion space 56, it is possible to easily remove the jammed document.

In the present example, the document support portion 32 is capable of switching between the first posture and the second posture regardless of the rotational movement operation of the cover portion 22. Accordingly, since it is not necessary to provide a mechanism which links the rotational movement operation of the cover portion 22 to the document support portion 32, it is possible to obtain a reduction in size in the apparatus height direction, for example.

Next, in FIGS. 12 to 14, a plurality of positioning target portions 54c is provided on the −Y-axis direction side end portion of the support frame 54, specifically, in a circular region to which a reference numeral C is assigned in FIG. 12. Meanwhile, positioning portions 32e are provided at positions corresponding to the positioning target portions 54c on the +Y-axis direction side end portion of the document support portion 32. In FIGS. 13 and 14, when the document support portion 32 assumes the first posture, the positioning portions 32e abut on the positioning target portions 54c. As a result, the position of the document support portion 32 which assumes the first posture is defined with respect to the support frame 54.

As a result, it is possible to stabilize the position of the document support portion 32 in the first posture. Since the position of the first posture in the document support portion 32 is defined by the support frame 54, it is possible to stabilize the posture at a position at which the document support portion 32 is at a height position running along the bottom surface 22b of the cover portion 22, and thus, it is possible to stabilize the posture of the non-feeding state of the cover portion 22. Due to the document support portion 32 being positioned by the support frame 54, the document transport path 35 continues and it is possible to render the document less likely to catch during the transporting of the document.

Regarding Curved Transport Path Forming Member

Next, a description will be given of the curved transport path forming member 26 in FIGS. 15 to 18. In FIGS. 15 and 18, the bottom portion on the +Y-axis direction side end portion of the curved transport path forming member 26 is attached to a rotational movement shaft 28f which is provided on the base frame 28. Therefore, the curved transport path forming member 26 is connected to the base frame 28 to be capable of rotational movement using the rotational movement shaft 28f as a fulcrum. In FIG. 16, a locking target portion 26b is formed on the bottom portion of a −Y-axis direction side end portion 26e of the curved transport path forming member 26. A hook-shaped locking portion 28g is provided on the base frame 28 side.

In FIG. 16, when the curved transport path forming member 26 is in a closed state with respect to the base frame 28, the locking target portion 26b is locked to the locking portion 28g. For example, the locking target portion 26b and the locking portion 28g are configured as a snap fit.

When the curved transport path forming member 26 is rotationally moved from the state of being closed with respect to the base frame 28 (FIG. 16) to the +Y-axis direction side using the rotational movement shaft 28f as a rotational movement fulcrum, the locking state between the locking target portion 26b and the locking portion 28g is released and the curved transport path forming member 26 assumes a state of being open with respect to the base frame 28 (FIG. 15). In FIG. 15, the feed roller 34a and the separation roller 36 are provided on the curved transport path forming member 26.

Here, in FIGS. 4 and 35, in a state in which the curved transport path forming member 26 is closed with respect to the base frame 28, the curved transport path forming member 26 forms a curved inverting transport path 58 from the downstream support portion 54a to the reading unit 42 in the document transport path 35 together with the support frame 54. When the curved transport path forming member 26 is rotationally moved with respect to the base frame 28 to assume the open state (FIG. 15), the curved inverting transport path 58 is opened. Therefore, since it is possible to open the curved inverting transport path 58 in a case in which jamming of the document occurs inside the curved inverting transport path 58, it is possible to easily remove the document which is jammed inside the curved inverting transport path 58.

Next, in FIG. 17, a hook-shaped angle regulating portion 28h is provided on the base frame 28. Meanwhile, an angle regulating target portion 26c is provided on the curved transport path forming member 26. When switching the curved transport path forming member 26 from the state of being closed with respect to the base frame 28 (FIG. 16) to the state in which the curved transport path forming member 26 is open with respect to the base frame 28 (FIG. 15), when the curved transport path forming member 26 rotationally moves to a predetermined angle, the angle regulating target portion 26c comes into contact with the angle regulating portion 28h and the rotational movement of the curved transport path forming member 26 is regulated.

Here, in a case in which the angle regulating portion is provided at a position corresponding to the rotational movement shaft 28f (the dashed line portion in FIG. 17), the curved transport path forming member 26 receives angular regulation at a position close to the rotational movement shaft 28f. In this configuration, since the distance between the rotational movement shaft 28f and the angle regulating portion is close, there is a case in which the load which is received from the curved transport path forming member 26 when subjecting the curved transport path forming member 26 to angular regulation increases and the rotational movement shaft 28f is damaged. In the present example, the angle regulating portion 28h is provided at a position distanced from the rotational movement shaft 28f. As a result, when subjecting the curved transport path forming member 26 to angular regulation, since it is possible to distribute the load which is received from the curved transport path forming member 26 between the rotational movement shaft 28f and the angle regulating portion 28h, it is possible to reduce or to prevent the damage to the rotational movement shaft 28f.

In the present example, the angle regulating portion 28h is provided with a first regulating surface 28j which extends upward in the apparatus height direction and a second regulating surface 28k which is inclined and extends upward in the apparatus height direction to the −Y-axis direction side from the first regulating surface 28j. Accordingly, when the angle regulating portion 28h abuts on the angle regulating target portion 26c to regulate the rotational movement of the curved transport path forming member 26, since the first regulating surface 28j receives the load of the +Y-axis direction component which accompanies the rotational movement of the curved transport path forming member 26 and the second regulating surface 28k receives the load of the +Z-axis direction component which accompanies the rotational movement of the curved transport path forming member 26, it is possible to reduce the load which is applied to the rotational movement shaft 28f and it is possible to reduce or to prevent the damage to the rotational movement shaft 28f. It is also possible to reduce the damage to the rotational movement shaft 28f by increasing the diameter of the rotational movement shaft 28f illustrated in FIG. 18. In the present example, a configuration is adopted in which the rotational movement shaft 28f is provided on the base frame 28, for example, but the rotational movement shaft may be provided on the curved transport path forming member 26 side.

Next, in FIGS. 19 to 22 and 31, a description will be given of the configuration relating to the rotational movement of the support frame 54. In FIGS. 19 and 31, a rotational movement shaft 54d is provided on the +Y-axis direction side end portion of the support frame 54. The support frame 54 is connected to the base frame 28 via the rotational movement shaft 54d to be capable of rotational movement. In the present example, the support frame 54 is capable of switching between a feeding-time posture (FIG. 4) in which the downstream support portion 54a supports the document before the feeding, and an open posture in which the support frame 54 rotationally moves from the feeding-time posture to the top side to widen the bottom portion space 56 (FIG. 19).

In FIG. 19, when the document support portion 32 which is connected to the support frame 54 is further lifted upward from the state illustrated in FIG. 15, the support frame 54 rotationally moves in a counterclockwise direction in FIG. 19 with respect to the base frame 28 using the rotational movement shaft 54d as a rotational movement fulcrum. As a result, in FIGS. 19 and 20, it is possible to further widen the bottom portion space 56 of the document support portion 32 and to widen a bottom portion space 57 of the downstream support portion 54a, and it becomes possible for the user to visually inspect not only the bottom portion space 56 but also to a position at which the driven roller 44b and the reading unit 42 of the output roller pair 44 are provided in the bottom portion space 57 of the support frame 54. As a result, it is possible to easily remove the jammed document when the document is jammed in the path from the reading unit 42 to the output roller pair 44 and the bottom portion spaces 56 and 57 in the document transport path 35.

In FIGS. 21 and 22, a plurality of positioning target portions 54e (FIG. 20) which protrude from the −Y-axis direction side end portion (the free end side in FIG. 19) to the −Y-axis direction side are provided on the support frame 54. In FIG. 22, the positioning target portion 54e is formed in a cylindrical shape, for example, and the inner circumferential surface of the positioning target portion 54e functions as a first position regulating portion 54f. An inward-facing flange-shaped second position regulating portion 54g which rises toward the inside from the inner circumferential surface is provided on the cylindrical positioning target portion 54e. A through hole 54h is formed in the center portion of the inward-facing flange-shaped second position regulating portion 54g.

A cylindrical positioning portion 28m is formed on the base frame 28 to correspond to the positioning target portion 54e. The cylindrical positioning portion 28m is provided with a top surface 28n and an outer circumferential surface 28p.

In FIG. 21, when the support frame 54 is rotationally moved from a state of being distanced from the base frame 28 (refer to the top portion of FIG. 21) to the base frame 28 side, the positioning target portions 54e of the support frame 54 engage with the positioning portions 28m of the base frame 28. In this state, as illustrated in FIG. 22, the second position regulating portions 54g of the positioning target portions 54e abut on the top surfaces 28n of the positioning portions 28m. Accordingly, the position of the support frame 54 is defined with respect to the base frame 28 in the Z-axis direction. The document support portion 32 is not illustrated in FIG. 21.

The cylindrical positioning portion 28m is inserted into the positioning target portion 54e. The outer circumferential surface 28p of the positioning portion 28m faces the first position regulating portion 54f which functions as the inner circumferential surface of the positioning target portion 54e. Accordingly, the position of the support frame 54 is defined with respect to the base frame 28 in the X-axis direction and the Y-axis direction. A gap is provided between the outer circumferential surface 28p and the first position regulating portion 54f in order to smoothly perform the rotational movement operation of the support frame 54 with respect to the base frame 28, and the magnitude of the gap is set to a minimum necessary extent for the rotational movement operation so as not to influence the positional accuracy of the support frame 54 with respect to the base frame 28.

In FIG. 22, a fixing hole 28q for a fastening member may be provided on the positioning portion 28m. In this case, it is possible to fix the support frame 54 to the base frame 28 by fastening a fastening member (not illustrated) to the fixing hole 28q through the through hole 54h from above the positioning target portion 54e. The fastening member is a screw, a bolt, or the like, for example. It is possible to avoid unintended access to the reading unit 42 by the user by fixing the support frame 54 to the base frame 28.

Auxiliary Tray

In FIGS. 2, 4, 23, and 24, an explanation is given relating to an auxiliary tray 24c of the output tray 24. The auxiliary tray 24c is provided on the −Y-axis direction side end portion of the output tray 24 to be capable of switching between a state in which the auxiliary tray 24c is extended with respect to the output tray 24 (FIG. 2) and a state in which the auxiliary tray 24c is stored inside the output tray 24 (FIG. 23). In FIG. 3, in a state in which the auxiliary tray 24c is stored inside the output tray 24, since the auxiliary tray 24c does not protrude from the base frame 28 in the −Y-axis direction and forms a surface with the −Y-axis direction side end portion of the base frame 28, the aesthetic external appearance of the ADF unit 18, and thus, the printer 10 is improved.

In FIGS. 23 and 24, a recessed hand-grip portion 28r is provided at a position corresponding to a state in which the auxiliary tray 24c is stored in the output tray 24 on the −Y-axis direction side end portion of the base frame 28. The hand-grip portion 28r is set to a size at which it is possible for the user to insert fingers and pull out the auxiliary tray 24c from the inside of the output tray 24 in a state in which the auxiliary tray 24c is stored inside the output tray 24. Therefore, since it is possible to easily pull out the auxiliary tray 24c of the stored state from the output tray 24, the manipulability of the auxiliary tray 24c is improved.

Next, a description will be given of an edge guide 60 which is provided on the support surface 32c of the document support portion 32 with reference to FIGS. 25 and 26. The edge guide 60 is provided to be capable of moving along the X-axis direction on the end portion of the support surface 32c of the document support portion 32 on the +X direction side.

In FIGS. 25 and 26, a ratchet tooth row 32f which extends in the X-axis direction is provided on the support surface 32c of the document support portion 32. An edge guide main body 60a and a first manipulation lever 60b are provided on the edge guide 60. The first manipulation lever 60b is provided with a first arm 60c and a second arm 60d which extend from both end portions in the Y-axis direction toward the edge guide main body 60a. A third arm 60e which extends from the edge guide main body 60a in the +X-axis direction is provided between the first arm 60c and the second arm 60d in the Y-axis direction.

In FIG. 26, a first clasp 60f which meshes with the ratchet tooth row 32f is provided on the bottom portion of the first arm 60c (the section along the line E-E), a second clasp 60g which meshes with the ratchet tooth row 32f is provided on the bottom portion of the second arm 60d (the section along the line G-G), and a third clasp 60h which meshes with the ratchet tooth row 32f is provided on the bottom portion of the third arm 60e (the section along the line F-F).

In FIG. 26, a dashed line to which the reference numeral X−1 is assigned indicates the positions of the +X-axis direction side end portions of the first clasp 60f and the second clasp 60g, and the dashed line to which the reference numeral X−2 is assigned indicates the position of the +X-axis direction side end portion of the third clasp 60h. In the present example, the position of the +X-axis direction side end portion of the third clasp 60h is shifted to be closer to the +X-axis direction side than the positions of the +X-axis direction side end portions of the first clasp 60f and the second clasp 60g. More specifically, the meshing of the third clasp 60h with the ratchet tooth row 32f is set to be half a pitch behind the meshing of the first clasp 60f and the second clasp 60g with the ratchet tooth row 32f.

When moving the edge guide 60 to the −X-axis direction side, it is possible to move the edge guide 60 using the ratchet mechanism without grasping the first manipulation lever 60b. In the present example, the meshing of the third clasp 60h with respect to the ratchet tooth row 32f is delayed by half a pitch compared to the meshing of the first clasp 60f and the second clasp 60g with respect to the ratchet tooth row 32f, when moving the edge guide 60, when the first clasp 60f and the second clasp 60g mesh with the ratchet tooth row 32f, the third clasp 60h and the ratchet tooth row 32f assume a non-meshing state. Meanwhile, when the third clasp 60h and the ratchet tooth row 32f mesh, the first clasp 60f and the second clasp 60g, and the ratchet tooth row 32f assume the non-meshing state. Therefore, since it is possible to move the edge guide 60 every half pitch with respect to the ratchet tooth row 32f, it is possible to increase the resolving power of the edge guide.

In the present example, since the first clasp 60f and the second clasp 60g, and the third clasp 60h alternately mesh with the ratchet tooth row 32f, the inter-pitch movement of the edge guide 60 with respect to the ratchet tooth row 32f becomes smooth and it is possible to improve the feel of the manipulation by the user with respect to the edge guide 60.

FIGS. 1, 23, 27, and 28 describe the hand-grip portion with respect to the cover portion 22. A hand-grip portion 26d which serves as a recessed portion is provided on the top surface 26a of the −Y-axis direction side edge portion of the curved transport path forming member 26. In FIG. 27, the hand-grip portion 26d is formed as a recessed portion in the top surface 26a. In FIG. 28, when the cover portion 22 is in the non-feeding state, a +Y-axis direction side edge portion 22h of the cover portion 22 faces a −Y-axis direction side end portion 26e of the curved transport path forming member 26. In the present example, since the hand-grip portion 26d is provided on the −Y-axis direction side end portion 26e of the curved transport path forming member 26, at least a portion of the +Y-axis direction side edge portion 22h of the cover portion 22 is exposed. Here, since fingertips are caught on the +Y-axis direction side edge portion 22h of the cover portion 22 due to the user inserting the fingers of the user into the hand-grip portion 26d, it is possible to easily lift up the cover portion 22 to switch from the non-feeding state to the feeding state.

In the present example, since the hand-grip portion 26d is configured as a recessed portion, in the non-usage state (FIG. 1) of the ADF unit 18, it is possible to reduce or to prevent the entrance of dirt and dust to the ADF unit 18 from the outside. Since the hand-grip portion 26d is configured to be provided on the curved transport path forming member 26 side, it is not necessary to provide an opening for the hand-grip portion in the cover portion 22 and it is possible to more effectively reduce the entrance of dirt and dust to the inner portion of the ADF unit 18.

In FIG. 28, the top surface 26a of the curved transport path forming member 26 and the top surface 22a of the cover portion 22 are disposed to be shifted in the Y-axis direction, and the curved transport path forming member 26 and the cover portion 22 do not overlap each other in the Z-axis direction. Accordingly, since the curved transport path forming member 26 does not influence the positioning in the non-feeding state of the cover portion 22 of the document support portion 32, it is possible to maintain a flat state of the top surface 18a of the ADF unit 18 in the non-usage state. Since the curved transport path forming member 26 and the cover portion 22 do not overlap each other in the Z-axis direction, it is possible to prevent an increase in the apparatus size in the Z-axis direction.

Next, FIGS. 12, 29, and 30 describe bridging between the cover portion 22 in the feeding state and the document support portion 32. In FIGS. 12 and 29, a plurality of ribs 22g (also refer to FIG. 2) are provided to leave an interval in the X-axis direction at the +Y-axis direction side end portion of the bottom surface 22b when the cover portion 22 is in the feeding state.

A plurality of recessed portions 32g is formed in the −Y-axis direction side end portion 32h of the document support portion 32 to leave an interval in the X-axis direction corresponding to the ribs 22g. In FIG. 30, when the cover portion 22 assumes the feeding state, the +Y-axis direction side end portions of the ribs 22g enter the recessed portions 32g in the Y-axis direction. The ribs 22g of the cover portion 22 and the recessed portions 32g overlap each other in the document feed direction. A −Y-axis direction side end portion 32h of the document support portion 32 extends and is inclined in the −Z-axis direction with respect to the support surface 32c. The top ends of the ribs 22g are positioned above the positions at which the recessed portions 32g are provided in the Z-axis direction by a height L1.

Therefore, since the ribs 22g which are positioned on the upstream side in the document transport direction are positioned at higher positions in the Z-axis direction than the recessed portions 32g which are positioned on the downstream side in the document transport direction, when feeding the document, the leading end of the document does not catch on the −Y-axis direction side end portion 32h of the document support portion 32 and the transition of the document from the cover portion 22 to the document support portion 32 becomes smooth. A configuration is adopted in which the ribs 22g are provided on the cover portion 22 and the recessed portions 32g are provided in the document support portion 32. However, the reverse configuration may also be adopted.

Regarding Positions of Rotational Movement Shafts of Cover Portion, Document Support Portion, Output Tray, Curved Transport Path Forming Member, and the Like FIGS. 31 and 32 describe the positional relationship in the Z-axis direction of the rotational movement shafts of the cover portion 22, the output tray 24, the curved transport path forming member 26, the document support portion 32, and the support frame 54. In FIG. 31, the rotational movement shaft 22c of the cover portion 22 is disposed to be running along the height position of the bottom surface 22b of the cover portion 22 in the Z-axis direction. In the present example, the rotational movement shaft 24b of the output tray 24 is disposed at approximately the same height position as the rotational movement shaft 22c in the Z-axis direction to be running along the height position of the bottom surface 22b of the cover portion 22.

Here, by rendering the distance between the rotational movement shaft 22c and the top surface 22a in the cover portion 22 approximately the same as the distance between the rotational movement shaft 24b and the top surface 24a of the output tray 24, it is possible to match the height positions in the Z-axis direction of the top surface 22a and the top surface 24a of the cover portion 22 and the output tray 24 in the non-feeding state, and it is possible to render the top surface 18a of the ADF unit 18 flat. In the present example, having approximately the same height and approximately the same distance means not only a complete matching state but also means a state that may include precision error or the like in the assembly and the components.

In FIG. 31, the rotational movement shaft 32d of the document support portion 32 is disposed to be running along the height position of the bottom surface 22b of the cover portion 22. More specifically, the rotational movement shaft 32d is disposed on the bottom side with respect to the rotational movement shaft 22c in the Z-axis direction corresponding to the distance between the top surface 22a and the bottom surface 22b of the cover portion 22. In the Z-axis direction, the receiving portions 32a and 32b of the document support portion 32 are positioned higher than the rotational movement shaft 22c and are disposed lower than the top surface 28a of the base frame 28 by the distance between the top surface 22a and the bottom surface 22b of the cover portion 22.

Accordingly, since it is possible to maintain the posture in which the top surface 22a runs along the Y-axis direction in a state in which the document support portion 32 supports the cover portion 22 in the non-feeding state and it is possible to match the height positions in the Z-axis direction of the top surface 22a of the cover portion 22 and the top surface 28a of the base frame 28, it is possible to secure the flatness of the top surface 18a of the ADF unit 18.

In FIG. 31, a position at which the engagement portion 22d of the cover portion 22 in the non-feeding state engages with the output tray 24 in the non-feeding state to support the output tray 24 is positioned higher than the rotational movement shaft 24b in the Z-axis direction. Since the engagement portion 22d supports the output tray 24 at a higher position than the rotational movement shaft 24b, it is possible to maintain the top surface 24a in the posture which runs along the Y-axis direction and it is possible to secure the flatness of the top surface 18a of the ADF unit 18.

In FIG. 32, the rotational movement shaft 54d of the support frame 54 is disposed lower than the rotational movement shaft 32d of the document support portion 32 in the Z-axis direction. In FIG. 19, when the support frame 54 is rotationally moved using the rotational movement shaft 54d as a fulcrum, it is possible to rotationally move the document support portion 32 with respect to the support frame 54 using the rotational movement shaft 32d as a fulcrum. At this time, since the rotational movement shaft 32d of the document support portion 32 is configured to be positioned above the rotational movement shaft 54d in the Z-axis direction, it is possible to displace the document support portion 32 further upward with respect to the support frame 54 compared to a case in which the rotational movement shaft 32d and the rotational movement shaft 54d are disposed at approximately the same height position in the Z-axis direction. As a result, as illustrated in FIG. 19, it is possible to greatly open the document transport path 35 such that not only the bottom portion space 56 of the document support portion 32 but even to the reading unit 42 in the bottom portion space 57 of the support frame 54 becomes visible within a range that does not interfere with the curved transport path forming member 26 in the open state.

In the present example, the rotational movement shaft 22c of the cover portion 22, the rotational movement shaft 24b of the output tray 24, the rotational movement shaft 32d of the document support portion 32, and the rotational movement shaft 54d of the support frame 54 are disposed to be running along the height position of the bottom surface 22b of the cover portion 22 in the Z-axis direction. Therefore, since the rotational movement shafts are disposed in positions close to the top surface 18a of the ADF unit 18 (the printer 10), it is possible to more reliably secure the flatness of the top surface 18a of the ADF unit 18 in a state in which the constituent elements of the cover portion 22, the output tray 24, the document support portion 32, and the support frame 54 are closed.

In FIG. 32, the rotational movement shaft 54*d* of the support frame 54 is positioned closer to the top side in the Z-axis direction than the rotational movement shaft 28*f* of the curved transport path forming member 26. Since the rotational movement shaft 28*f* of the curved transport path forming member 26 is provided on the bottom portion of the curved transport path forming member 26, it is possible to more greatly open the space of the −Y-axis direction side when rotationally moving the curved transport path forming member 26 than in a case in which the rotational movement shaft 28*f* is provided at a higher position. As a result, since the rotational movement amount when rotationally moving the support frame 54 using the rotational movement shaft 54*d* as a fulcrum, it is possible to greatly open the document transport path 35.

In FIG. 32, when the cover portion 22 is in the feeding state, the posture determining portion 22*f* of the cover portion 22 is positioned lower in the Z-axis direction than the rotational movement shaft 22*c*. As a result, there is an effect in which the posture determining portion 22*f* is not exposed from the cover portion 22 when the ADF unit 18 is not in use.

Next, in FIGS. 33 and 34, when the bottom surface of the ADF unit 18, more specifically, the ADF unit 18 is in the closed state with respect to the scanner main body 16, a document holding member 62 is provided in a region facing the document mount surface 20. The document holding member 62 is configured as a sheet-shaped member. The document holding member 62 is attached to the base frame 28 which configures the bottom surface of the ADF unit 18 using a fixing unit (not illustrated). In the present example, for example, the fixing unit is configured using a sticky sheet member such as double-sided tape, an adhesive, or the like.

The document holding member 62 is configured to be pushed against the document mount surface 20 when the ADF unit 18 is in a closed state with respect to the scanner main body 16. Accordingly, when the document is set on the document mount surface 20, the document holding member 62 pushes the document against the document mount surface 20 to hold the document such that the document does not shift with respect to the document mount surface 20 during the reading operation. In the present example, since a configuration is adopted in which the document holding member 62 is bonded directly to the base frame 28 without a dampener or the like, it is possible to obtain a dimensional reduction in the Z-axis direction and a reduction in the cost due to a reduction in the number of components. It is possible to soften the impact when the ADF unit 18 is closed with respect to the scanner main body 16 by providing a biasing unit such as a flat spring between the base frame 28 and the document holding member 62.

Next, in FIGS. 35 and 36, a plurality of ribs 64 is formed on the base frame 28. The ribs 64 extend from the upstream side of the transport roller pair 38 in the curved inverting transport path 58 of the document transport path 35 to a position at which the ribs 64 overlap the transport roller 38*a* in the document transport direction. The ribs 64 protrude from the base frame 28 to guide the document in the curved inverting transport path 58 toward the transport roller 38*a*.

Here, since the transport path has a greatly curved shape in the curved inverting transport path 58, the transported document is transported in a curved manner. At this time, since a force to return to the original flat state is generated in the document, the document is transported to the transport direction downstream side while adhering to the outside portion of the curved inverting transport path 58, that is, the curved transport path forming member 26 side. Therefore, when the leading end of the document comes into contact with the driven roller 38*b*, there is a case in which the document catches on the driven roller 38*b*, is not nipped by the transport roller pair 38, and may no longer be transported.

In the present example, in the document which is transported along the curved inverting transport path 58, since the orientation of the document leading end is changed from the driven roller 38*b* toward the transport roller 38*a* using the ribs 64, it is possible to cause the document leading end to contact the transport roller 38*a* and to cause the document to be nipped by the transport roller pair 38. Accordingly, it is possible to smoothly transport the document to the reading unit 42 in the curved inverting transport path 58.

In FIGS. 37 and 38, a document guide portion 66 is provided on the upstream side of the region in which the output roller pair 44 is disposed in the document transport path 35. The document guide portion 66 is configured to guide the document, which is fed along the document transport path 35 after being read by the reading unit 42, to a nipping point of the output roller pair 44.

Here, since the transportation of the document stops the moment the document hits the output roller 44*a* when the leading end of the document which is fed along the document transport path 35 hits the output roller 44*a*, the read image of the document in the reading unit 42 may be disturbed.

In the present example, since the leading end of the medium which is fed along the document transport path 35 is guided to the nipping point of the output roller pair 44 by the document guide portion 66 without hitting the output roller 44*a*, the document is smoothly output without the transportation of the document stopping. As a result, it is possible to suppress or prevent a reduction in the quality of the read image of the document in the reading unit 42. In the present example, since the document guide portion 66 is configured as a guiding surface instead of a rib shape, it is possible to minimize the influence of cockling on the document.

In FIGS. 36 and 38, the output roller 44*a* is attached to a drive shaft 68 so as to rotate together with the drive shaft 68. On the drive shaft 68, output auxiliary members 70 are attached to both sides of the output roller 44*a*. The output auxiliary member 70 of the −X-axis direction side with respect to the output roller 44*a* is illustrated in FIG. 36, and the output auxiliary member 70 of the +X-axis direction side with respect to the output roller 44*a* is illustrated in FIG. 38. For example, the output auxiliary member 70 is formed using a urethane material.

In the present example, the maximum external diameter of the output auxiliary member 70 is set to be larger than the output roller 44*a*, for example. Accordingly, the rear end of the document which is transported is pulled out by the output auxiliary member 70 and it is possible to prevent the document from remaining on the driven roller 44*b*. In the present example, since the output auxiliary members 70 are disposed on both outer sides of the output roller 44*a* in the axial line direction of the drive shaft 68, even in a case in which the document is transported in a skewed state, it is possible to reliably pull out and output the document rear end.

Modification Examples of Example (1) FIG. 39 describes a modification example of the angle regulating portion 28*h*. In the present modification example, a holding unit 72 may be provided which holds the curved transport path forming member 26 at a predetermined angle when the curved transport path forming member 26 is rotationally moved and the angle regulating target portion 26c abuts on the angle regulating portion 28h at a predetermined angle. The holding unit 72 is provided with an engaged portion 72a which serves as a hemispherical convex portion which is provided on the curved transport path forming member 26 side and an engagement portion 72b which serves as a hemispherical convex portion which is provided on the base frame 28 side, for example. For example, the engagement portion 72b is disposed above a rotational movement track S (the dot-dash line which is given the reference numeral S in FIG. 39) of the engaged portion 72a which follows the rotational movement of the curved transport path forming member 26.

When the curved transport path forming member 26 is rotationally moved from the closed state (FIG. 16), the engaged portion 72a also rotationally moves along the rotational movement track S. The engaged portion 72a contacts the engagement portion 72b directly before the angle regulating target portion 26c of the curved transport path forming member 26 contacts the angle regulating portion 28h at a predetermined angle. When the curved transport path forming member 26 is rotationally moved to cause the angle regulating target portion 26c to contact the angle regulating portion 28h, the engaged portion 72a passes over the engagement portion 72b. At this time, the user who rotationally moves the curved transport path forming member 26 obtains a feeling, a click feeling, of the engaged portion 72a passing over the engagement portion 72b.

When the engaged portion 72a passes over the engagement portion 72b, the angle regulating target portion 26c contacts the angle regulating portion 28h at a predetermined angle. Here, even if the user releases the hand of the user from the curved transport path forming member 26, since a state (FIG. 39) in which the engaged portion 72a engages with the engagement portion 72b is maintained, the holding unit 72 is capable of maintaining the state in which the curved transport path forming member 26 is open at a predetermined angle.

(2) FIG. 40 describes an open-close linking unit between the curved transport path forming member 26 and the document support portion 32. In the present modification example, a +Y-axis direction side end portion 32j of the document support portion 32 overlaps the curved transport path forming member 26 in the Y-axis direction to slip under the −Y-axis direction side end portion 26e. In this configuration, when the document support portion 32 is rotationally moved in the counterclockwise direction in FIG. 40 using the rotational movement shaft 32d as a rotational movement fulcrum, the locking of the curved transport path forming member 26 is released to lift the −Y-axis direction side end portion 26e of the curved transport path forming member 26 to the +Y-axis direction side end portion 32j of the document support portion 32. Therefore, since it is possible to release the locking of the curved transport path forming member 26 to switch the curved transport path forming member 26 to a state capable of rotational movement by manipulating the document support portion 32, it is possible to reduce the work of manipulating the curved transport path forming member 26.

In FIG. 40, a hook-shaped locking portion 74 is provided on the base frame 28, a locking target portion 76 is provided on the curved transport path forming member 26, and a locking unit which regulates the rotational movement of the curved transport path forming member 26 with respect to the base frame 28 when the locking portion 74 and the locking target portion 76 are in the engagement state is provided. In the present modification example, the positional relationship between the locking portion 28g and the locking target portion 26b in FIG. 16 is changed to be reversed. By adopting this configuration, since the locking portion 74 is pressed against the locking target portion 26b when rotationally moving the curved transport path forming member 26 with respect to the base frame 28, it is possible to release the locking state by displacing the locking portion 74 to the +Y-axis direction side with a small force. As a result, since it is possible to reduce the force applied to the releasing of the locking of the curved transport path forming member 26, it is possible to easily link the curved transport path forming member 26 to the document support portion 32.

As another example of the locking unit, a locking unit may be provided at a position which is closer to the overlapping portion between the +Y-axis direction side end portion 32j of the document support portion 32 and the −Y-axis direction side end portion 26e of the curved transport path forming member 26. By adopting this configuration, the transmission loss of the manipulating force caused by deformation of members and the like is reduced and it is possible to release the locking unit with a smaller manipulating force.

(3) In the present example, the document support portion 32 is configured to rotationally move using the rotational movement shaft 32d which is positioned on the document transport direction downstream side as a rotational movement fulcrum (FIG. 11), but in FIGS. 41 and 42, instead of this configuration, a configuration may be adopted in which the rotational movement shaft is provided on the document transport direction upstream side and a +Y-axis direction side end portion 78a of a document support portion 78 is used as a free end side.

In this configuration, a rotational movement shaft 78b is provided on the −Y-axis direction side end portion of the document support portion 78. In the present modification example, the document support portion 78 rotationally moves using the rotational movement shaft 78b as a rotational movement fulcrum and using the document transport direction downstream side as a free end side (FIGS. 41 and 42). By adopting this configuration, it is possible to more widely open the bottom portion space 56 when rotationally moving the document support portion 78 and it is possible to easily remove a jammed document.

In FIG. 42, when the cover portion 22 is in the feeding state, a portion of the cover portion 22 contacts the rotational movement shaft 78b and the rotational movement shaft 78b defines the posture of the feeding state of the cover portion 22. Accordingly, it is no longer necessary to provide a positioning portion which defines the posture of the feeding state of the cover portion 22 distinctly from the base frame 28 and it is possible to reduce the space in the X-axis direction. Since the rotational movement shaft 78b is used as a positioning portion which defines the posture of the feeding state of the cover portion 22, it is possible to obtain the strength for maintaining the posture of the cover portion 22 and it is possible to improve the posture precision of the feeding state of the cover portion 22.

(4) FIGS. 43 and 44 describe the configuration of an edge guide 80. The edge guide 80 is attached to the support surface 32c of the document support portion 32 to be capable of moving in the X-axis direction. In the present modification example, the edge guide 80 (FIG. 44) is provided with an edge guide main body 80a, a manipulating portion 80b, and a biasing unit 80c. The edge guide main body 80a is attached to the support surface 32c of the document support portion 32 to be capable of moving in the X-axis direction. One end of the biasing unit 80c is connected to the edge guide main body 80a and the other end is connected to the manipulating portion 80b. The biasing unit 80c biases the manipulating portion 80b in a direction separating from the edge guide main body 80a.

The manipulating portion 80b contacts the cover portion 22 when the cover portion 22 assumes the posture of the non-feeding state. At this time, the manipulating portion 80b is displaced to the edge guide main body 80a side against the biasing force of the biasing unit 80c due to the weight of the cover portion 22. Accordingly, it is possible to set the top surface 22a of the cover portion 22 to a posture which runs along the Y-axis direction in the non-feeding state.

Meanwhile, when the cover portion 22 is switched from the non-feeding state to the feeding state, the manipulating portion 80b is displaced in a direction separating from the edge guide main body 80a by the biasing force of the biasing unit 80c. Since the manipulating portion 80b is displaced upward in the Z-axis direction, the height of the manipulating portion 80b increases and the user becomes able to perform the manipulation more easily.

(5) In the present example, the document support portion 32 is configured to be capable of rotational movement using the rotational movement shaft 32d as a rotational movement fulcrum. However, instead of this configuration, a sliding movement unit which causes the document support portion 32 to undergo sliding movement to the cover portion 22 side may be provided. In this configuration, it is possible to more greatly open the bottom portion space 56 by subjecting the document support portion 32 to sliding movement and it is possible to easily remove a jammed document at a position corresponding to the bottom portion space 56 in the document transport path 35. As an example of the sliding movement unit, it is desirable to subject the document support portion 32 to sliding movement along a sliding path which is provided in the inner wall in the +X-axis direction and the −X-axis direction of the curved transport path forming member 26 in consideration of the mutual orientations of the document support portion 32 and the cover portion 22.

The scanner unit 14 for solving the problem includes the reading unit 42 which reads a document, the document support portion 32 which supports the document before feeding, the feed roller 34a which feeds out the document which is supported by the document support portion 32 toward the reading unit 42, the cover portion 22 which is capable of opening and closing, the top surface 22a forms an apparatus top surface in a closed state, and the bottom surface 22b of the opposite side from the top surface 22a forms a support surface which supports the document together with the document support portion 32 in an open state, and the base frame 28 which forms the top surface 18a of the ADF unit 18 together with the cover portion 22, in which the document support portion 32 is provided to be capable of rotational movement and is capable of, through rotational movement, switching between a first posture which is a posture in which the document is fed from the feed roller 34a and a second posture in which the document support portion 32 is opened upward from the first posture to widen the bottom portion space 56 of the document support portion 32, in which the top surface 22a of the cover portion 22 forms the top surface 18a of the ADF unit 18 which runs along the X-axis direction and the Y-axis direction which are the horizontal directions together with the top surface 28a of the base frame 28 in the closed state, and in which, the first posture of the document support portion 32 is a posture which runs along the bottom surface 22b of the cover portion 22 in the closed state.

In this configuration, the document support portion 32 is capable of switching between the first posture which is a posture in which the document is fed from the feed roller 34a and a second posture in which the document support portion 32 is opened upward from the first posture to widen the bottom portion space 56 of the document support portion 32, and thus, since the first posture which is the posture before opening is the posture in which the document is fed, it is possible to more easily maintain the posture of the document support portion 32 during the feeding of the document at an appropriate angle.

Since the first posture of the document support portion 32 is a posture which runs along the bottom surface 22b of the cover portion 22 in the closed state (the cover portion 22 in the posture which runs along the horizontal direction (FIG. 3)), it is possible to secure the bottom portion space 56 of the document support portion 32 to the maximum extent and the jam processing properties are improved.

In the cover portion 22, since the top surface 22a forms the top surface 18a of the ADF unit 18 which runs along the X-axis direction and the Y-axis direction which are horizontal directions together with the top surface 28a of the base frame 28 in the closed state, the flatness of the top surface 18a of the ADF unit 18 is secured, which is aesthetically excellent, and the stability when mounting the document or the like on the top surface 18a is improved.

The output tray 24 which receives the document that is subjected to reading by the reading unit 42 and is output is provided, and the output tray 24 is provided to be capable of opening and closing and forms the top surface 18a of the ADF unit 18 which runs along the X-axis direction and the Y-axis direction which are horizontal directions together with the top surface 22a of the cover portion 22 and the top surface 28a of the base frame 28 in the closed state.

In this configuration, since the output tray 24 is provided to be capable of opening and closing and forms the top surface 18a of the ADF unit 18 which runs along the X-axis direction and the Y-axis direction which are horizontal directions together with the top surface 22a of the cover portion 22 and the top surface 28a of the base frame 28 in the closed state, in the configuration in which the output tray 24 is provided, the flatness of the top surface 18a of the ADF unit 18 is secured, which is aesthetically excellent, and the stability when mounting the document or the like on the top surface 18a is improved.

The cover portion 22 is supported by the document support portion 32 in the closed state. In this configuration, since the cover portion 22 is supported by the receiving portions 32a and 32b of the document support portion 32 which is in a posture that is stable in the closed state (the first posture), it is possible to appropriately maintain the closed posture of the cover portion 22 and, in particular, the flatness of the top surface 18a of the ADF unit 18 is secured.

The support frame 54 is included which is positioned on the downstream side of the document support portion 32 and, together with the document support portion 32, forms the downstream support portion 54a which supports the document before feeding, and the support frame 54 is provided to be capable of rotational movement, and, through rotational movement, switches between a feeding-time posture in which the downstream support portion 54a supports the document before feeding and an open posture in which the support frame 54 opens upward from the feeding-time posture to widen the bottom portion space 57 of the downstream support portion 54a.

In this configuration, since it is possible to open the support frame 54 which forms the downstream support portion 54a which is positioned on the downstream side of the document support portion 32, that is, still closer to the apparatus inside than the document support portion 32, the bottom portion space 56 of the document support portion 32 is further widened, the bottom portion space 57 of the downstream support portion 54a is widened, and thus, the jam processing properties are still further improved.

The document support portion 32 is connected to the support frame 54 to be capable of rotational movement. In this configuration, the bottom portion spaces 56 and 57 of the document support portion 32 and the support frame 54 are greatly exposed and the jam processing properties are still further improved by opening both the document support portion 32 and the support frame 54.

Since it is possible to also lift up the support frame 54 by lifting up the document support portion 32, the manipulability is also improved.

The cover portion 22 is supported by the base frame 28 in the open state. In this configuration, since the posture of the cover portion 22 is directly defined by the base frame 28 without depending on the position of the document support portion 32, the open posture of the cover portion 22 is more appropriately and reliably defined.

The rotational movement shaft 32d of the document support portion 32 is positioned on the downstream side of the document support portion 32 in the feed direction. In this configuration, when the document support portion 32 is open during the jam processing, since the upstream side in the document transport direction becomes the free end side and is more greatly opened, it is possible to assume a state in which it is easy to insert a hand into the inner portion of the apparatus.

The first posture of the document support portion 32 is defined by the document support portion 32 abutting on the support frame 54. In this configuration, the posture of the document support portion 32 is accurately defined with respect to the downstream support portion 54a during the feeding of the document and it is possible to realize more appropriate feeding.

The scanner unit 14 further includes the document transport path 35 in which the document which is fed from the document support portion 32 is curved and inverted to face downward, passes a bottom side of the document support portion 32, and is output, and the curved transport path forming member 26 which forms an outside of a curved inverting transport path 58 of the document from the downstream support portion 54a to the reading unit 42 in the document transport path 35, in which the curved transport path forming member 26 opens and closes by rotationally moving centered on the rotational movement shaft 28f which is positioned closer to the bottom side than the rotational movement shaft 32d of the document support portion 32, forms the curved inverting transport path 58 by closing, and opens the curved inverting transport path 58 by opening.

In this configuration, since the curved transport path forming member 26 opens and closes by rotationally moving centered on the rotational movement shaft 28f which is positioned closer to the bottom side than the rotational movement shaft 32d of the document support portion 32, when the curved transport path forming member 26 is opened, it is possible to more greatly open the curved inverting transport path 58 and the jam processing properties are improved.

In the scanner unit 14, the curved transport path forming member 26 forms the top surface 18a of the ADF unit 18 which runs along the X-axis direction and the Y-axis direction which are horizontal directions together with the top surface 22a of the cover portion 22 and the top surface 28a of the base frame 28 in the closed state.

In this configuration, since the curved transport path forming member 26 forms the top surface 18a of the ADF unit 18 which runs along the X-axis direction and the Y-axis direction which are horizontal directions together with the top surface 22a of the cover portion 22 and the top surface 28a of the base frame 28 in the closed state, in the configuration in which the curved transport path forming member 26 is provided, the flatness of the top surface 18a of the ADF unit 18 is secured, which is aesthetically excellent, and the stability when mounting the document or the like on the top surface 18a is improved.

When both the cover portion 22 and the curved transport path forming member 26 are closed, The +Y-axis direction side edge portion 22h of the cover portion 22 and the −Y-axis direction side end portion 26e of the curved transport path forming member 26 on the top surface 18a of the ADF unit 18 face each other, and the hand-grip portion 26d is formed in a portion of the −Y-axis direction side edge portion 26e of the curved transport path forming member 26 and at least a portion of the +Y-axis direction side end portion 22h of the cover portion 22 is exposed via the hand-grip portion 26d.

In this configuration, since it is possible to expose at least a portion of the +Y-axis direction side edge portion 22h of the cover portion 22 using the hand-grip portion 26d without forming an opening and it is possible to open the cover portion 22 as a result, it is possible to suppress the entrance of dust and the like into the inner portion of the ADF unit 18.

The document support portion 32 and the cover portion 22 overlap each other in a document feed direction (the Y-axis direction) in at least a portion of a document width direction (the X-axis direction) which is a direction intersecting the document feed direction. In this configuration, it is possible to suppress the catching of the document leading end on the document support portion 32 when setting the document on the cover portion 22.

The curved transport path forming member 26 opens and closing in accordance with the opening and closing of the document support portion 32. In this configuration, since the curved transport path forming member 26 opens in accordance with the opening operation of the document support portion 32, the manipulability during the jam processing is still further improved.

The invention is not limited to the examples and may be modified in various ways within the scope of the invention described in the claims, and the modifications should be construed as being included in the invention.

The entire disclosure of Japanese Patent Application No. 2017-057983, filed Mar. 23, 2017 is expressly incorporated by reference herein.

What is claimed is:

1. An image reading apparatus comprising:
   a reader which reads a document;
   a document support portion which supports the document before feeding;
   a feeding unit which feeds out the document which is supported by the document support portion toward the reader;

a cover portion which is capable of opening and closing, a first surface of which forms an apparatus top surface in a closed state, and a second surface, which is an opposite side from the first surface, of which forms a support surface which supports the document together with the document support portion in an open state;

an output tray which receives a document that is subjected to reading by the reader and is output, the output tray being separate from the cover portion and not contacting the second surface of the cover portion;

a support frame which is positioned on a downstream side of the document support portion and, together with the document support portion, forms a downstream support portion that supports the document before feeding;

a base frame which forms the apparatus top surface together with the cover portion;

a document transport path in which the document which is fed from the document support portion is curved and inverted to face downward, passes a bottom side of the document support portion, and is output; and a curved transport path forming member which forms an outside of a curved inverting transport path of the document from the downstream support portion to the reader in the document transport path, wherein the document support portion is provided to be capable of rotational movement and is capable of, through rotational movement, switching between a first posture which is a posture in which the document is fed from the feeding unit and a second posture in which the document support portion is opened upward from the first posture to widen a bottom portion space of the document support portion, wherein the first surface of the cover portion forms the apparatus top surface which runs along a horizontal direction together with a top surface of the base frame in the closed state, wherein, in the first posture, a portion of the document support portion is at a height position running along the second surface of the cover portion in the closed state, wherein the support frame is provided to be capable of rotational movement, and, through rotational movement, switches between a feeding-time posture in which the downstream support portion supports the document before feeding and an open posture in which the support frame opens upward from the feeding-time posture to widen the bottom portion space of the downstream support portion, wherein the curved transport path forming member opens and closes by rotationally moving centered on a rotational movement shaft which is positioned closer to the bottom side than a rotational movement shaft of the document support portion, forms the curved inverting transport path by closing, and opens the curved inverting transport path by opening, wherein the curved transport path forming member forms the apparatus top surface which runs along the horizontal direction together with the first surface of the cover portion and the top surface of the base frame in the closed state, wherein when both the cover portion and the curved transport path forming member are closed, an edge portion of the cover portion and an edge portion of the curved transport path forming member on the apparatus top surface face each other, and wherein a recessed portion is formed in a portion of the edge portion of the curved transport path forming member and at least a portion of the edge portion of the cover portion is exposed via the recessed portion.

2. The image reading apparatus according to claim 1, wherein the output tray is provided to be capable of opening and closing and forms the apparatus top surface which runs along the horizontal direction together with the first surface of the cover portion and the top surface of the base frame in the closed state.

3. The image reading apparatus according to claim 1, wherein the cover portion is supported by the document support portion in the closed state.

4. The image reading apparatus according to claim 1, wherein the document support portion is connected to the support frame to be capable of rotational movement.

5. The image reading apparatus according to claim 1, wherein the cover portion supports the base frame in the open state.

6. The image reading apparatus according to claim 1, wherein a rotational movement shaft of the document support portion is positioned on a downstream side of the document support portion in a feed direction.

7. The image reading apparatus according to claim 1, wherein the first posture of the document support portion is defined by the document support portion abutting on the support frame.

8. The image reading apparatus according to claim 1, wherein the document support portion and the cover portion overlap each other in a document feed direction in at least a portion of a document width direction which is a direction intersecting the document feed direction.

9. The image reading apparatus according to claim 1, wherein the curved transoort path forming member opens in accordance with an opening operation of the document support portion.

10. An image reading apparatus comprising:
a reader which reads a document;
a document support portion which supports the document before feeding;
a feeding unit which feeds out the document which is supported by the document support portion toward the reader;
a cover portion which is capable of opening and closing, a first surface of which forms an apparatus top surface in a closed state, and a second surface, which is an opposite side from the first surface, of which forms a support surface which supports the document together with the document support portion in an open state;
a support frame which is positioned on a downstream side of the document support portion and, together with the document support portion, forms a downstream support portion that supports the document before feeding;
a base frame which forms the apparatus top surface together with the cover portion;
a document transport path in which the document which is fed from the document support portion is curved and inverted to face downward, passes a bottom side of the document support portion, and is output; and
a curved transport path forming member which forms an outside of a curved inverting transport path of the document from the downstream support portion to the reader in the document transport path,
wherein the document support portion is provided to be capable of rotational movement and is capable of, through rotational movement, switching between a first posture which is a posture in which the document is fed from the feeding unit and a second posture in which the document support portion is opened upward from the first posture to widen a bottom portion space of the document support portion, wherein the first surface of the cover portion forms the apparatus top surface which runs along a horizontal direction together with a top surface of the base frame in the closed state, wherein, in the first posture, a portion of the document support portion is at a height position running along the second surface of the cover portion in the closed state such that the portion of the document support portion contacts the second surface of the cover portion in the closed state, wherein the support frame is provided to be capable of rotational movement, and, through rotational movement, switches between a feeding-time posture in which the downstream support portion supports the document before feeding and an open posture in which the support frame opens upward from the feeding-time posture to widen the bottom portion space of the downstream support portion, wherein the curved transport path forming member opens and closes by rotationally moving centered on a rotational movement shaft which is positioned closer to the bottom side than a rotational movement shaft of the document support portion, forms the curved inverting transport path by closing, and opens the curved inverting transport path by opening, wherein the curved transport path forming member forms the apparatus top surface which runs along the horizontal direction together with the first surface of the cover portion and the top surface of the base frame in the closed state, wherein when both the cover portion and the curved transport path forming member are closed, an edge portion of the cover portion and an edge portion of the curved transport path forming member on the apparatus top surface face each other, and wherein a recessed portion is formed in a portion of the edge portion of the curved transport path forming member and at least a portion of the edge portion of the cover portion is exposed via the recessed portion.

11. The image reading apparatus according to claim 10, further comprising:

an output tray which receives a document that is subjected to reading by the reader and is output, wherein the output tray is provided to be capable of opening and closing and forms the apparatus top surface which runs along the horizontal direction together with the first surface of the cover portion and the top surface of the base frame in the closed state.

12. The image reading apparatus according to claim 10, wherein the document support portion is connected to the support frame to be capable of rotational movement.

13. The image reading apparatus according to claim 10, wherein the cover portion supports the base frame in the open state.

* * * * *